(12) United States Patent
Petrak

(10) Patent No.: US 7,331,255 B2
(45) Date of Patent: Feb. 19, 2008

(54) METHOD AND APPARATUS FOR TENSIONING AN EMERGENCY BRAKE SYSTEM ON A VEHICLE

(76) Inventor: Gregory H. Petrak, 16488 W. 55th Dr., Golden, CO (US) 80403

( * ) Notice: Subject to any disclaimer, the term of this patent is extended or adjusted under 35 U.S.C. 154(b) by 188 days.

(21) Appl. No.: 10/369,989

(22) Filed: Feb. 18, 2003

(65) Prior Publication Data

US 2003/0227010 A1 Dec. 11, 2003

Related U.S. Application Data

(63) Continuation-in-part of application No. 10/254,050, filed on Sep. 23, 2002.

(60) Provisional application No. 60/324,151, filed on Sep. 21, 2001, provisional application No. 60/348,993, filed on Jan. 14, 2002.

(51) Int. Cl.
*F16C 1/10* (2006.01)
*B60T 1/00* (2006.01)

(52) U.S. Cl. .............................. 74/502.4; 74/501.5 R; 188/2 D

(58) Field of Classification Search ............... 74/500.5, 74/502.6, 501.5 R; 188/2 D; 29/402.01, 29/402.03, 402.04, 402.08
See application file for complete search history.

(56) References Cited

U.S. PATENT DOCUMENTS

| | | | |
|---|---|---|---|
| 2,821,091 A | 1/1958 | Benner | ......................... 74/482 |
| 3,237,977 A | 3/1966 | Batchelder | .................. 287/119 |
| 3,513,719 A | 5/1970 | Tschanz | ........................ 74/501 |
| 3,643,198 A | 2/1972 | Economu | |
| 3,661,090 A | 5/1972 | Martin et al. | |
| 3,937,295 A * | 2/1976 | Wright | ........................ 180/271 |
| 4,020,713 A | 5/1977 | Cantley et al. | ................ 74/479 |
| 4,057,135 A | 11/1977 | Mori | ........................ 192/111 A |
| 4,174,099 A | 11/1979 | Yamasaki | .................... 267/168 |
| 4,227,594 A | 10/1980 | Kluger | ........................ 188/361 |
| 4,256,205 A * | 3/1981 | Hamar | .................... 188/24.21 |
| 4,271,718 A | 6/1981 | Bopp et al. | |

(Continued)

FOREIGN PATENT DOCUMENTS

DE    41 09 887 A1    3/1991

(Continued)

OTHER PUBLICATIONS

Bolz et al., Handbook of tables for Applied Engineering Science, 2nd Edition, CRC Press, pp. 103-115, 1976.

(Continued)

*Primary Examiner*—Chong H. Kim
(74) *Attorney, Agent, or Firm*—Dorsey & Whitney LLP

(57) ABSTRACT

An apparatus and associated method for use in tensioning a park brake cable system includes a body including a housing and an input shaft, the input shaft positioned at least partially within the housing, the housing and the input shaft being axially movable relative to one another, and the input shaft and the outer housing being rotatable relative to one another, the body having a nut receiving recess. The cable system is tensioned by retracting the nut from its support surface, tensioning the system by rotating the nut, and relieving the nut back to its support surface. A control system is used to control the operation of the tensioning device, and is programmable to perform several associated functions.

21 Claims, 52 Drawing Sheets

U.S. PATENT DOCUMENTS

| | | | |
|---|---|---|---|
| 4,374,597 A | 2/1983 | Mochida | 292/8 |
| 4,378,713 A | 4/1983 | Haskell et al. | 74/501.5 R |
| 4,407,167 A | 10/1983 | Koukal et al. | 74/501 R |
| 4,412,458 A | 11/1983 | Derringer | 74/512 |
| 4,543,849 A | 10/1985 | Yamamoto et al. | |
| 4,569,112 A | 2/1986 | Dussault | 29/402.08 |
| 4,624,155 A | 11/1986 | Wing | |
| 4,658,668 A | 4/1987 | Stocker | 74/501.5 R |
| 4,838,109 A | 6/1989 | Stewart | 74/501.5 R |
| 4,887,705 A | 12/1989 | Solano et al. | |
| 5,016,490 A | 5/1991 | Jaksic | 74/501.5 R |
| 5,080,434 A | 1/1992 | Locher | |
| 5,086,662 A | 2/1992 | Tayon et al. | 74/501.5 R |
| 5,144,856 A | 9/1992 | Roca | 74/501.5 R |
| 5,203,068 A | 4/1993 | Siring | 29/452 |
| 5,211,071 A | 5/1993 | Hedstrom | 74/501.5 R |
| 5,235,870 A | 8/1993 | Hedstrom | 74/501.5 R |
| 5,386,887 A | 2/1995 | Hilgert et al. | 188/2 D |
| 5,590,744 A * | 1/1997 | Belmond | 188/265 |
| 5,662,004 A | 9/1997 | Osborn et al. | 74/502.4 |
| 5,813,290 A | 9/1998 | Takahashi et al. | |
| 5,816,109 A | 10/1998 | Dege | 74/502.4 |
| 5,983,745 A * | 11/1999 | Petrak | 74/502.4 |
| 6,328,138 B1 * | 12/2001 | Takizawa | 188/24.11 |
| 2002/0011129 A1 | 1/2002 | Petrak | |
| 2002/0084154 A1 | 7/2002 | Peter | |
| 2003/0075001 A1 | 4/2003 | Petrak | |

FOREIGN PATENT DOCUMENTS

| | | |
|---|---|---|
| DE | 42 41 389 A1 | 12/1992 |
| DE | 196 18 421 A1 | 5/1997 |
| EP | 0805104 | 11/1997 |
| GB | 2 260 588 A | 4/1993 |
| JP | 58012857 A * | 1/1983 |
| JP | 2-159408 A | 6/1990 |
| JP | 03-90461 | 4/1991 |

OTHER PUBLICATIONS

Halliday et al., Physics Parts I & II, John Wiley & Sons, Inc., pp. 87-90, 1967.
Shigley et al., "Standard Handbook of Machine Design", McGraw-Hill Book Co., pp. 7.34-7.38, At least as early as Oct. 30, 1992.
Webster's II New Riverside Dictionary, The Riverside Publishing Co., pp. 198-199, 1994.
Office Action of Jul. 27, 1998; U.S. Appl. No. 09/064,402, filed Apr. 22, 1998.
Office Action of Jan. 21, 1999; U.S. Appl. No. 09/064,402, filed Apr. 22, 1998.
Office Action of Feb. 11, 2000; U.S. Appl. No. 09/441,628, filed Nov. 16, 1999.
Office Action of Jul. 7, 2000; U.S. Appl. No. 09/441,628, filed Nov. 16, 1999.
Office Action of May 21, 2002; U.S. Appl. No. 09/441,628, filed Nov. 16, 1999.
Office Action of Oct. 23, 2002; U.S. Appl. No. 09/441,628, filed Nov. 16, 1999.
Office Action of Aug. 18, 2003; U.S. Appl. No. 09/441,628, filed Nov. 16, 1999.
Office Action of Mar. 24, 2004; U.S. Appl. No. 09/441,628, filed Nov. 16, 1999.
Office Action of Jun. 7, 2005; U.S. Appl. No. 11/059,210, filed Feb. 15, 2005.
Office Action of Apr. 29, 2005; U.S. Appl. No. 10/254,050, filed Sep. 23, 2002.
Office Action of Oct. 13, 2004, U.S. Appl. No. 10/254,050, filed Sep. 23, 2002.
Office Action of May 19, 2004, U.S. Appl. No. 10/254,050, filed Sep. 23, 2002.
Gregory H. Petrak, Affidavit of Gregory H. Petrak, Nov. 25, 2003, 8 pages.
Amendement, U.S. Appl. No. 09/064,402, dated Sep. 28, 1998, 5 pages.
Amendment, U.S. Appl. No. 09/064,402, dated Jun. 21, 1999, 15 pages.
Notice of Allowance and Issue Fee Due, U.S. Appl. No. 09/064,402, mailed Jul. 13, 1999, 6 pages [best available copy provided].
Amendment, U.S. Appl. No. 09/441,628, dated May 11, 2000, 1 page.
Amendment, U.S. Appl. No. 09/441,628, dated Jan. 8, 2001, 19 pages.
Communication from the Examiner, U.S. Appl. No. 09/441,628, mailed Mar. 20, 2001, 3 pages.
Response to Request for Correction of Amendment, U.S. Appl. No. 09/441,628, dated Apr. 16, 2001, 2 pages.
Notice of Allowance and Issue Fee Due, U.S. Appl. No. 09/441,628, mailed Jun. 6, 2001, 4 pages.
Notice of Allowance and Issue Fee Due, U.S. Appl. No. 09/441,628, mailed Oct. 25, 2001, 3 pages.
Preliminary Amendment, U.S. Appl. No. 09/441,628, dated Jan. 25, 2002, 8 pages.
Preliminary Amendment, U.S. Appl. No. 09/441,628, dated Feb. 7, 2002, 12 pages.
Notice of Allowance and Issue Fee(s) Due, U.S. Appl. No. 09/441,628, mailed Mar. 11, 2002, 5 pages.
Response to Request for Correction of Amendment, U.S. Appl. No. 09/441,628, dated Jul. 22, 2002, 2 pages.
Amendment and Response to Office Action, U.S. Appl. No. 09/441,628, dated Mar. 24, 2003, 23 pages.
Notice of Allowance and Fee(s) Due; U.S. Appl. No. 09/441,628, mailed Apr. 17, 2003, 9 pages.
Amendment and Response, U.S. Appl. No. 09/441,628, dated Oct. 18, 2003, 17 pages.
Amendment and Response, U.S. Appl. No. 09/441,628, dated Jul. 26, 2004, 19 pages.
Notice of Allowance and Fee(s) Due, U.S. Appl. No. 09/441,628, mailed Oct. 6, 2004, 7 pages.
Office Action, U.S. Appl. No. 09/441,628, mailed Mar. 10, 2006, 9 pages.
Interview Summary, U.S. Appl. No. 09/441,628, mailed Apr. 20, 2006, 4 pages.
Preliminary Amendment, U.S. Appl. No. 11/059,210, dated Feb. 15, 2005, 9 pages.
Amendment and Response to Office Action, U.S. Appl. No. 11/059,210, dated Dec. 7, 2005, 6 pages.
Office Action, U.S. Appl. No. 11/059,210, mailed Jan. 4, 2006, 3 pages.
Express Adandonment, U.S. Appl. No. 11/059,210, dated May 4, 2006, 1 page.
Response to Restriction Requirement, U.S. Appl. No. 10/254,050, dated Jul. 19, 2004, 2 pages.
Amendment and Response to Office Action, U.S. Appl. No. 10/254,050, dated Feb. 15, 2005, 8 pages.
Amendment and Response to Office Action, U.S. Appl. No. 10/254,050, dated Sep. 28, 2005, 9 pages.
Office Action, U.S. Appl. No. 10/254,050, mailed Dec. 8, 2005, 10 pages.
Amendment and response to Office Action, U.S. Appl. No. 10/254,050, mailed Jun. 8, 2006, 11 pages.
Office Action, U.S. Appl. No. 10/254,050, mailed Aug. 4, 2006, 9 pages.
Amendment and response to Office Action, U.S. Appl. No. 10/254,050, dated Oct. 4, 2006, 8 pages.
Advisory Action, U.S. Appl. No. 10/254,050, mailed Oct. 24, 2006, 3 pages.
Notice of Allowance and Fee(s) Due, U.S. Appl. No. 10/254,050, mailed Jun. 4, 2007, 9 pages.

* cited by examiner

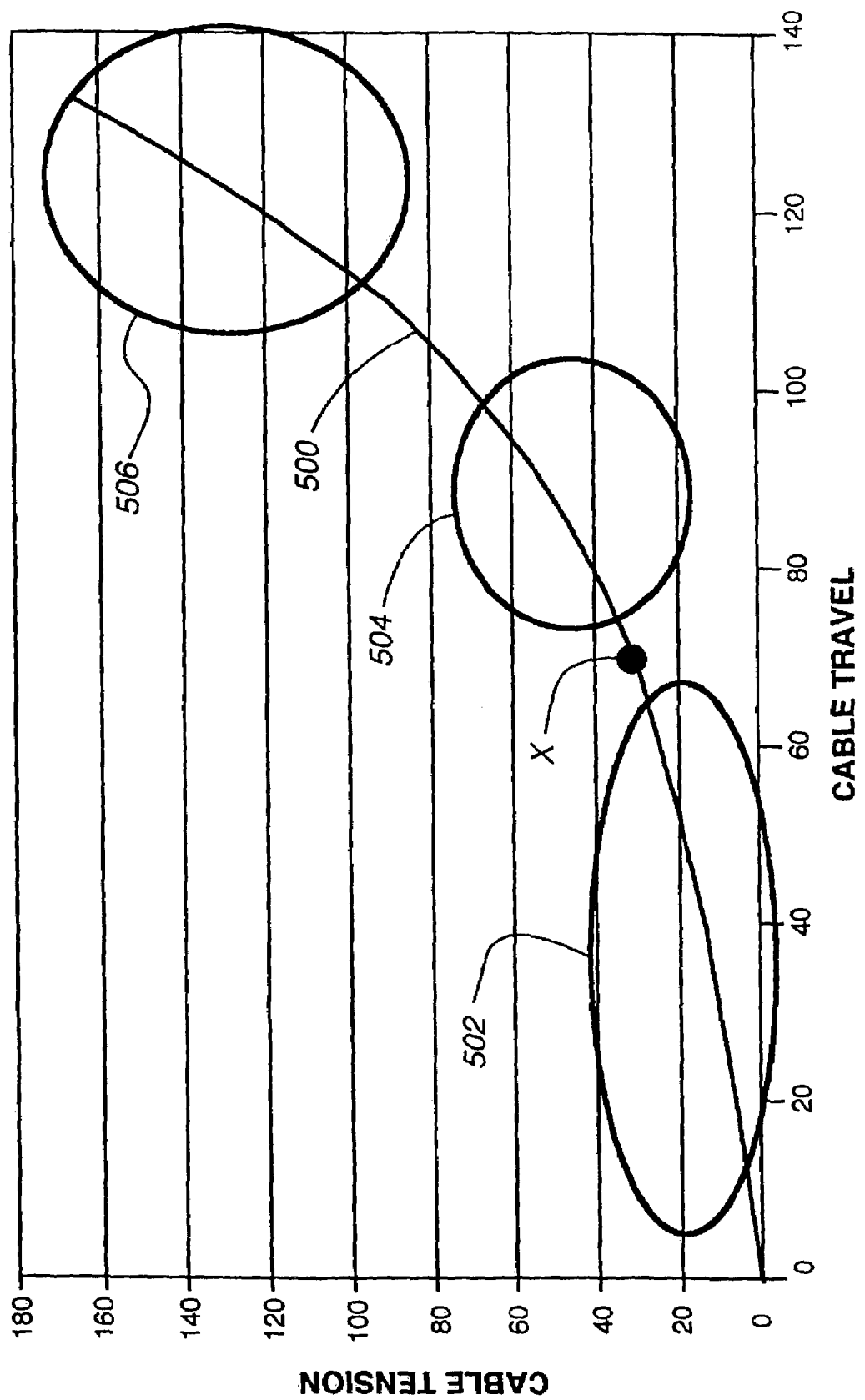
GRAPH 1

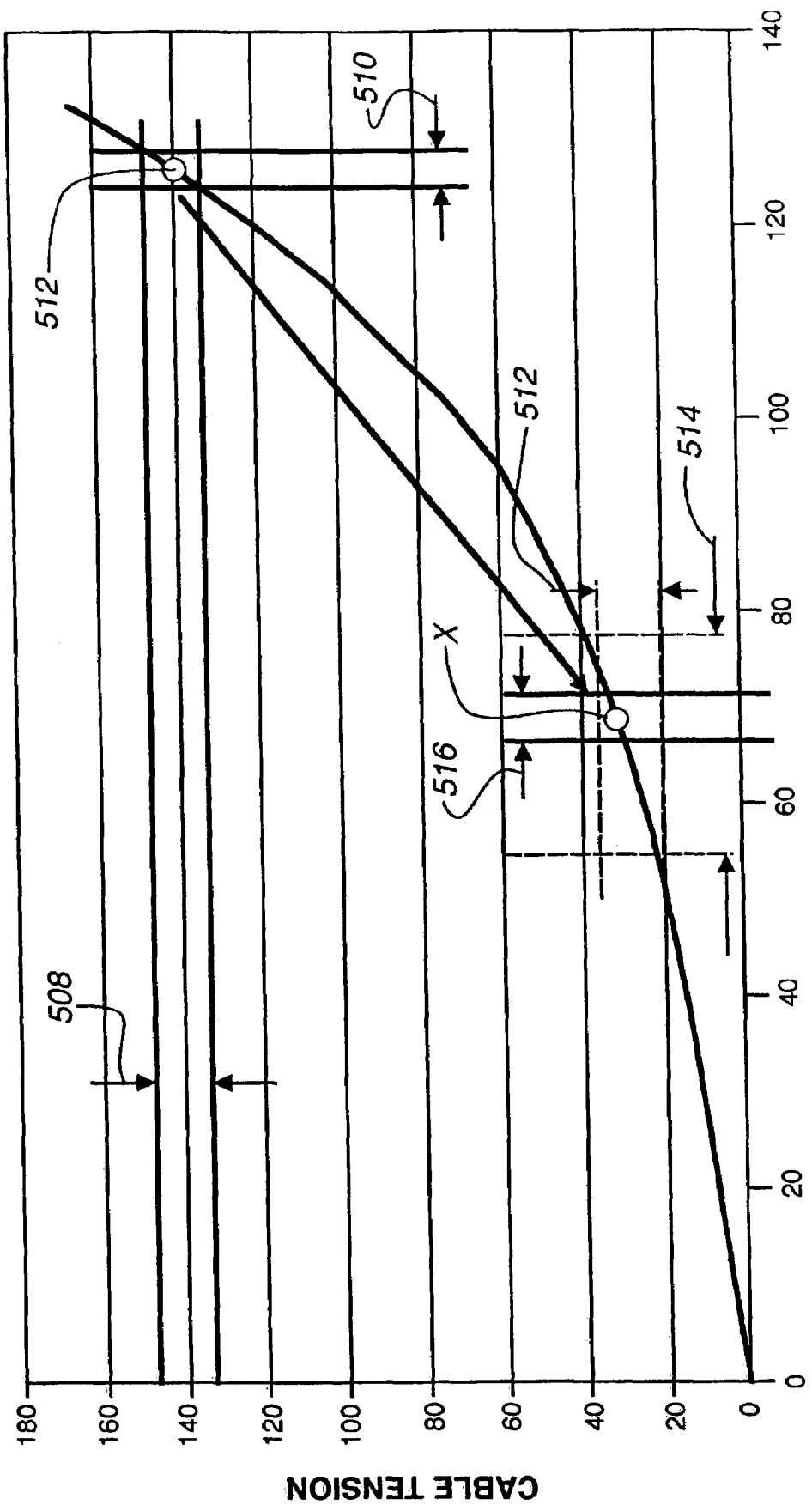

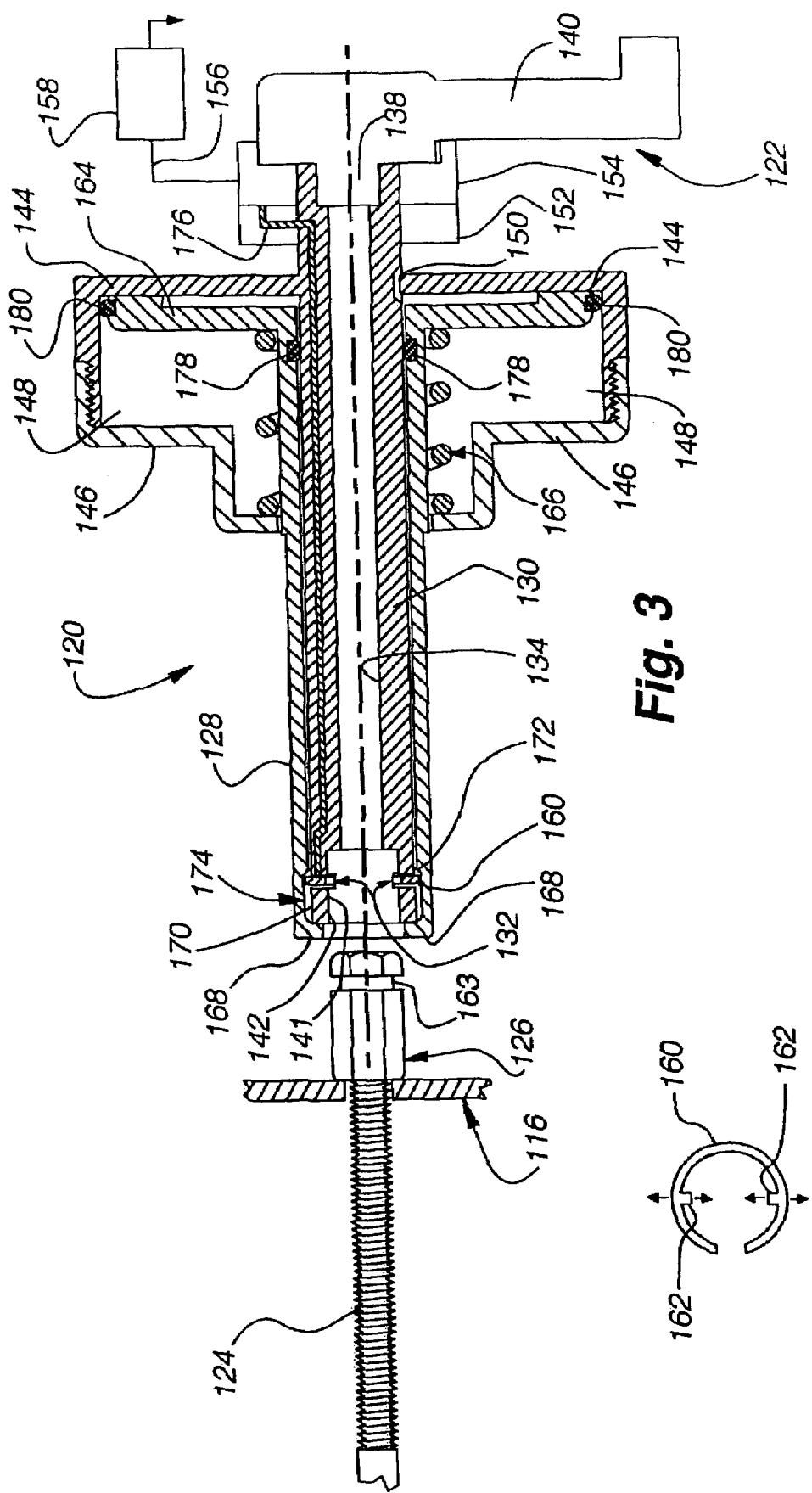

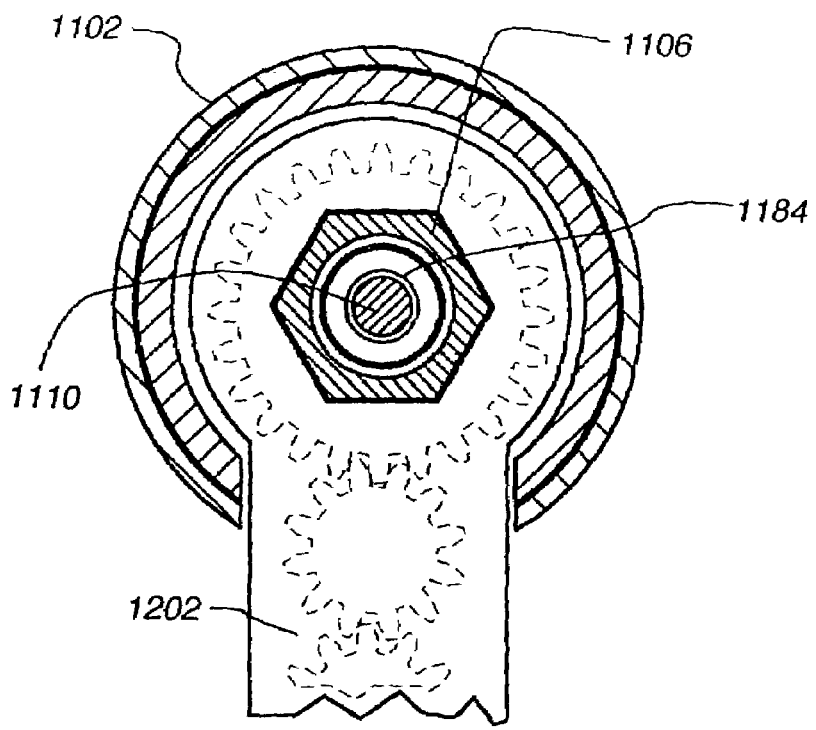
Fig. 24
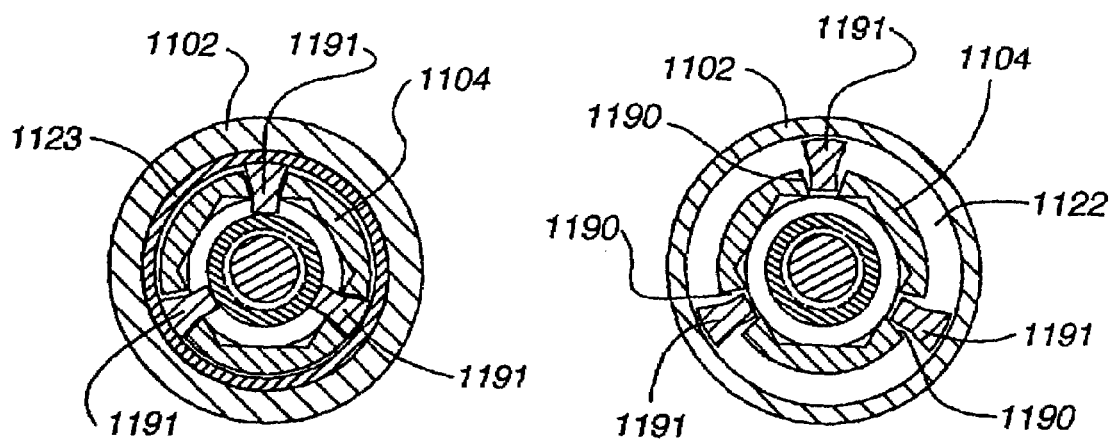
Fig. 26  Fig. 25

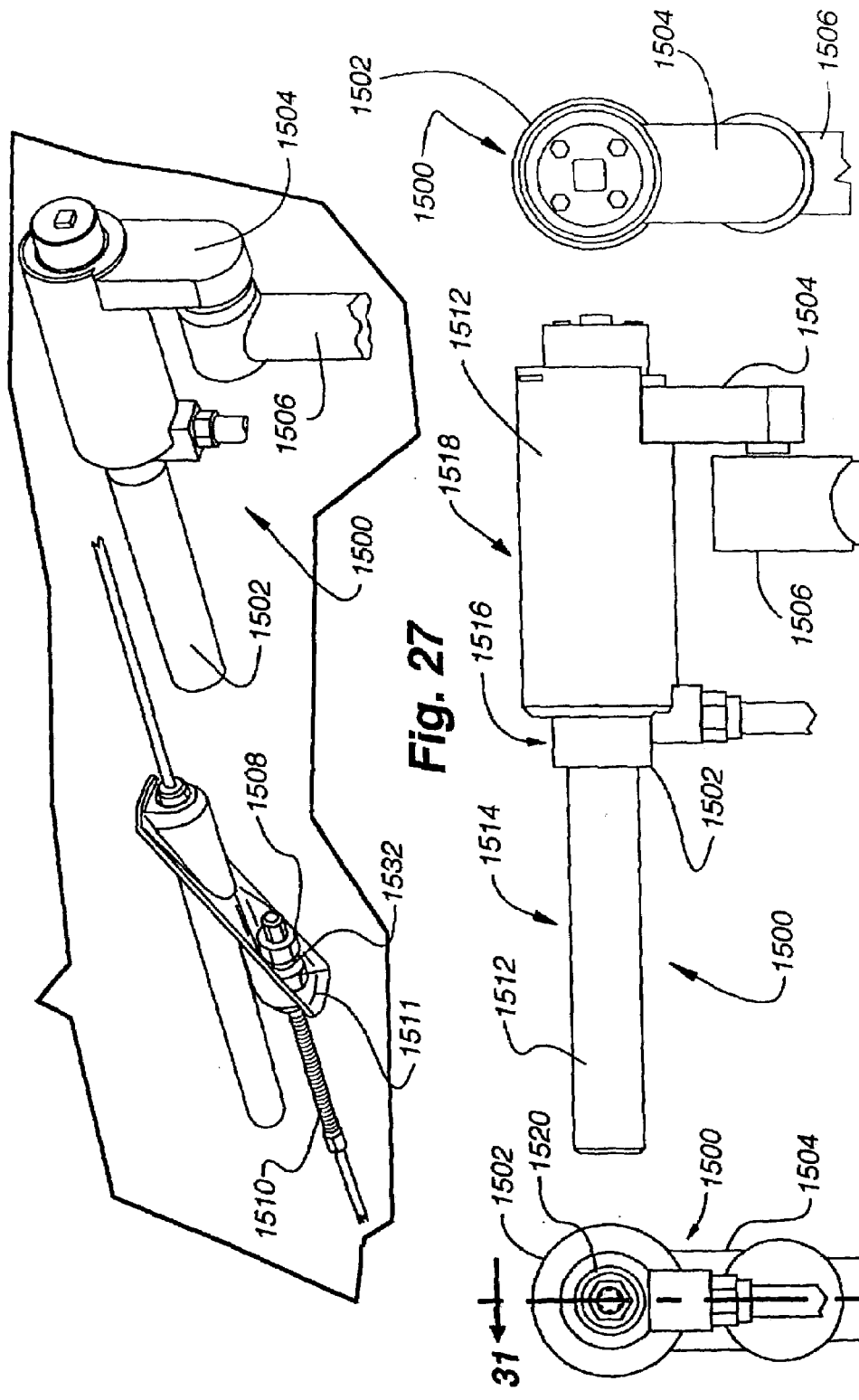

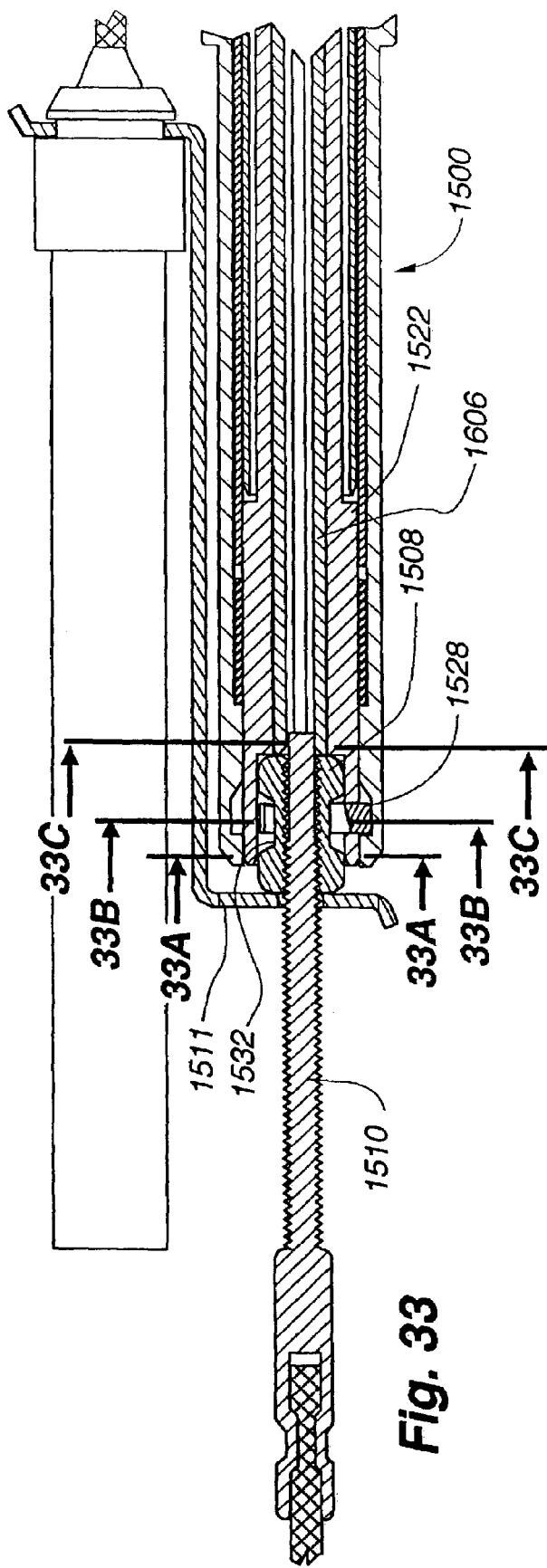
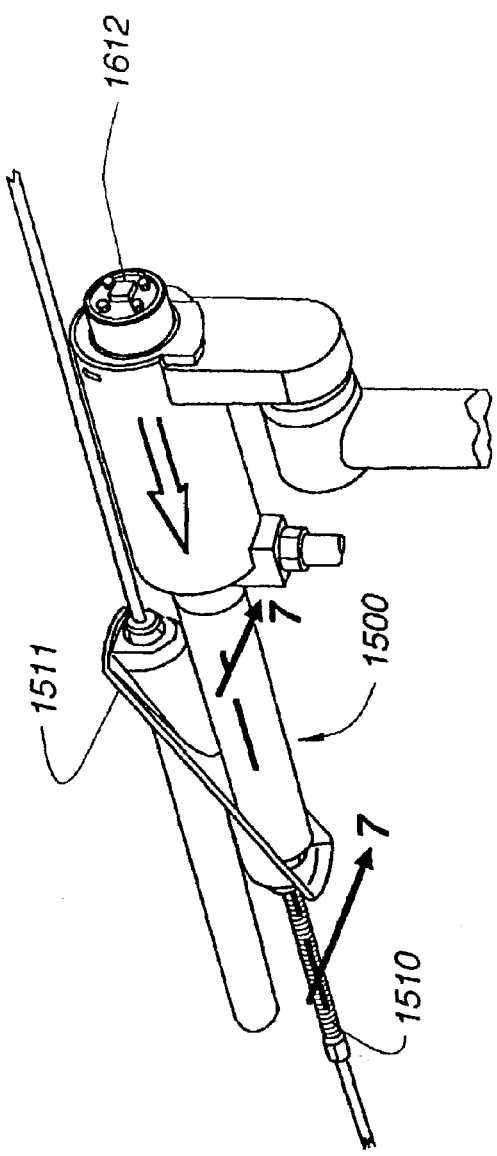
Fig. 33
Fig. 32

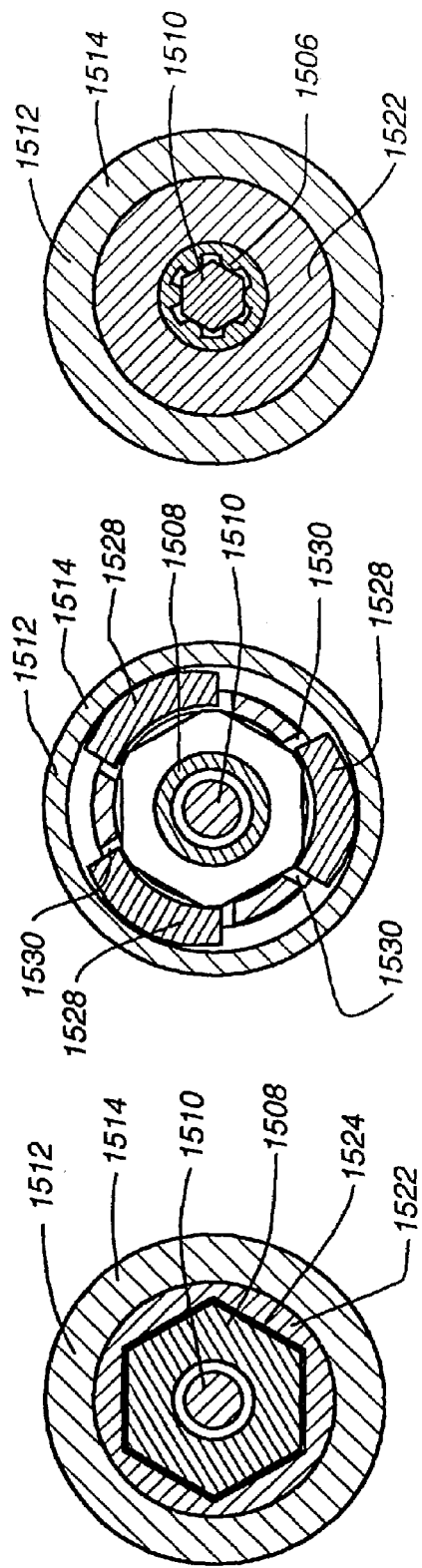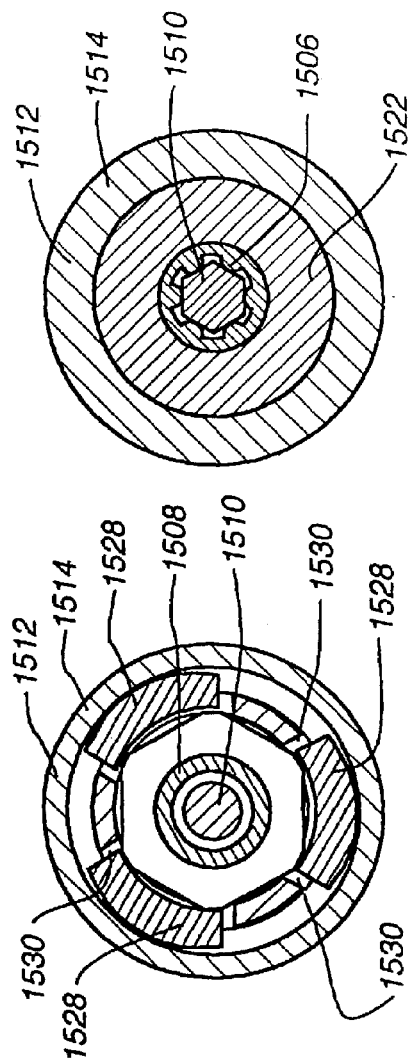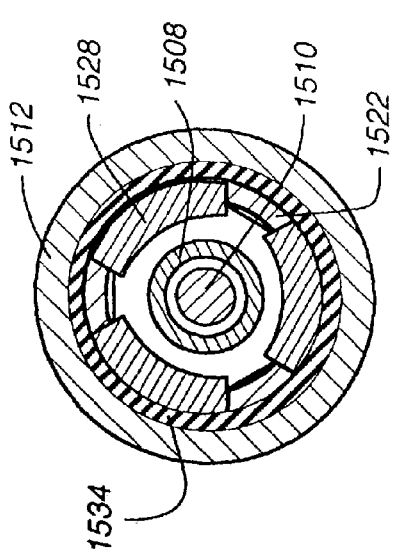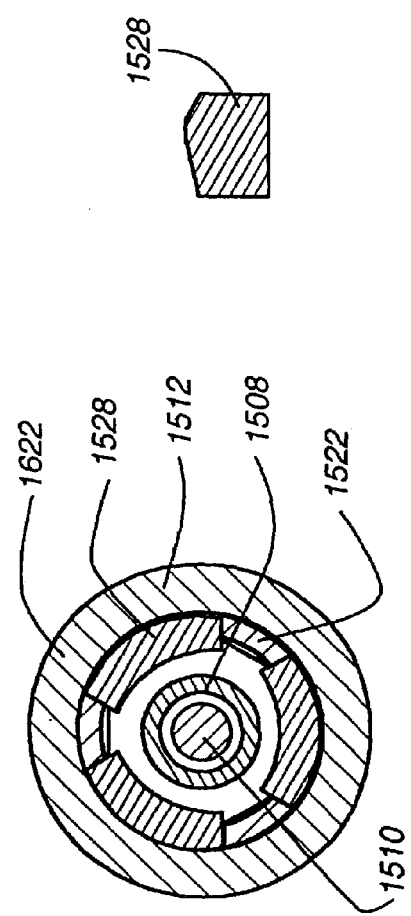

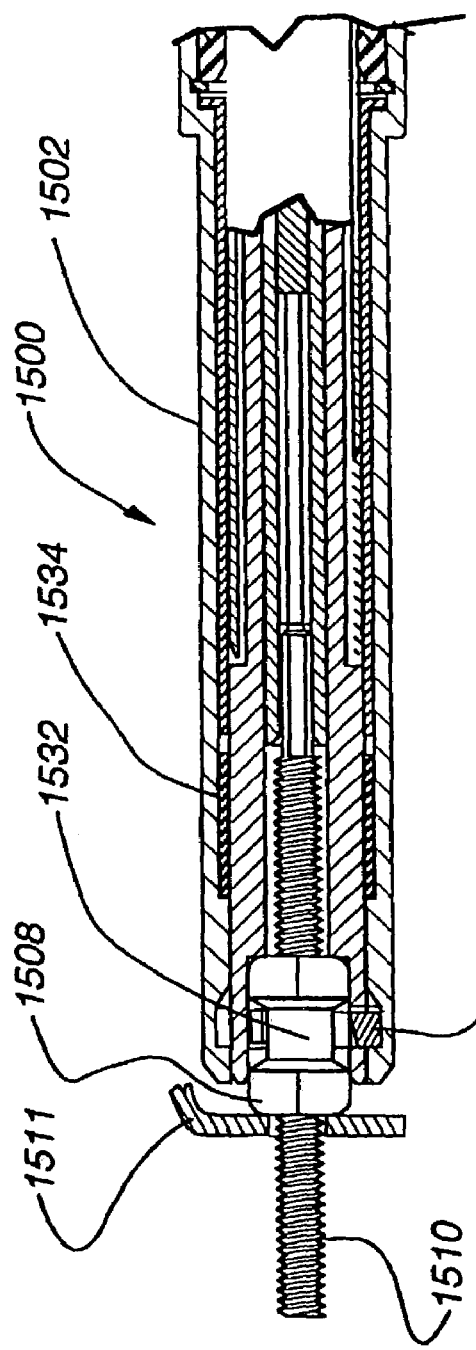
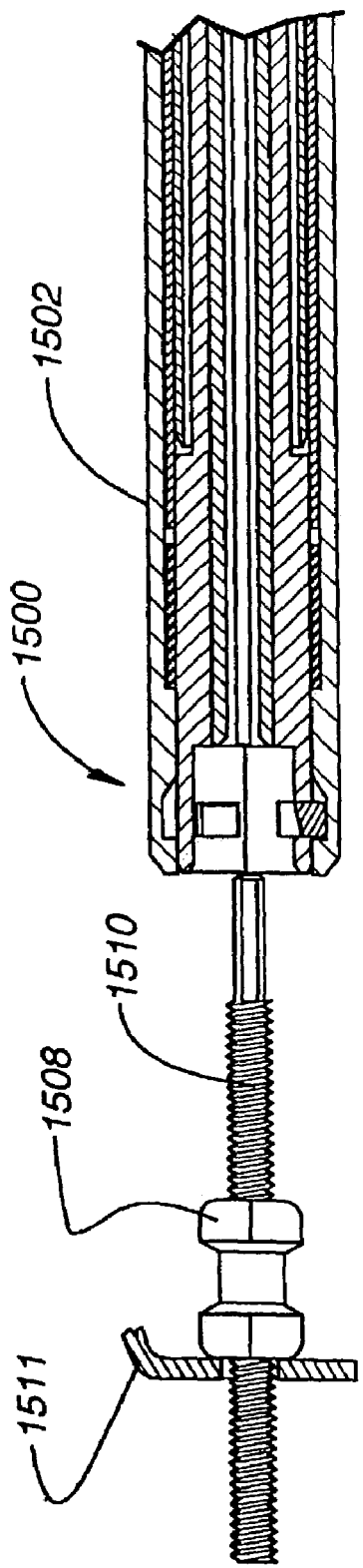
Fig. 37
Fig. 38

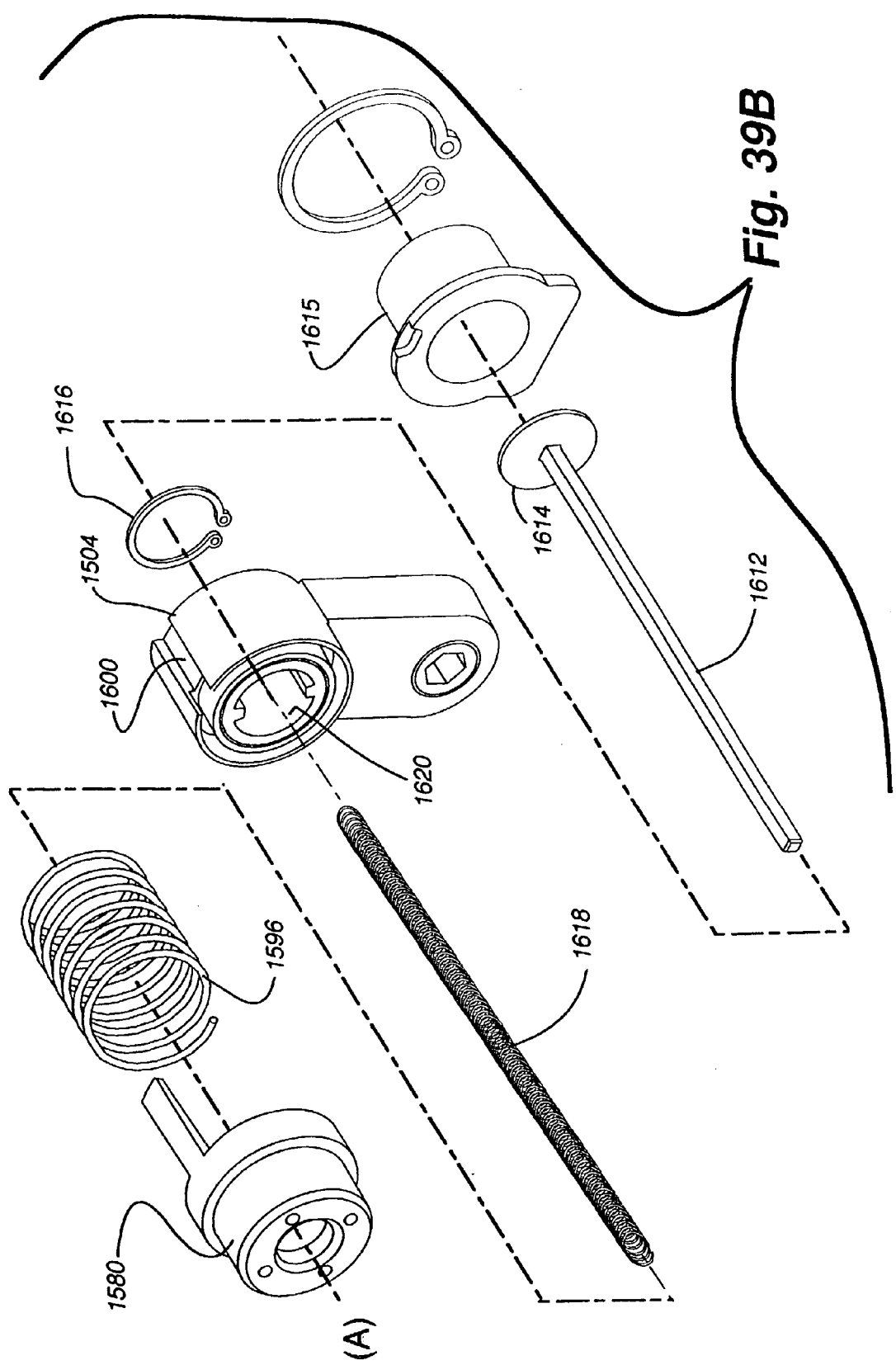

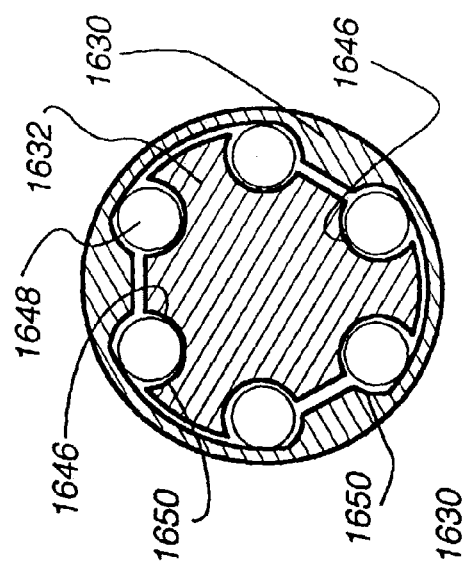
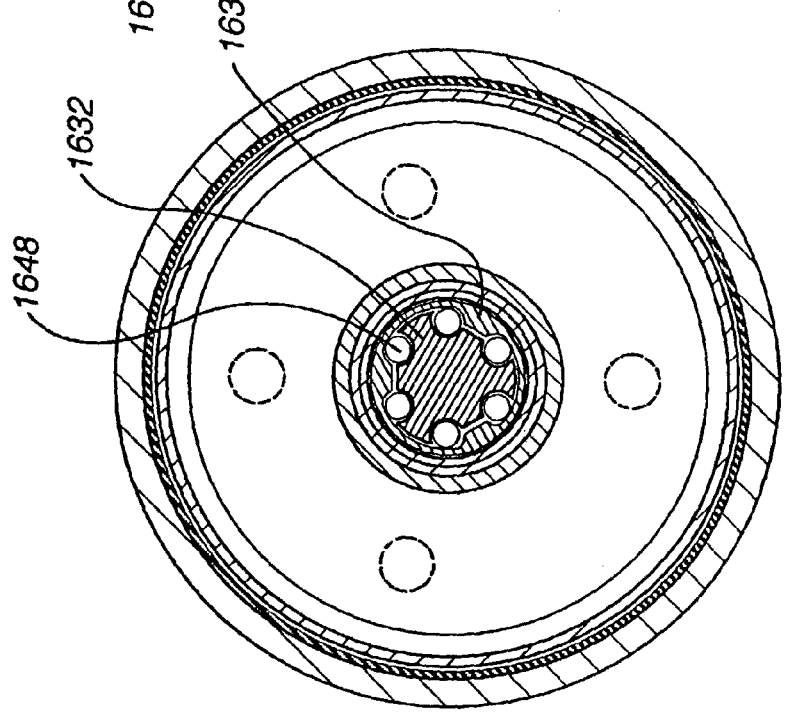
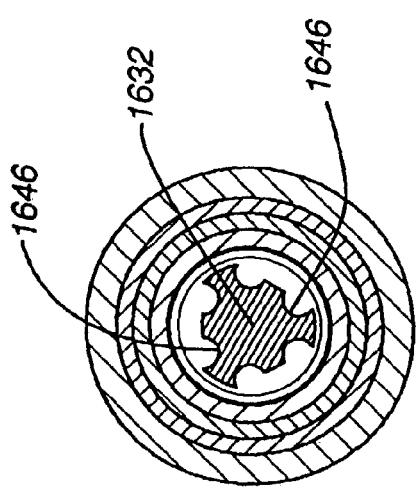
Fig. 42C
Fig. 42B
Fig. 42A

METHOD AND APPARATUS FOR TENSIONING AN EMERGENCY BRAKE SYSTEM ON A VEHICLE

CROSS-REFERENCE TO RELATED APPLICATIONS

This nonprovisional application is a continuation-in-part of, and claims priority to, U.S. patent application Ser. No. 10/254,050 filed Sep. 23, 2002, and entitled "METHOD AND APPARATUS FOR TENSIONING AN EMERGENCY BRAKE SYSTEM ON A VEHICLE," which in turn claims priority to U.S. Provisional Patent Application Ser. No. 60/324,151 filed Sep. 21, 2001, and U.S. Provisional Patent Application Ser. No. 60/348,993 filed Jan. 14, 2002, all of which are hereby incorporated by reference as if fully set forth herein.

INCORPORATION BY REFERENCE

This nonprovisional application hereby incorporates by reference in its entirety U.S. Pat. No. 5,983,745 issued Nov. 16, 1999, and entitled "Park Brake Cable System Including Connector Clip and Associated Method of Tensioning," as well as U.S. Provisional Patent Application Ser. No. 60/324,151 filed Sep. 21, 2001, and U.S. Provisional Patent Application Ser. No. 60/348,993 filed Jan. 14, 2002.

FIELD OF THE INVENTION

This invention relates to tools and associated method for use in parking brake cable tensioning operations, and more specifically to automated tools that directly measure the tension of the cable system during operation.

BACKGROUND

A conventional apparatus used in the assembly of emergency brake cable systems often require more than one person and more than one station on an assembly line for adequate installation and tensioning. Once the emergency brake cable system is initially installed, one assembly worker typically first tensions the system to the desired level, at which the voids are removed from the cable and the conduits through which the cable runs. At a second assembly position, a second assembly worker then typically reduces the tension in the system in a variety of ways so that the emergency brake cable system is not causing the brakes to be engaged. The existing systems require more than one assembly worker and more than one station, thus being a relatively expensive endeavor.

A further limitation of the existing brake cable system installation technology is that the tension in the cable system is only inaccurately measured by indirect methods, such as strain gauges and other types of transducers. This means that the actual tension in the brake cable system, which is important to the proper functioning of the emergency brake, is at best characterized and not directly known during the assembly process. This indirect tension measurement has limited measurement accuracy, and thus causes there to be a relatively wide variation in the ultimate tension at which the emergency brake cable system is assembled in a vehicle. This creates unwanted variations in the emergency brake cable system operation on the finished vehicle.

What is needed is an emergency brake cable tensioning method and apparatus that allows fewer resources to be used in tensioning the cable system, thus saving money in the assembly process and ultimately allowing automobiles to be manufactured more efficiently. In addition, what is needed is an emergency brake cable tensioning method and apparatus that allows the direct measurement of the tension of the brake cable system during assembly to allow the accurate tensioning of the emergency brake cable system for proper performance in the finished vehicle. These and other advantages provided by embodiments of the present invention will be recognized from the following descriptions of embodiments of the invention.

SUMMARY OF THE INVENTION

The tensioning tool of the present invention works in conjunction with a control system to tension a park brake cable system. The operation of the inventive tool and related process are based on primarily the retraction of the nut (or fastener) by a relief distance prior to the tensioning process. Generally, moving the nut a relief distance is accomplished by the relative motion of the housing with respect to an input shaft. In one embodiment the housing is pushed toward the equalizer to effectively withdraw the nut into the tool. In other of the embodiments, the input shaft is withdrawn into the tool, thus causing the nut to be withdrawn into the tool. The nut is received and secured in a nut receiving cavity formed in the input shaft. In the described embodiments, the nut receiving cavity is formed in the end of the input shaft, and the nut is secured therein by a structure actuated by the relative movement of the housing with respect to the input shaft.

The control system for running the tensioning tool can at least operate the tensioning tool to tension the brake system to a selected load and then stop. Other functions, such as accumulating load and other data and analyzing it for the performance of a particular cable system, or for summarizing the data of many cable systems, are also possible, depending on the programming of the control system.

In greater detail, a tool for tensioning a braking system may include a body including a housing and an input shaft, with the input shaft positioned at least partially within the housing, the housing and input shaft being axially movable relative to one another, and the input shaft and said outer housing being rotatable relative to one another, as well as a nut receiving recess defined in the input shaft, and a load cell operationally attached to said input shaft.

In another embodiment, the tool of the present invention includes a body including a housing, an input shaft, and an anti-rotation structure, the input shaft at least partially within the housing, the input shaft axially movable with respect to the housing, and the input shaft rotatable relative to the housing and the anti-rotation structure, the input shaft having a nut receiving recess, and wherein when the tool is attached to the park brake cable system, the nut is received in the nut receiving recess, and the end of the threaded rod is received in the anti-rotation structure.

In further detail, the anti-rotation structure can include a hollow shaft having a first outer end and a second inner end, and an interior bore with a keyed inner surface, a rod having a correspondingly keyed surface slidably received in the second inner end of the hollow shaft, the rod also engaging the housing in a rotationally-fixed manner, and the first outer end adjacent to the nut receiving recess for receiving the end of the threaded rod.

Alternatively, the anti-rotation structure can include a hollow shaft having a first outer end and a second inner end, and an interior bore with a keyed inner surface and forming at least one linear ball bearing race, the second inner end attached to the housing in a rotationally fixed manner, a rod having an inner end and an outer end, and at least one ball bearing race corresponding to the at least one race in the hollow shaft, the rod having a shape to resist rotation of the rod inside of the hollow shaft, a rod-receiving recess formed at the outer end, the inner end axially slidably positioned in the outer end of the hollow shaft, at least one ball bearing positioned between the races, and wherein the rod-receiving recess receives the end of the threaded rod when the tool is attached to the park brake cable system.

In the form of a method, the instant invention includes the acts of engaging the nut, moving the nut away from the equalizer by a relief distance and thereby establishing a first tension level, tensioning the cable system to a second tension level higher than the first tension level, and moving the nut toward the equalizer by the relief distance and establishing a third tension level.

In further detail, the method can also include that the third tension level is higher than the first tension level, and that the tension levels are measured directly.

Further, a functional test can be performed to check the tensioning process and make adjustments as necessary. Additionally to that stated above about the method, it can also extend and retract the nut at least one time, compare the third tension level to a selected tension level, and re-tension the cable system accordingly.

The control system is used to monitor and instruct the operation of the tool, as well as collect data measured during operation by the transducers. The control system is programmable using available control system components (central processing units, memory, and the like) to perform all of the desired functions, as well as utilize all of the data collected during the tensioning process, including data from a load cell capable of directly measuring tension exerted on the braking system. The control system can also be connected into a network (internet, LAN, etc., both wired and wireless) to feed data or take and implement instructions for having the tensioning tool perform various functions.

The features, utilities and advantages of various embodiments of the invention will be apparent from the following more particular description of embodiments of the invention as illustrated in the accompanying drawings and defined in the appended claims.

Graph 1 is a curve defined by the function of cable tension vs. cable travel, showing the flat region, transition region and steep region, as well as the ideal final tension of the park brake cable system.

Graph 2 is a curve similar to that of Graph 1, showing the variation in travel for a given tension measurement variation.

Figure 4:
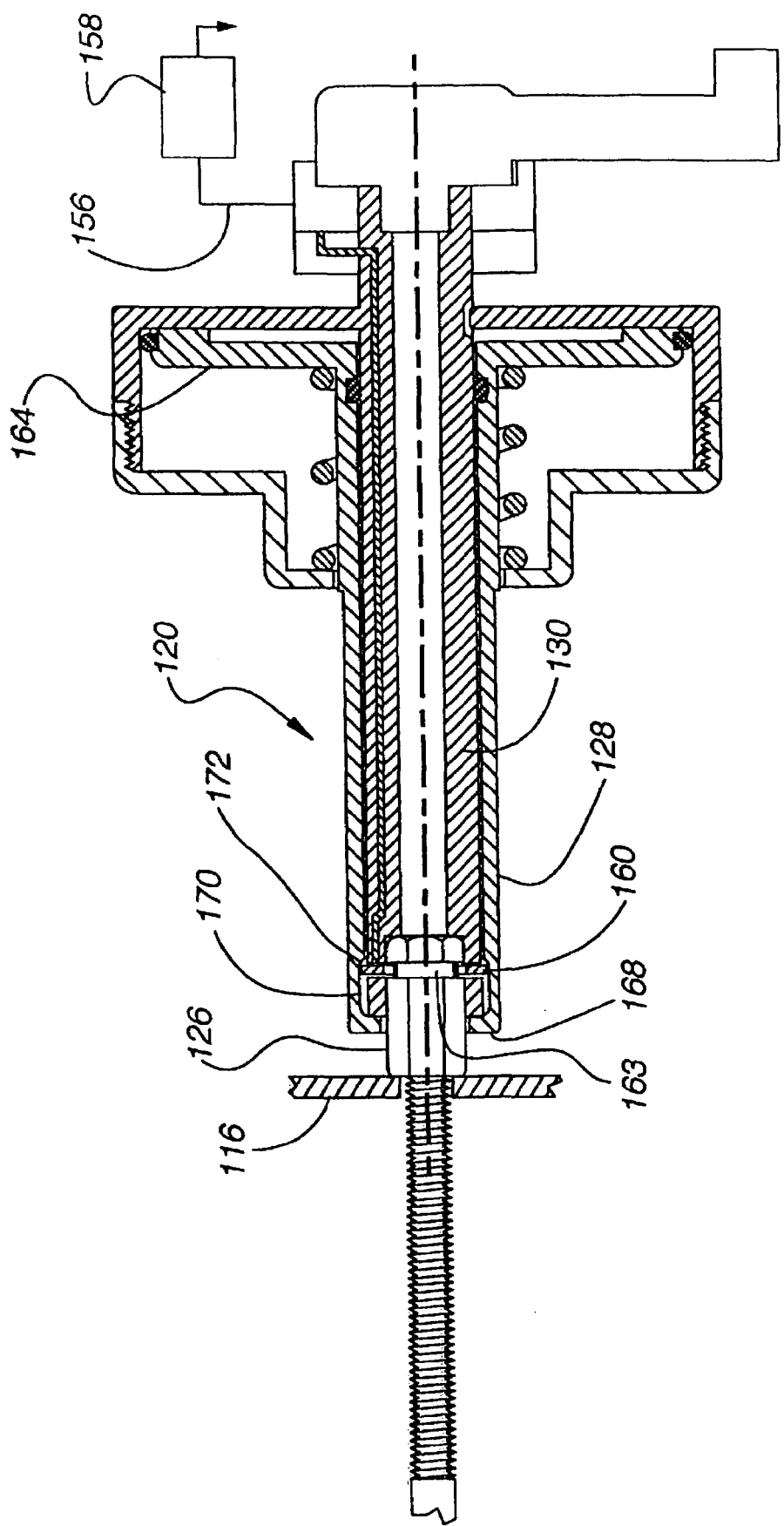
Figure 5:
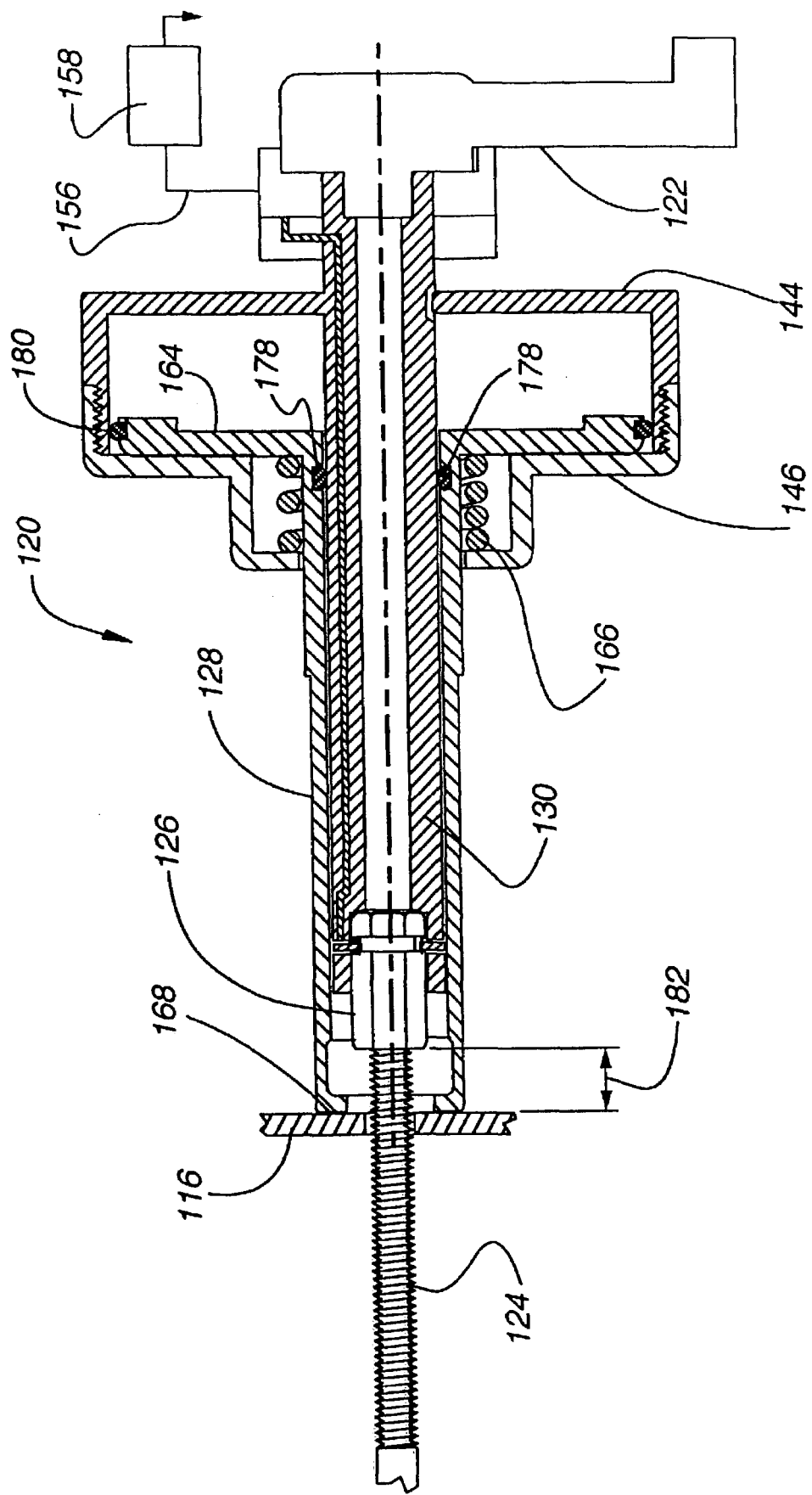
Figure 6:
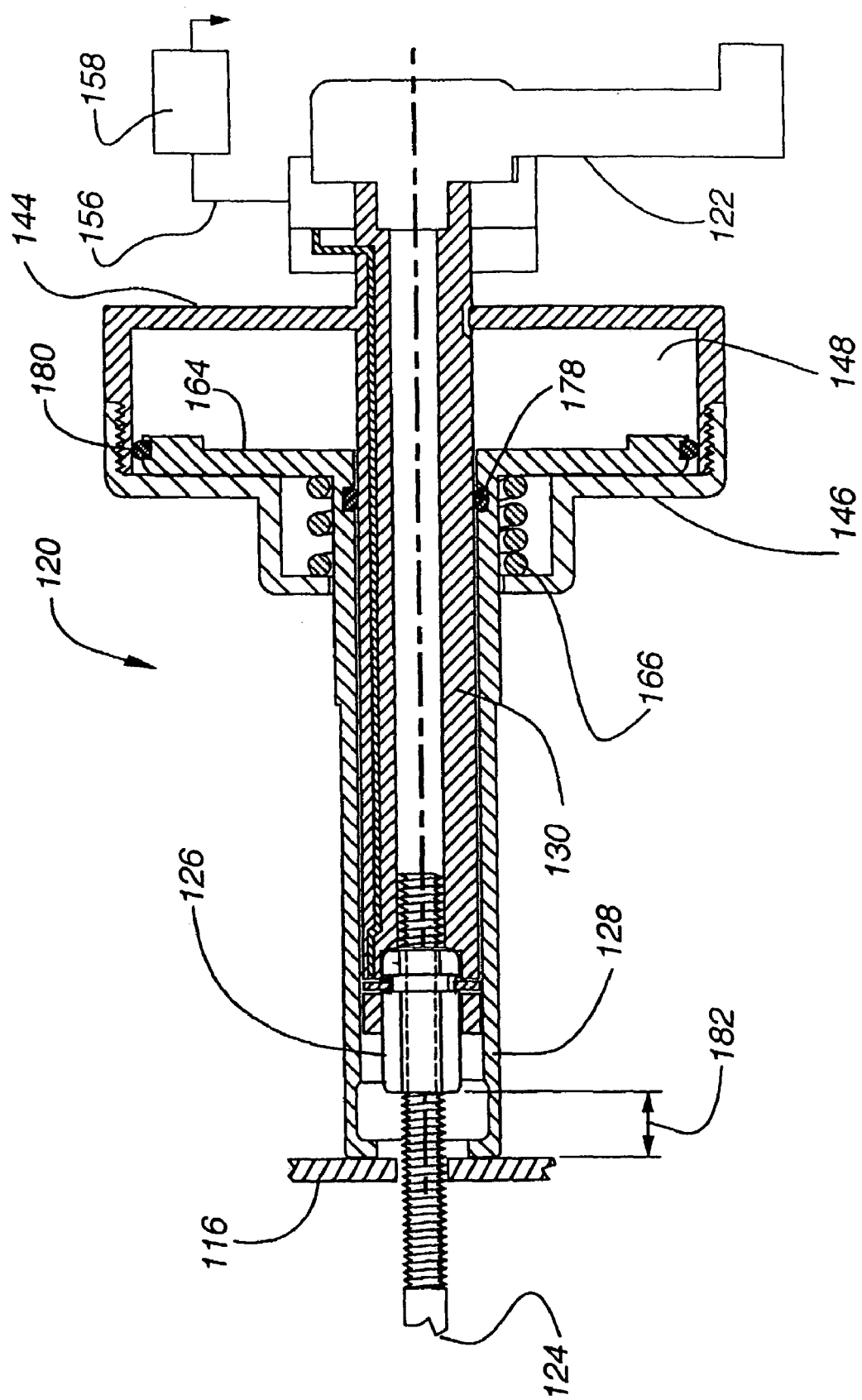
Figure 7:
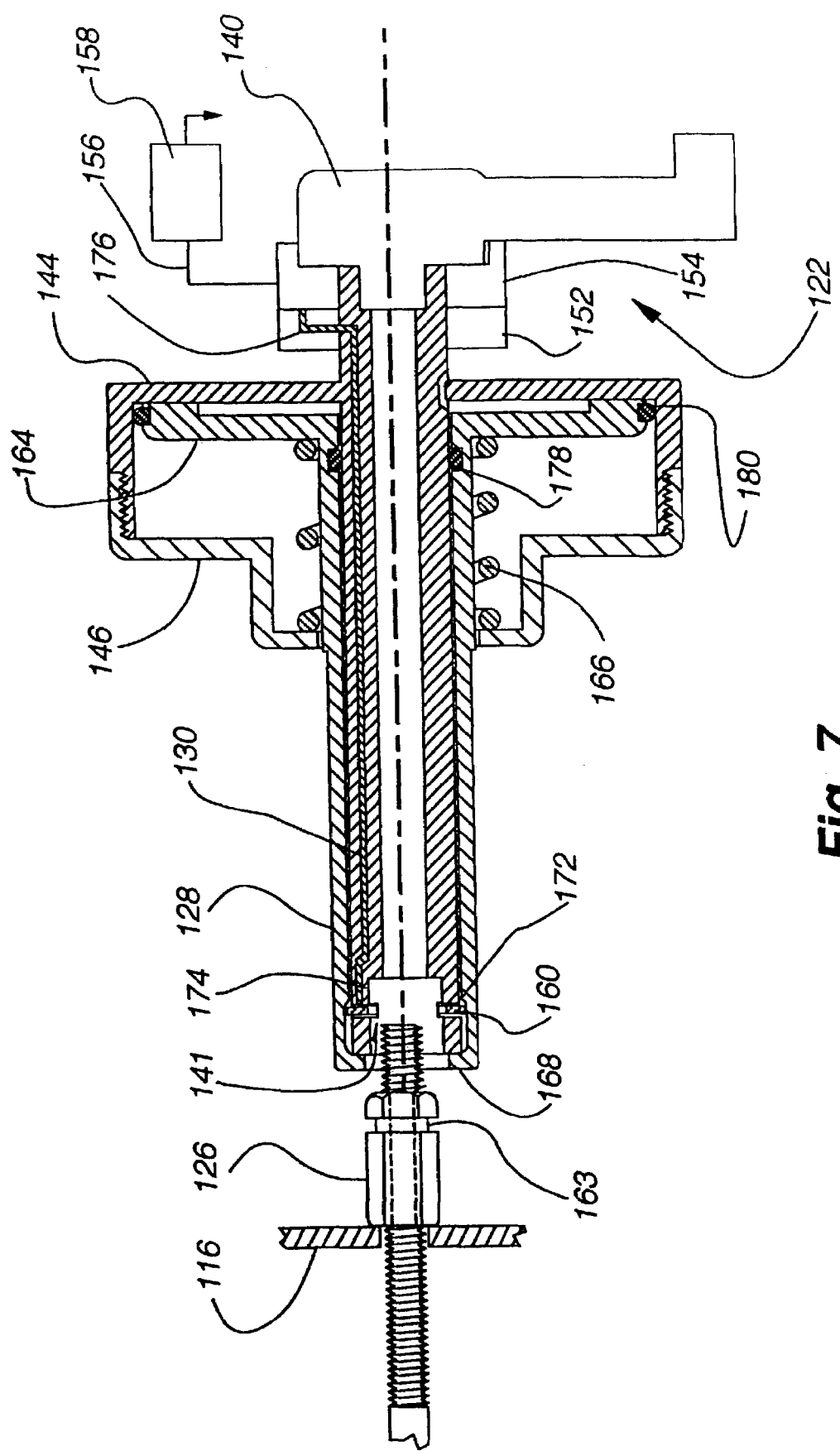
Figures 8A, 8B:
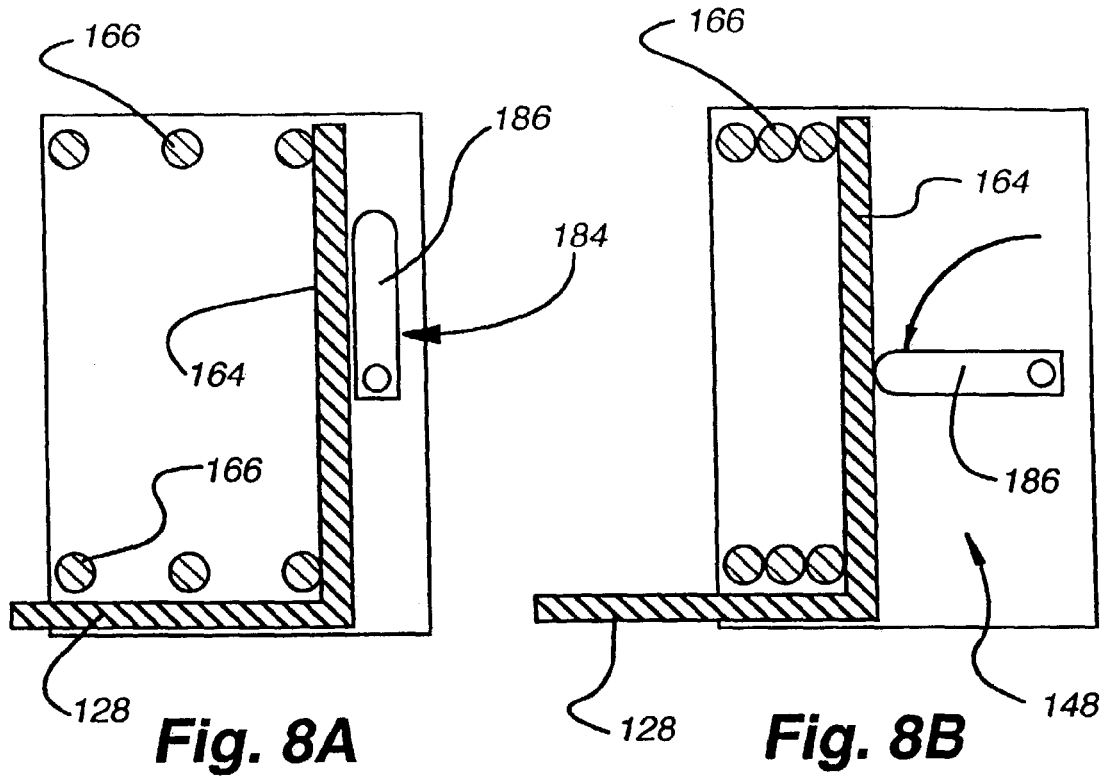
Figures 9A, 9B:
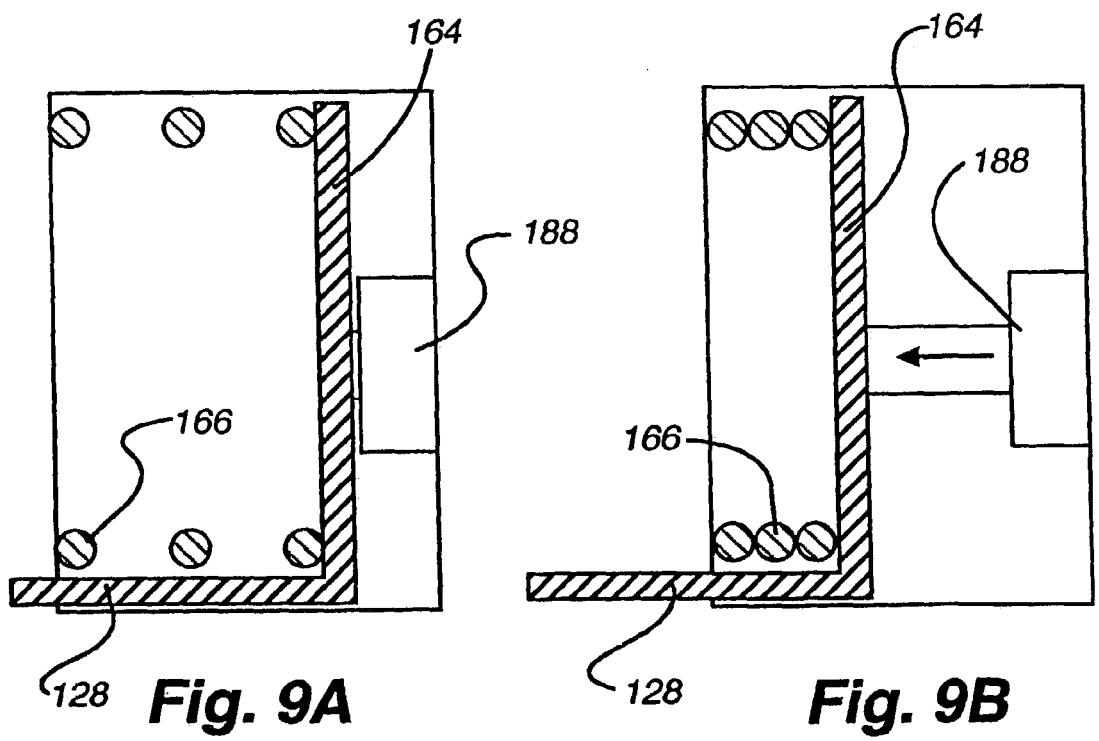
Figure 10:
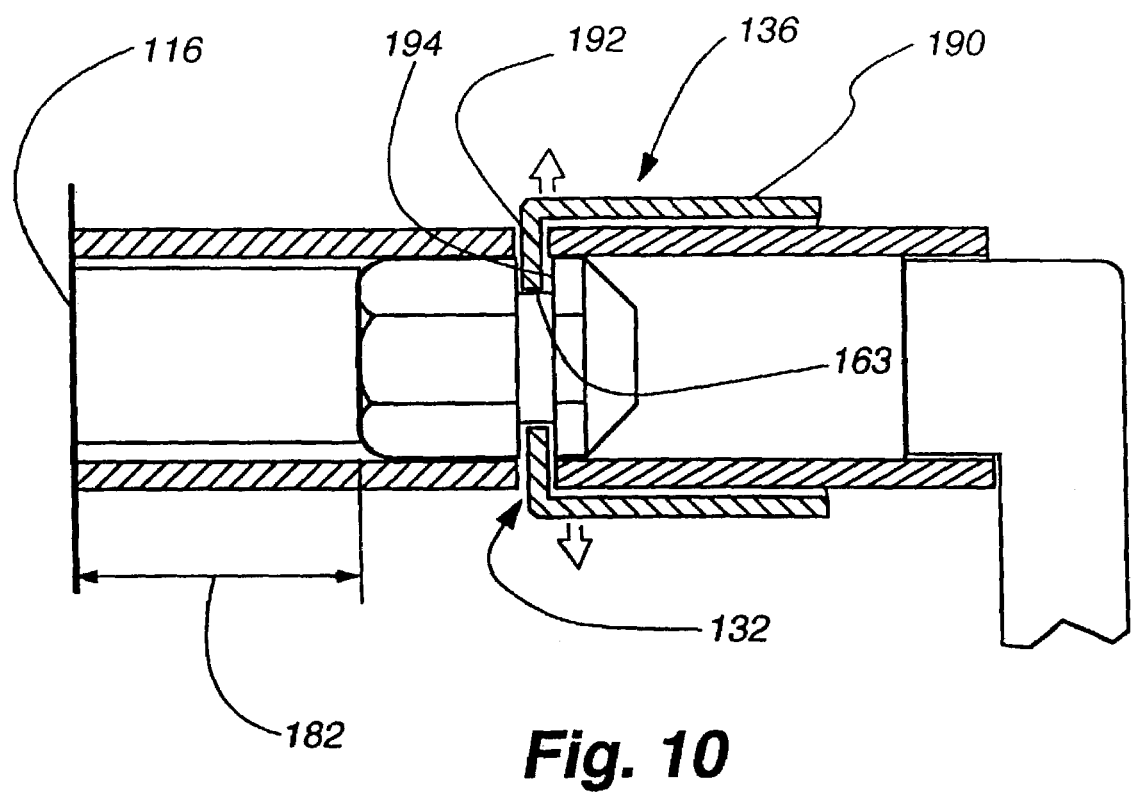
Figure 10A:
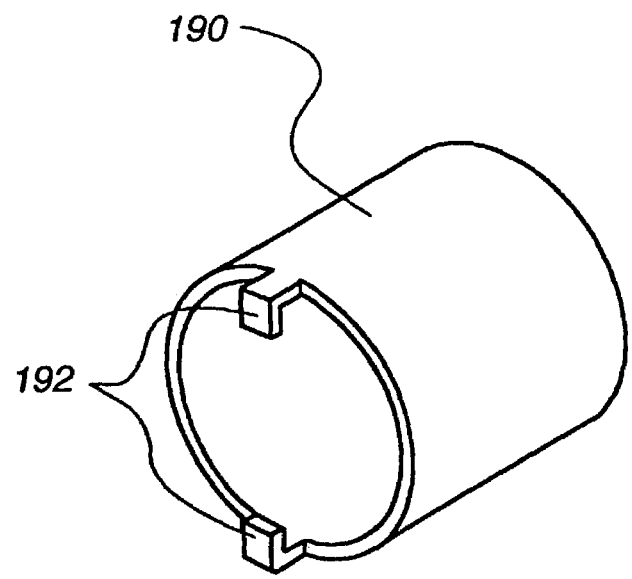
Figure 11:
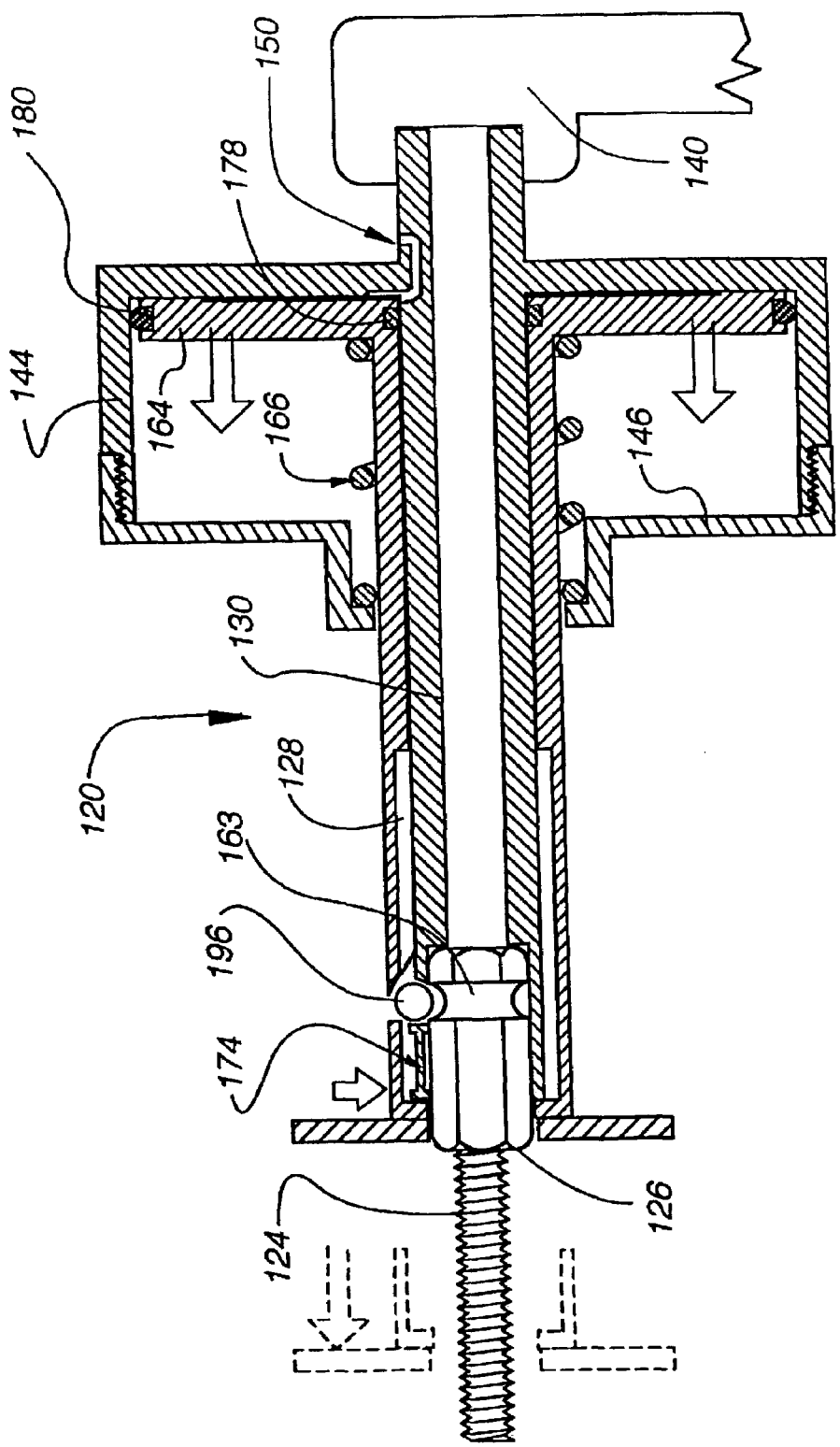
Figure 12:
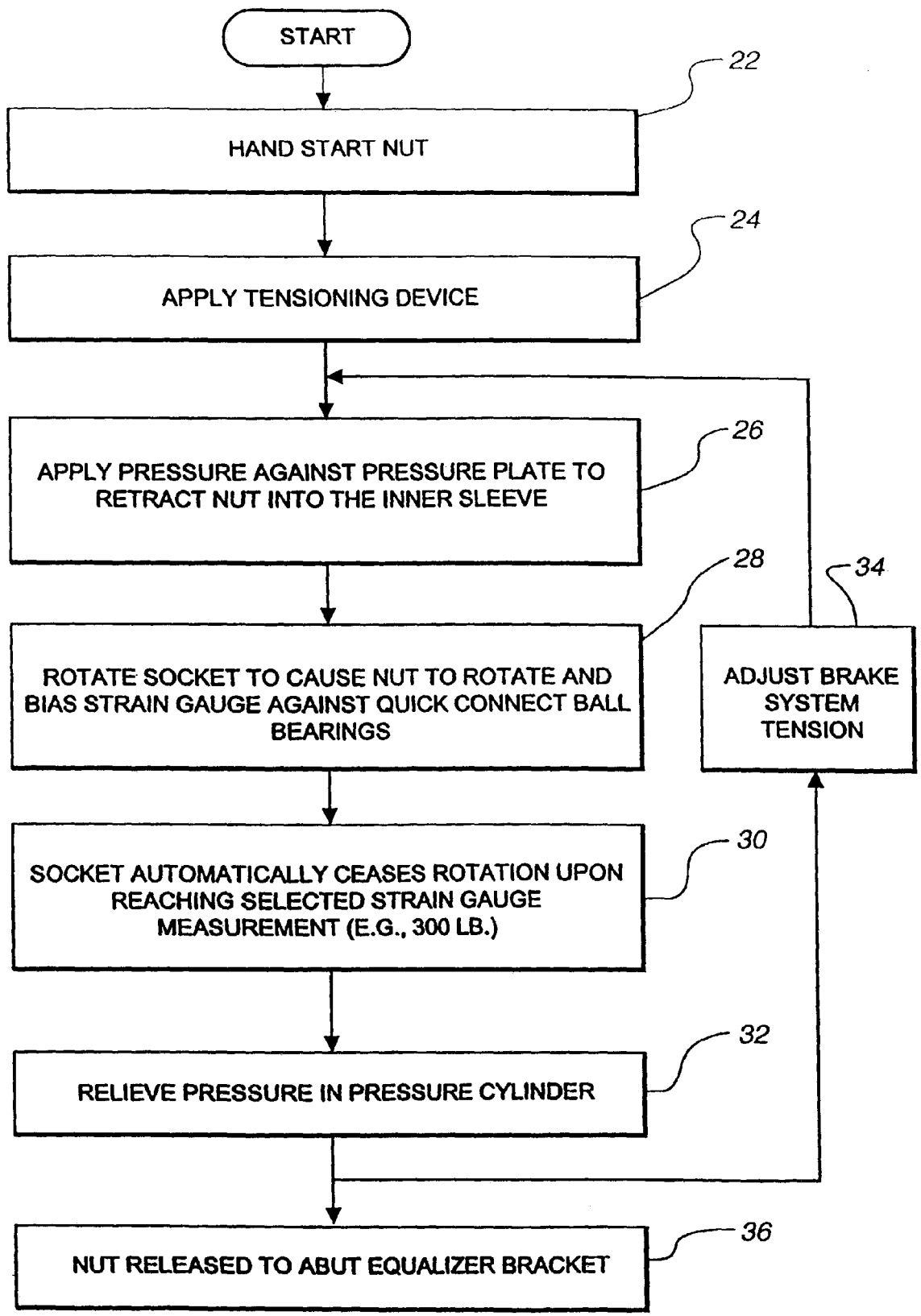
Figure 13:
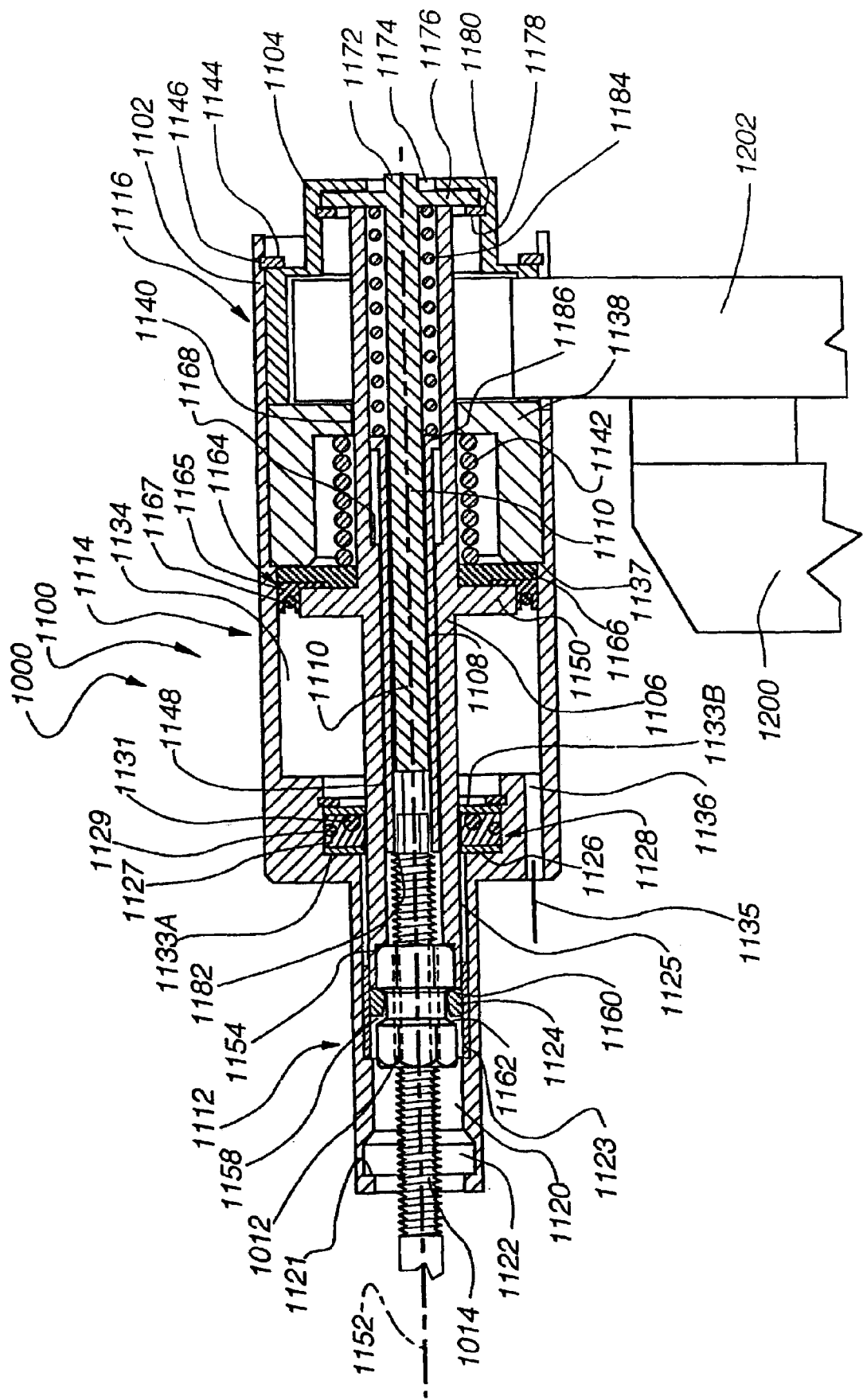
Figure 14:
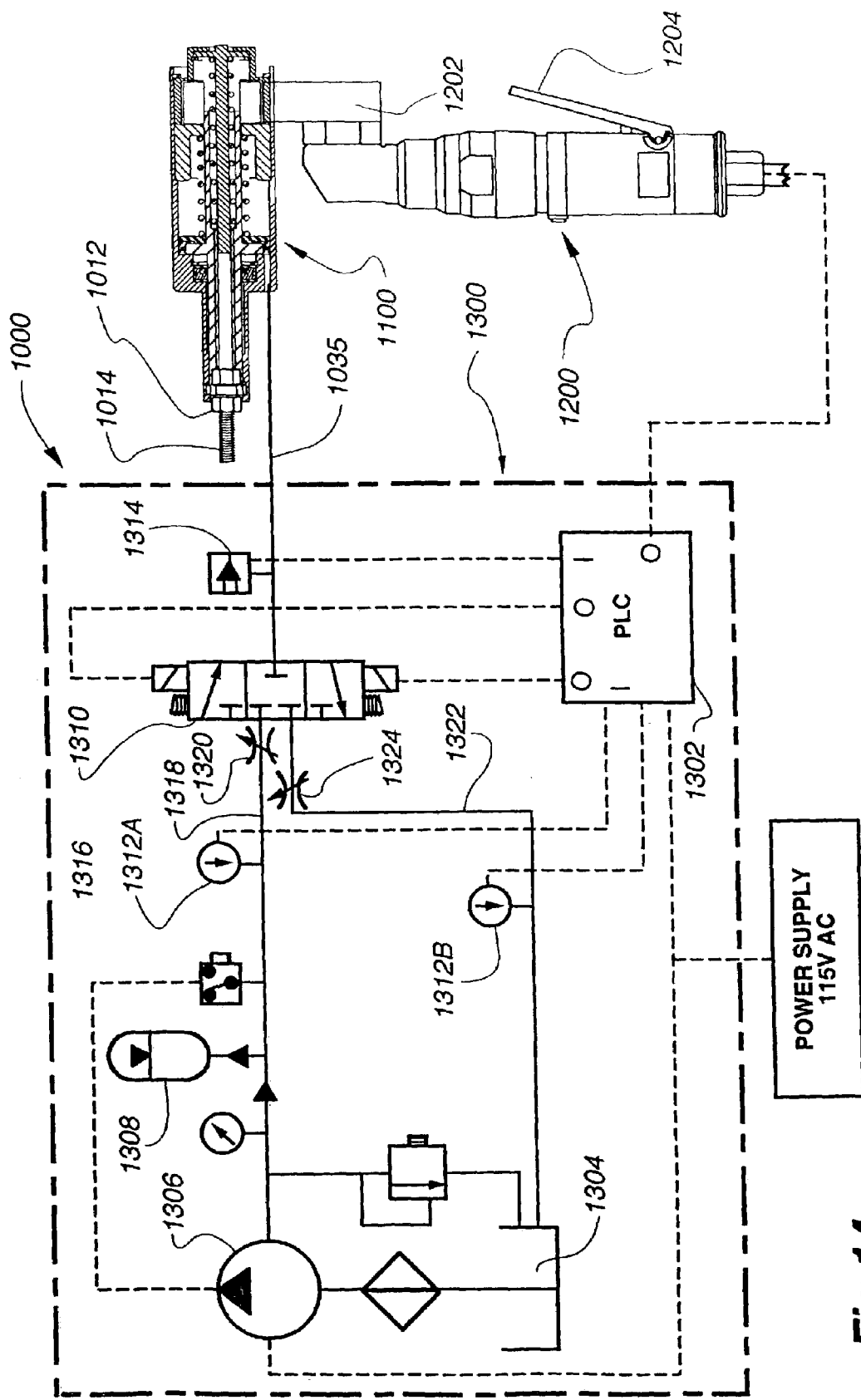
Figure 15:
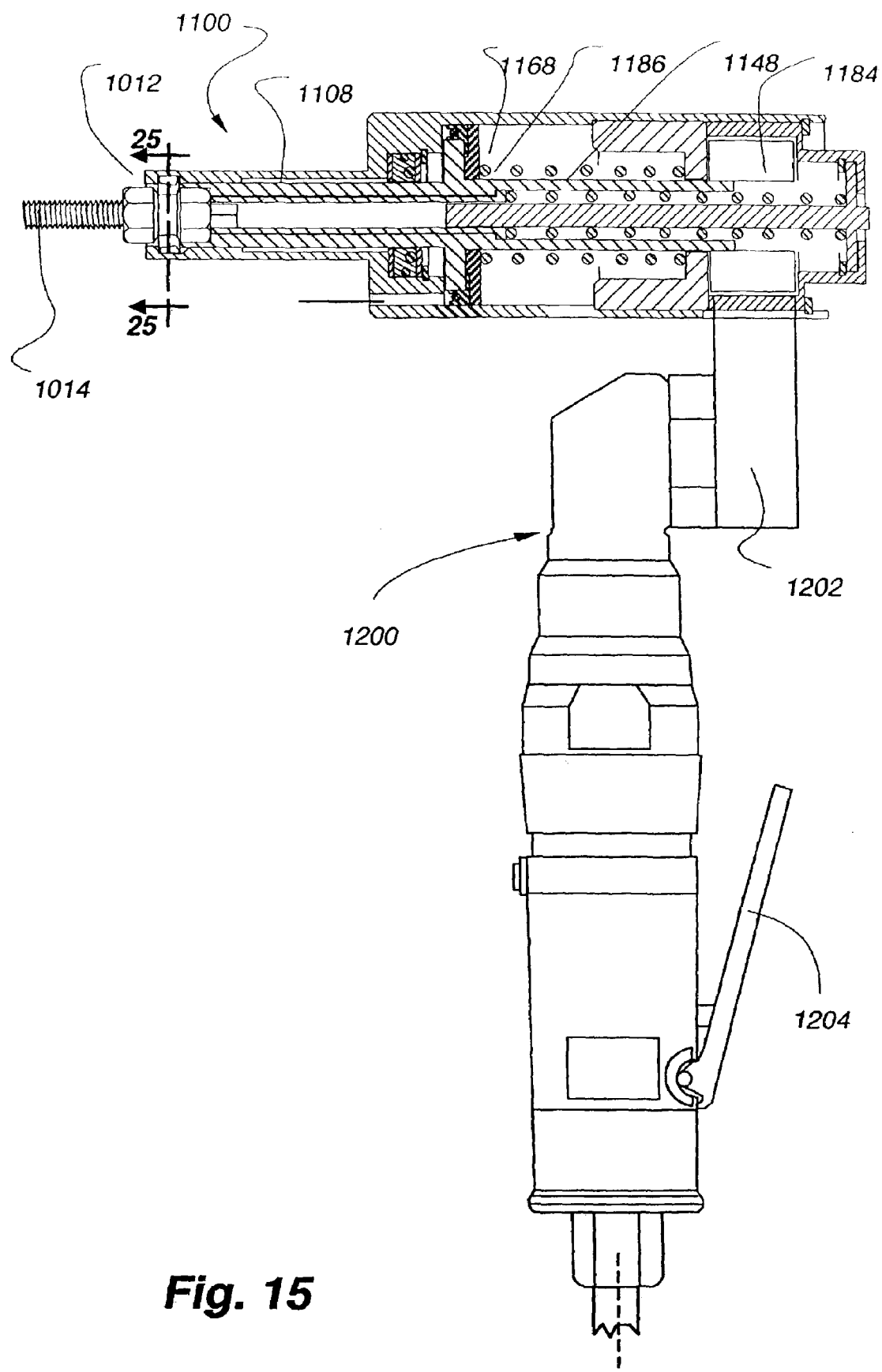
Figure 16:
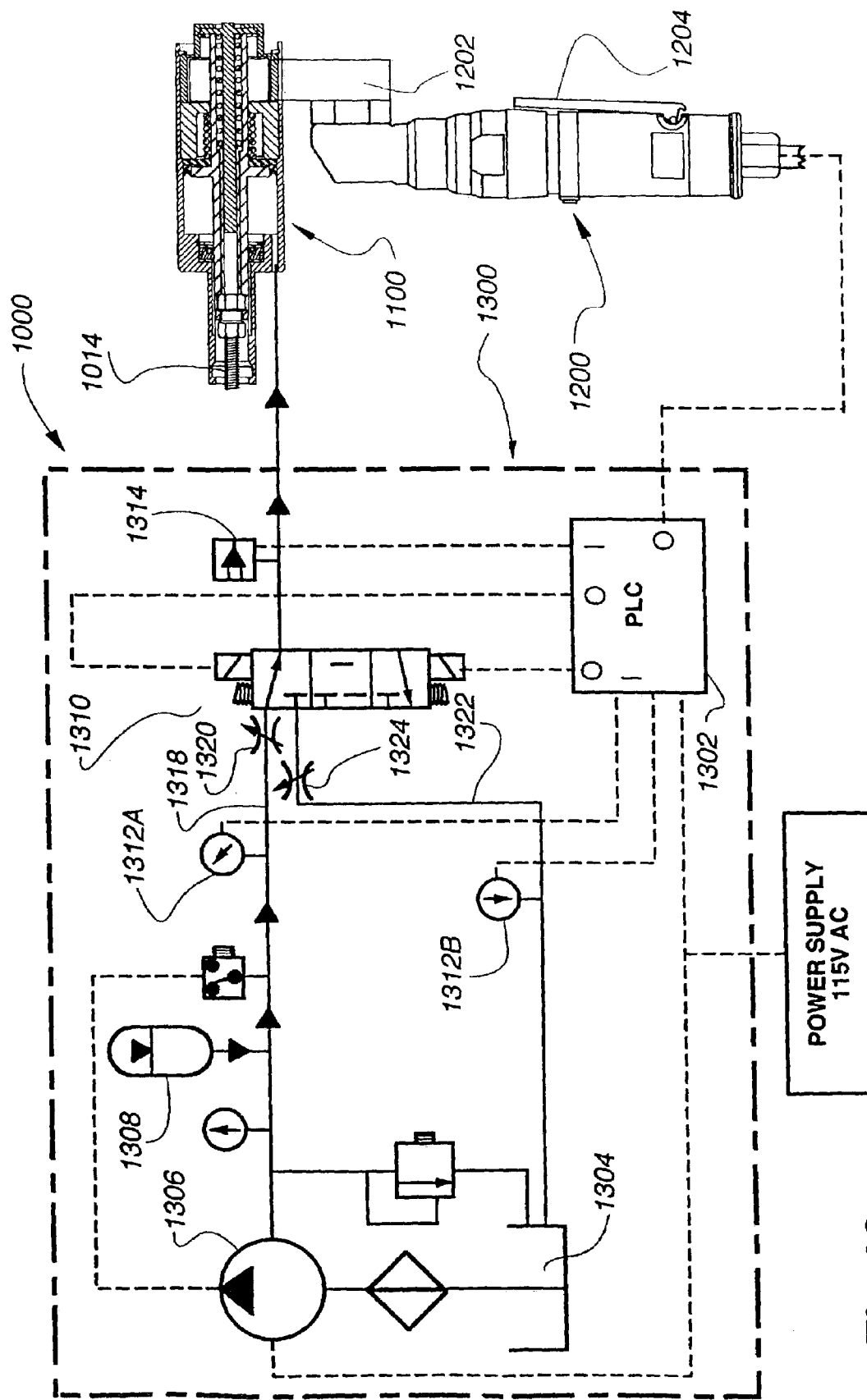
Figure 17:
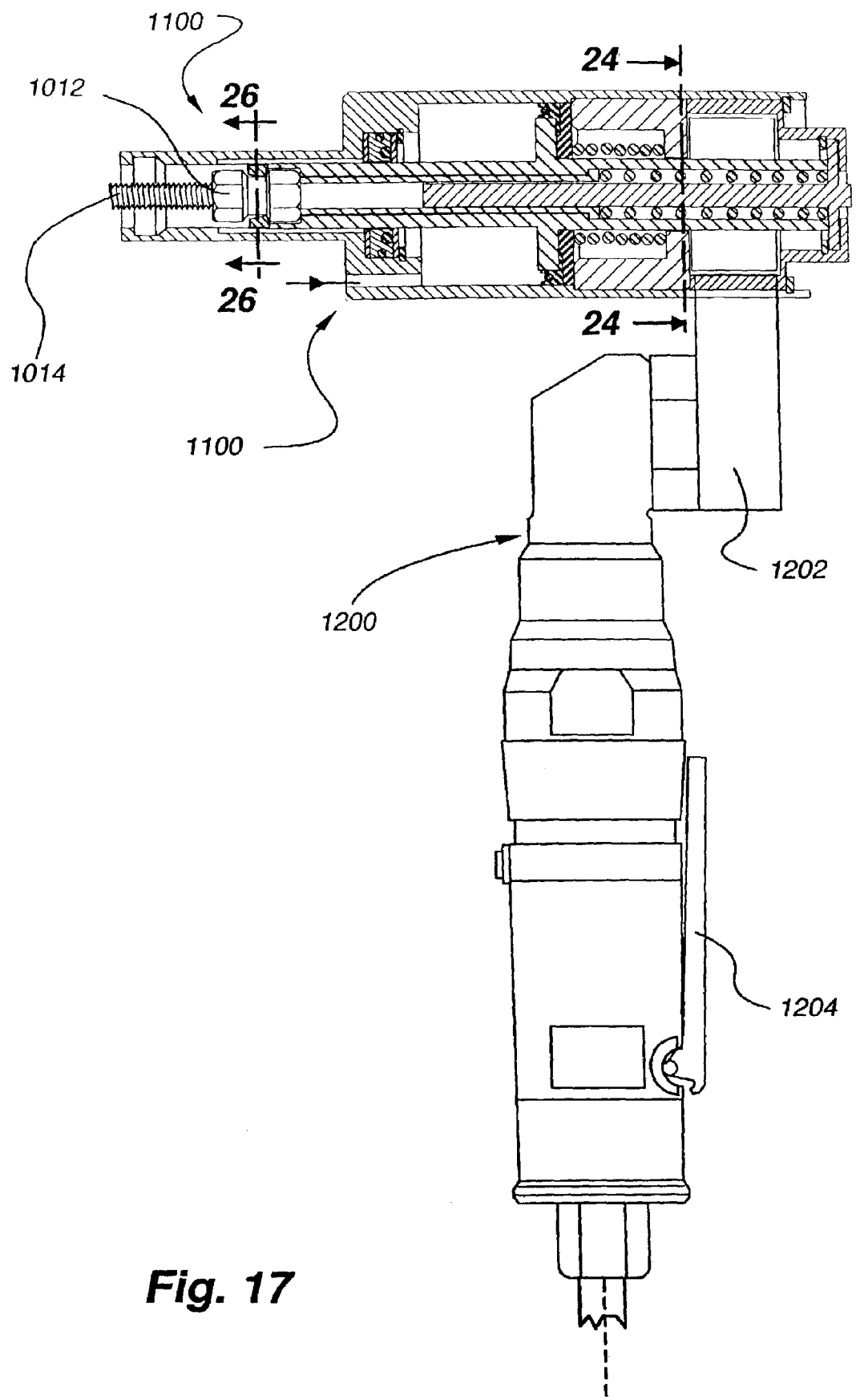
Figure 18:
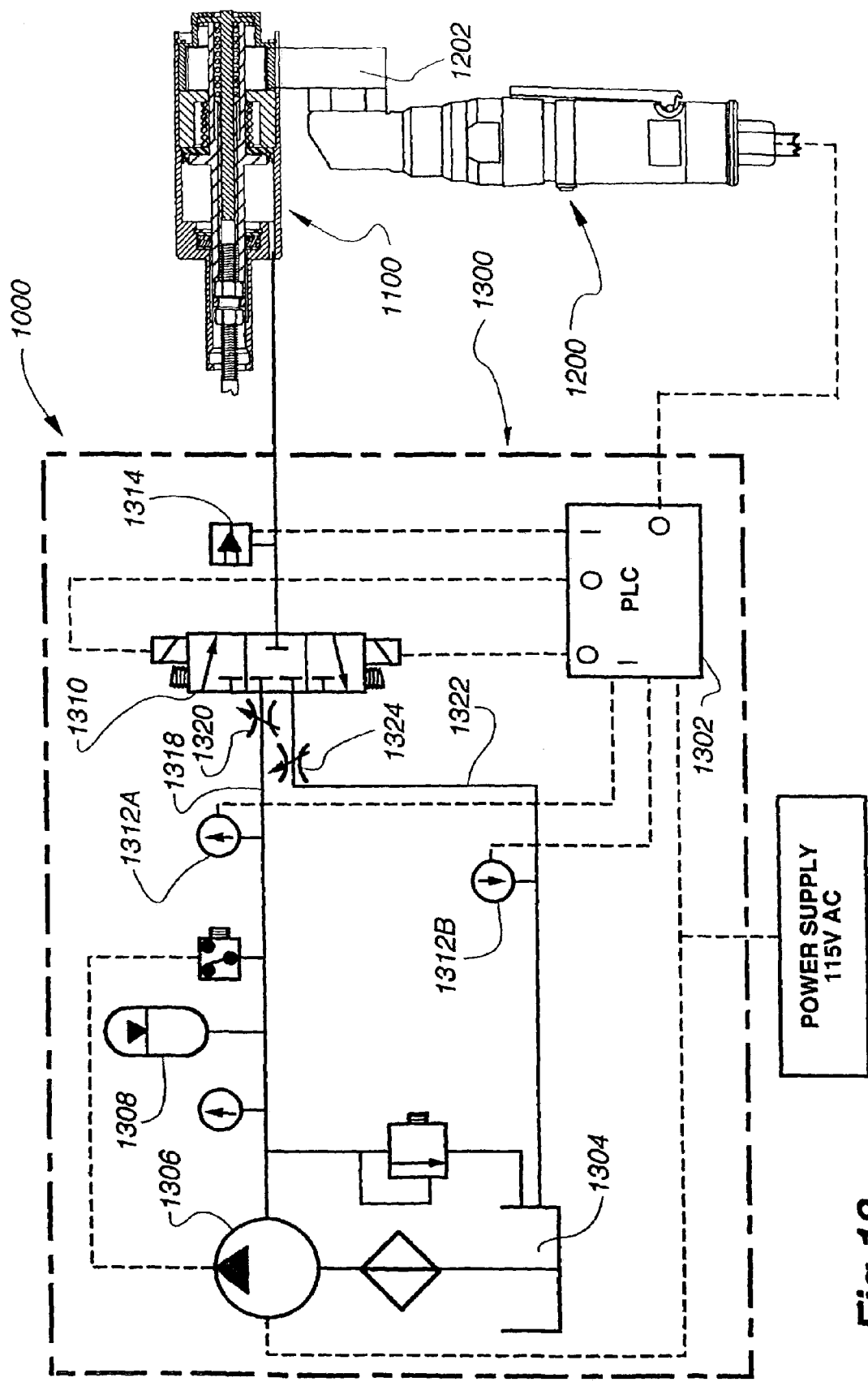
Figure 19:
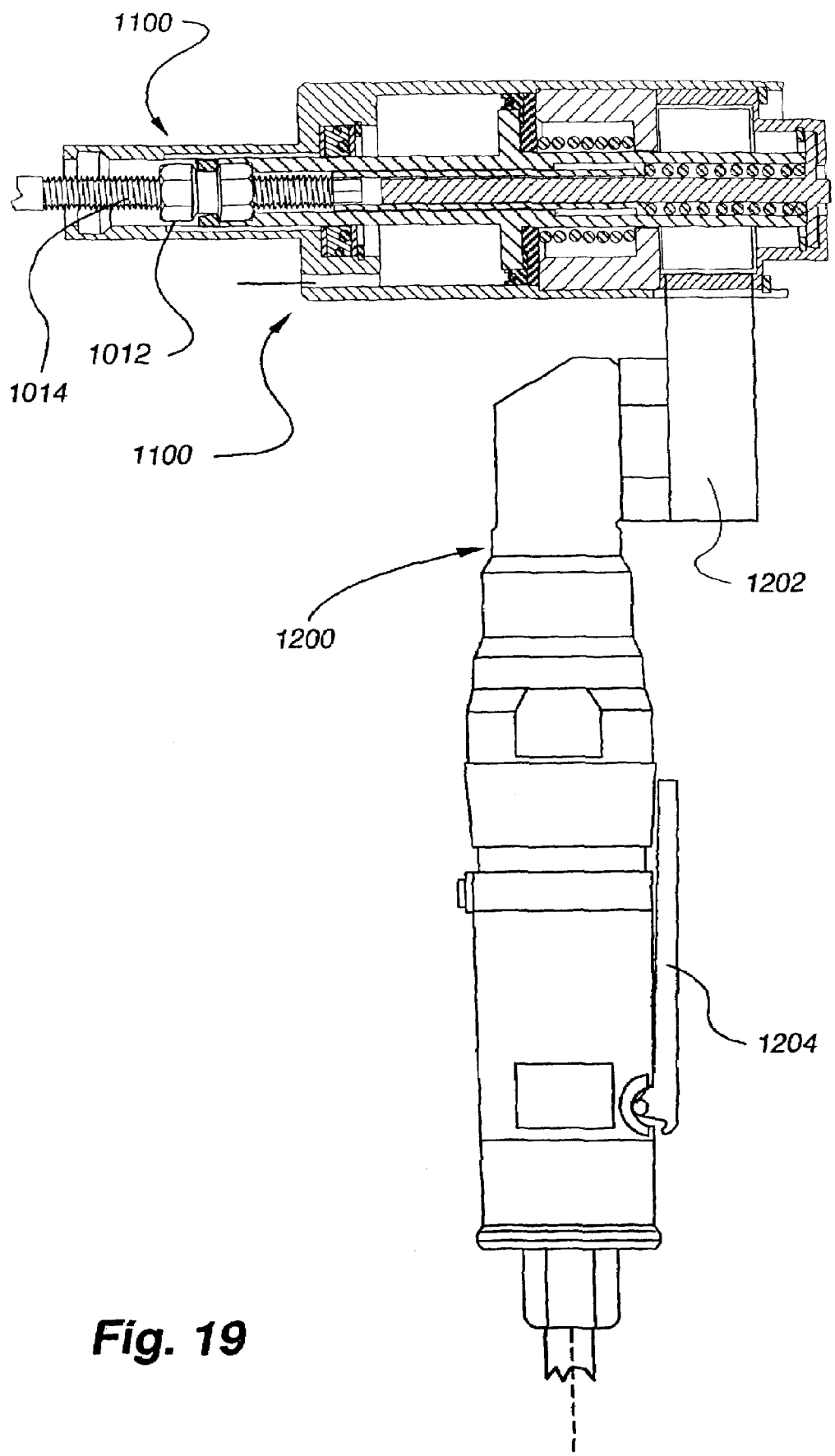
Figure 20:
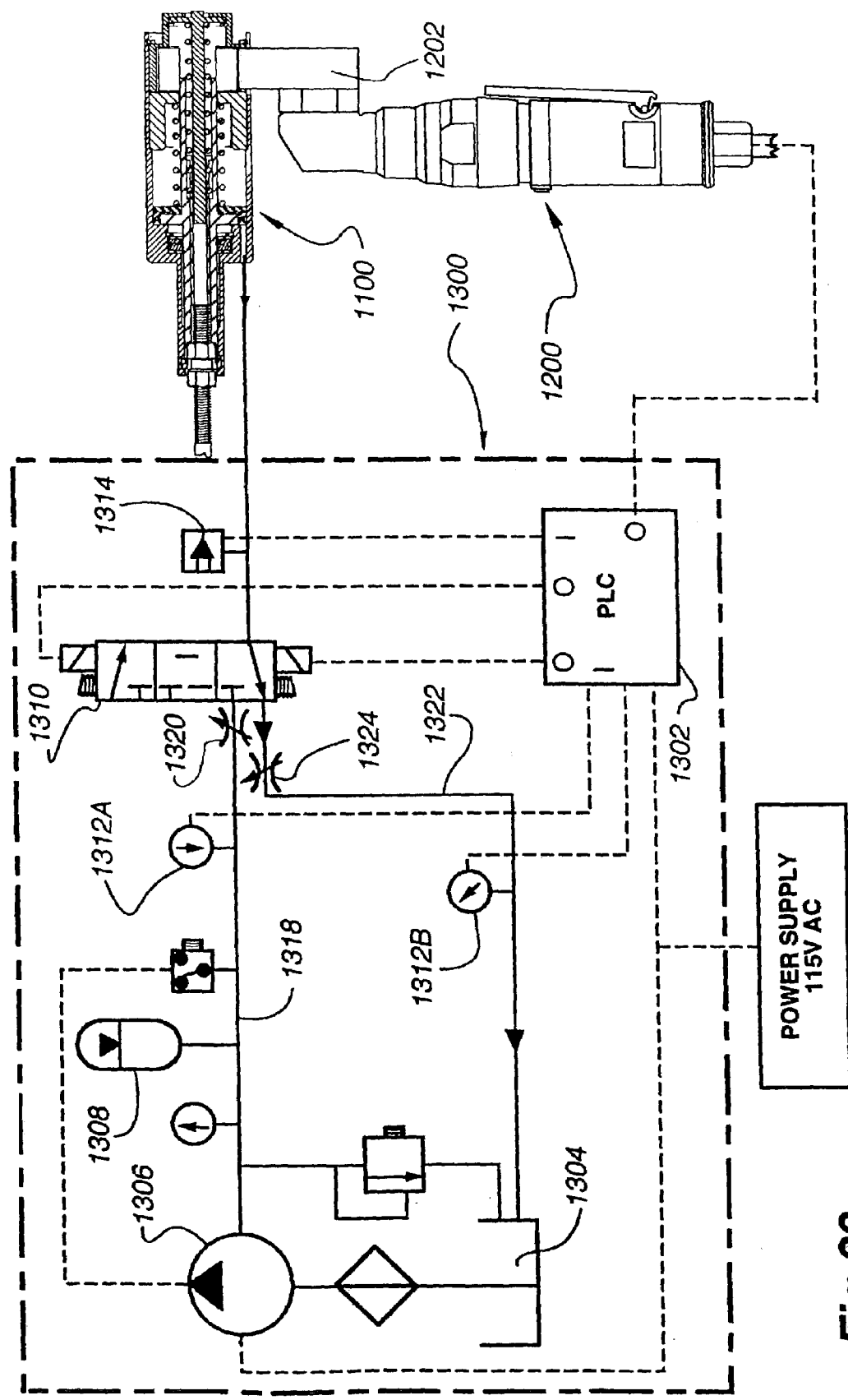
Figures 21, 22:
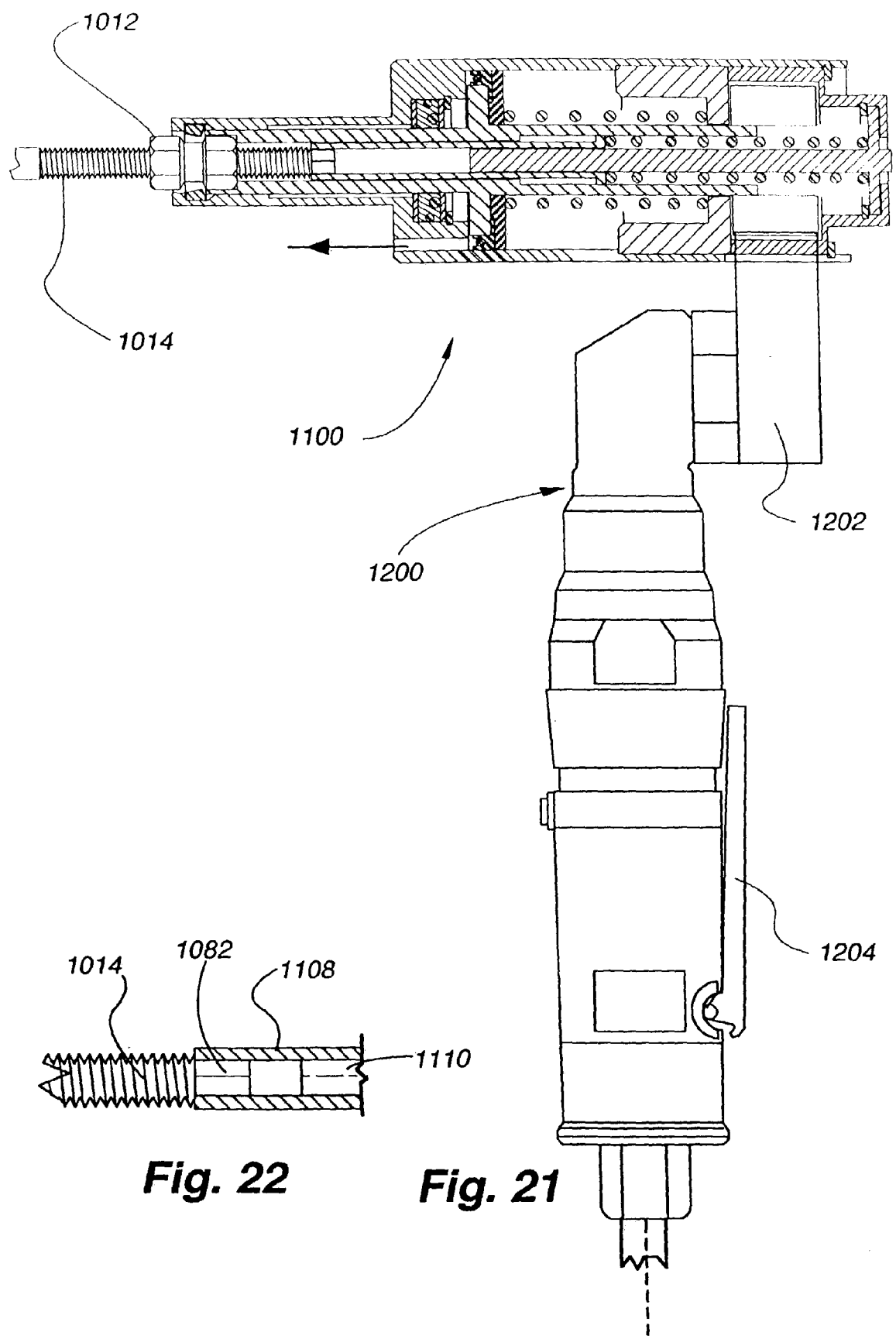
Figure 23:
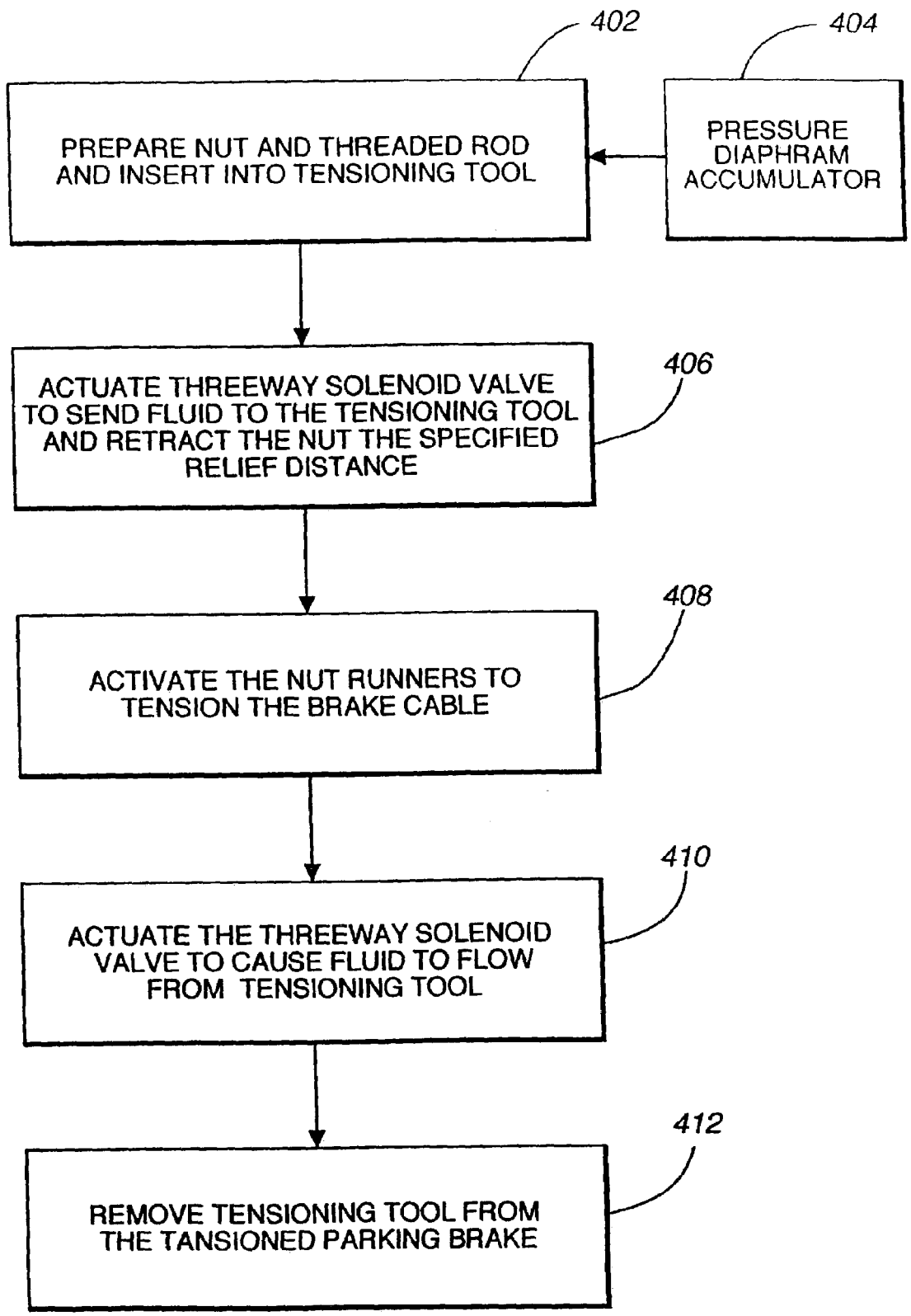
Figure 31:
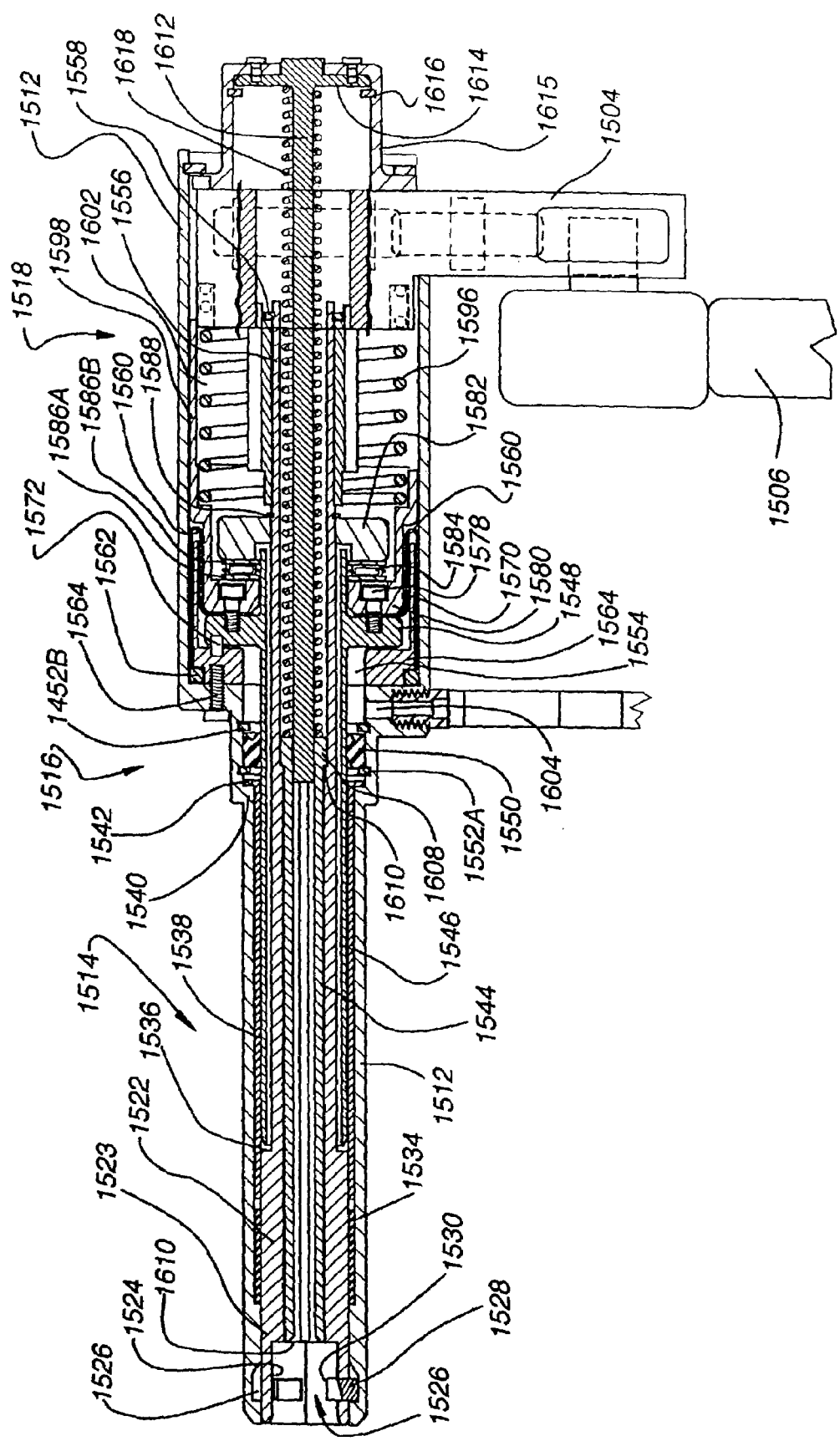
Figure 34:
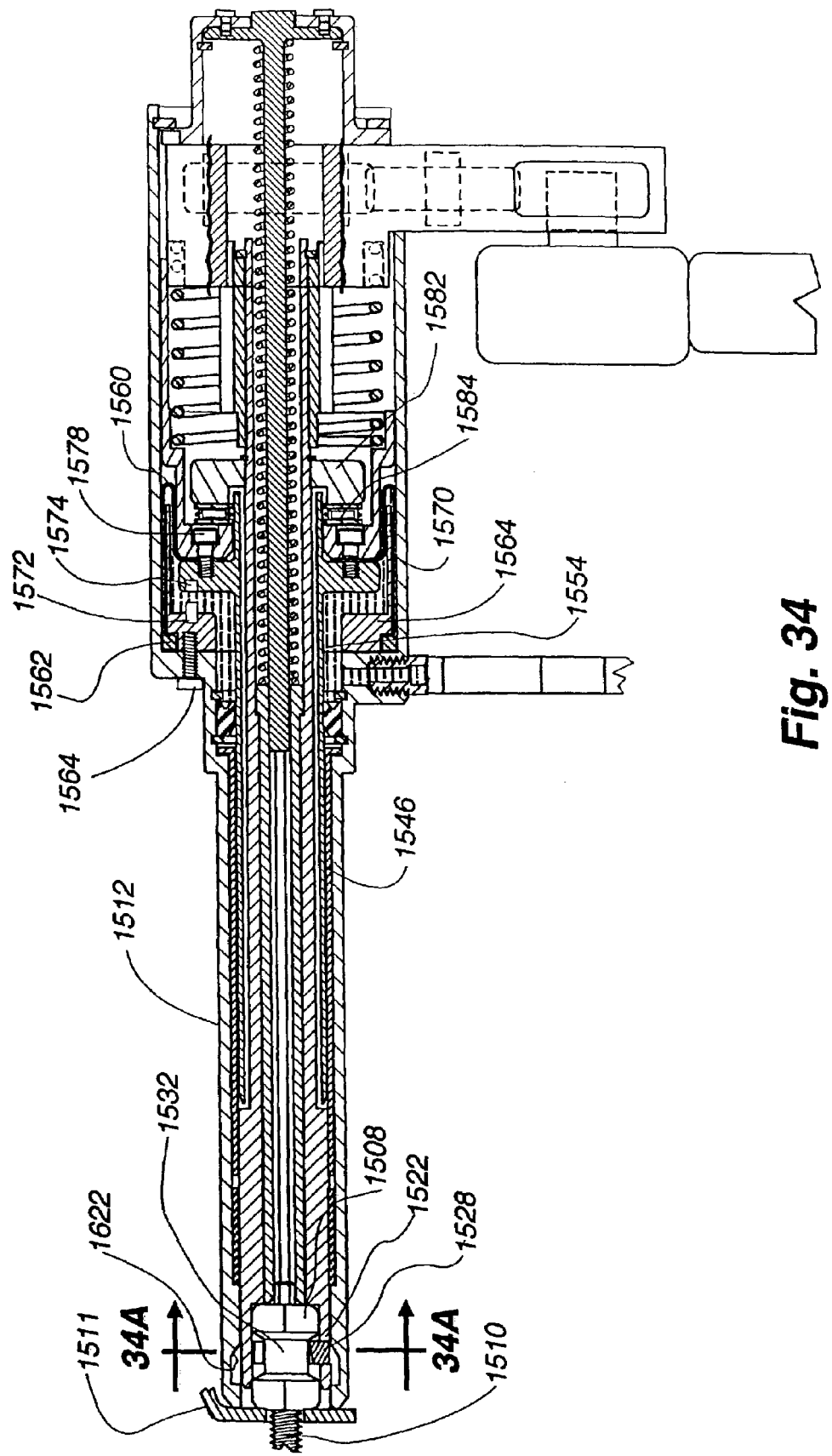
Figure 35:
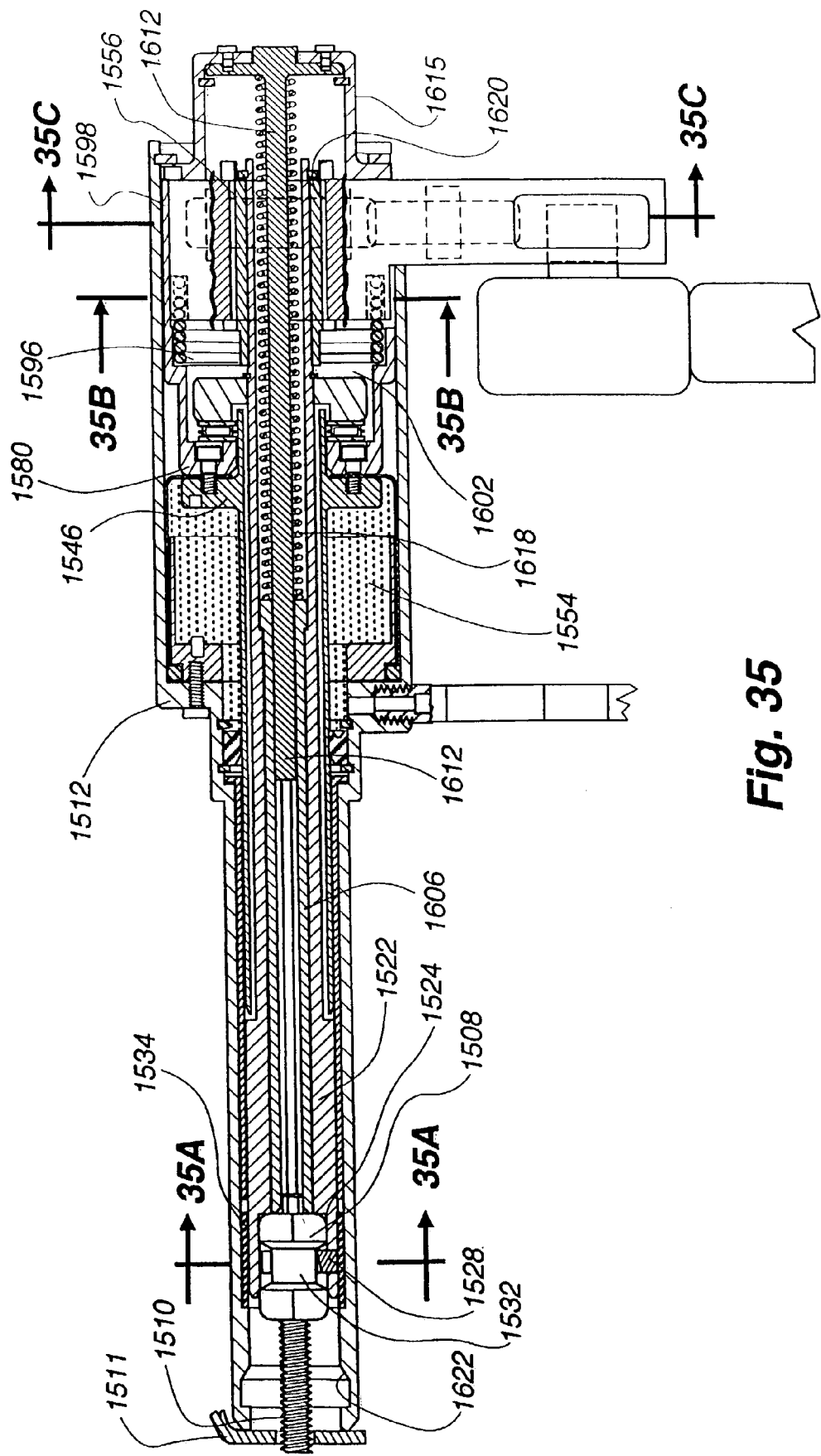
Figure 36A:
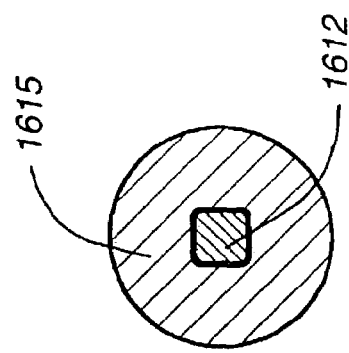
Figure 35C:
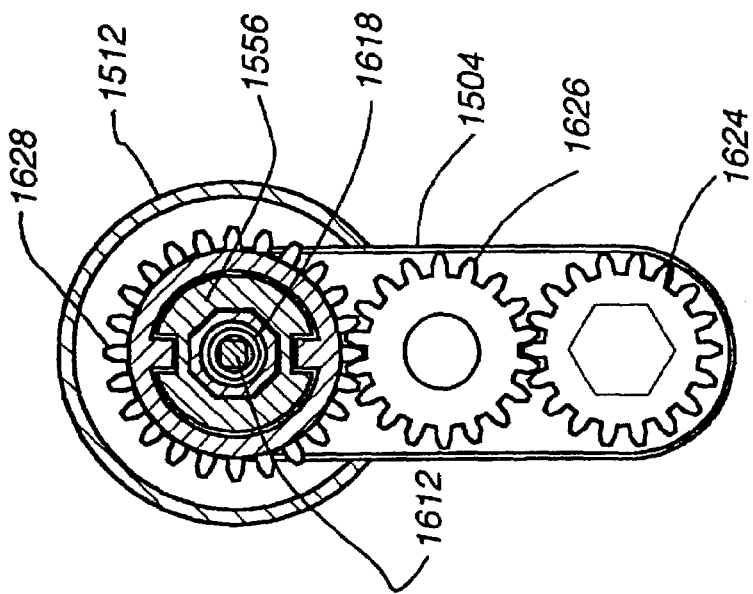
Figure 35B:
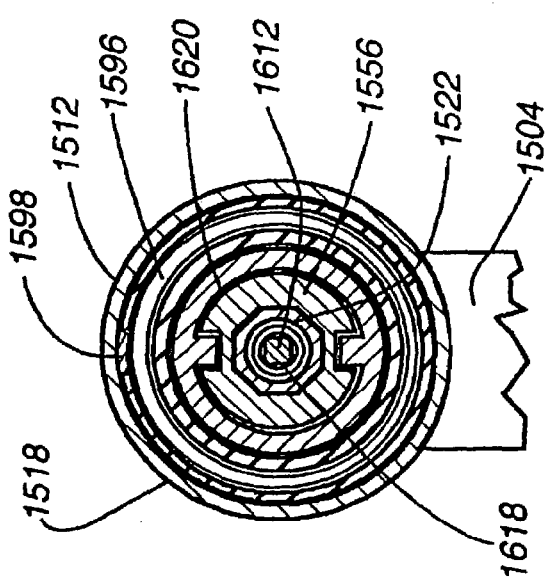
Figure 36:
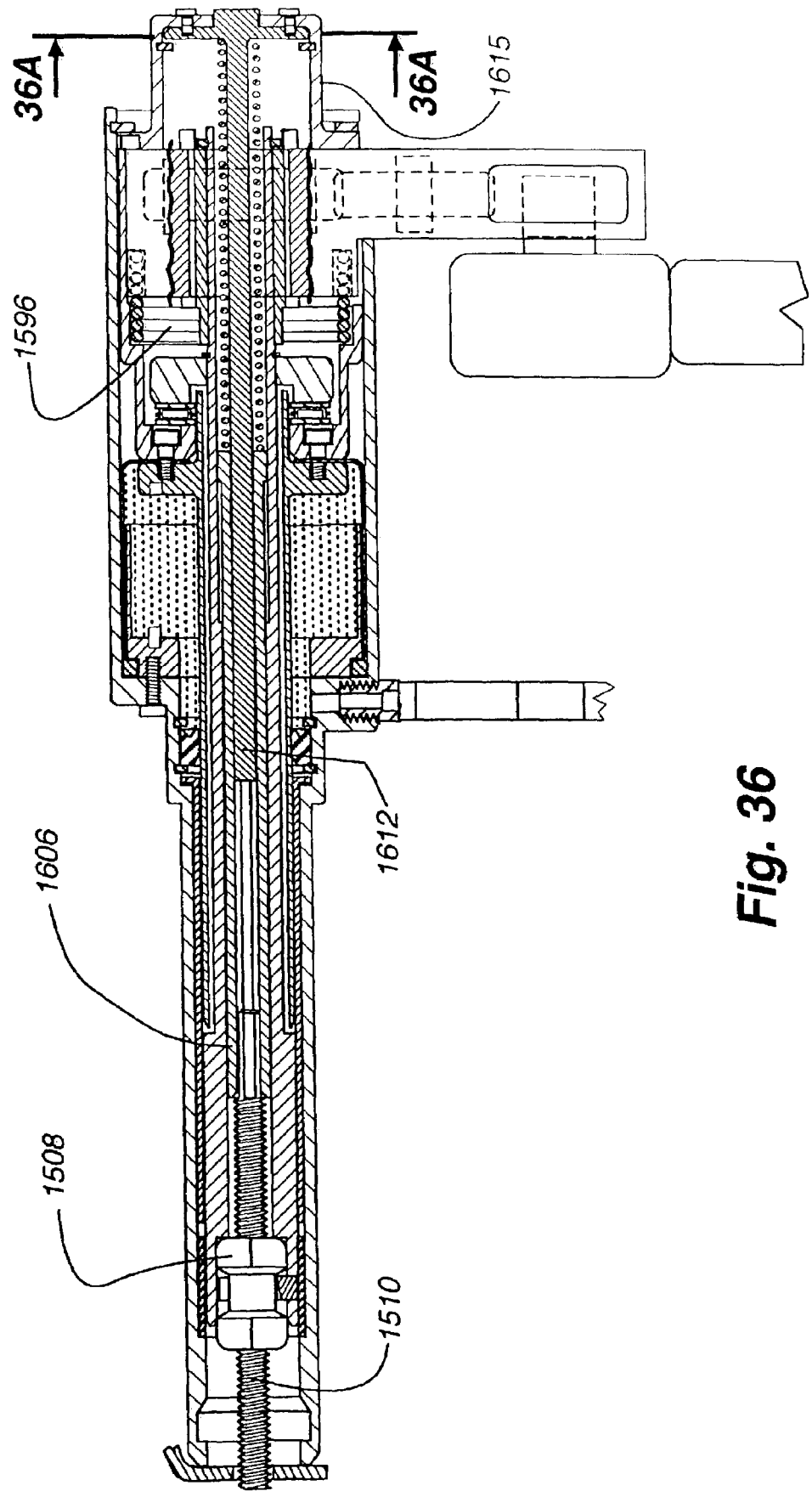
Figure 39A:
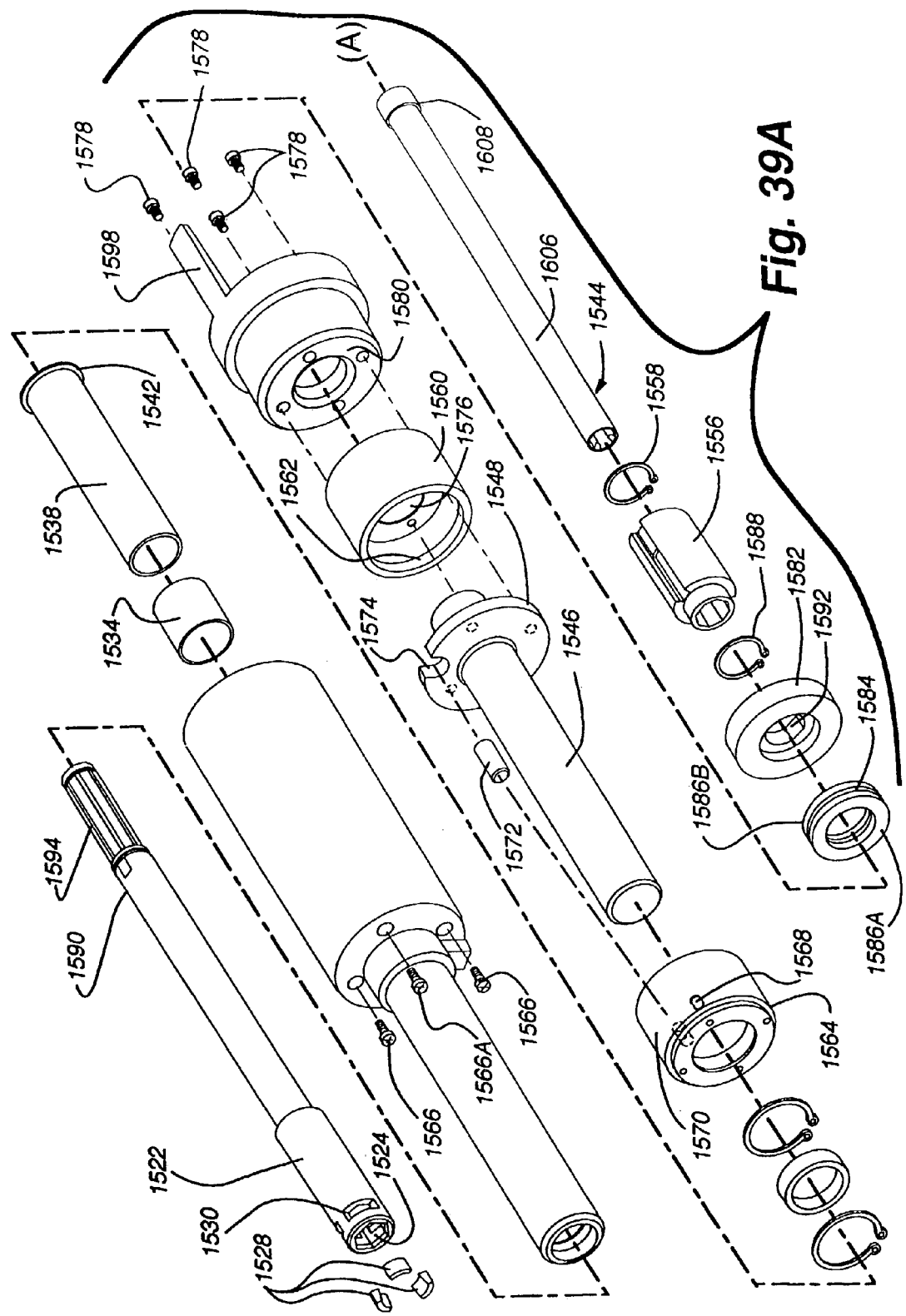
Figure 40:
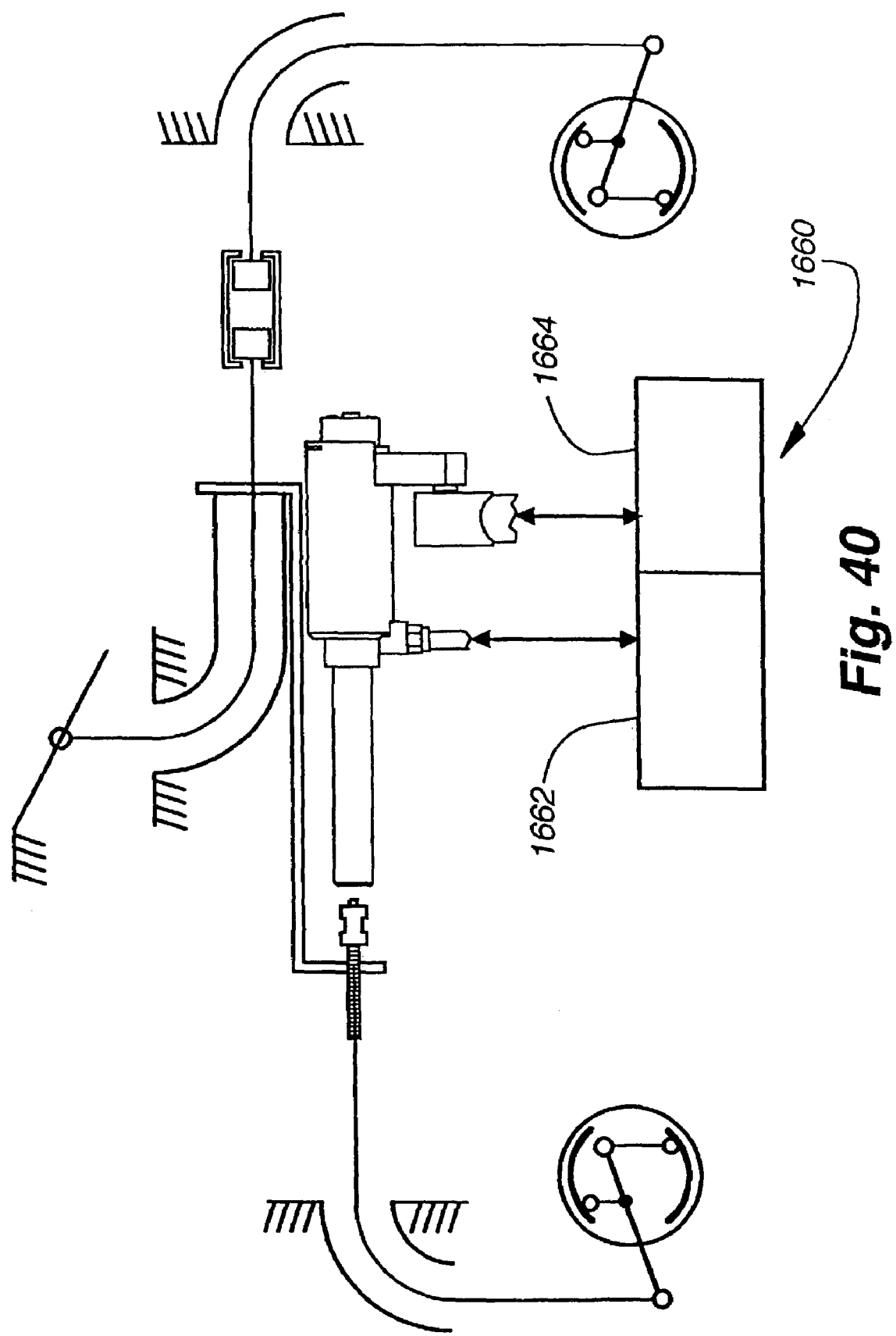
Figure 41:
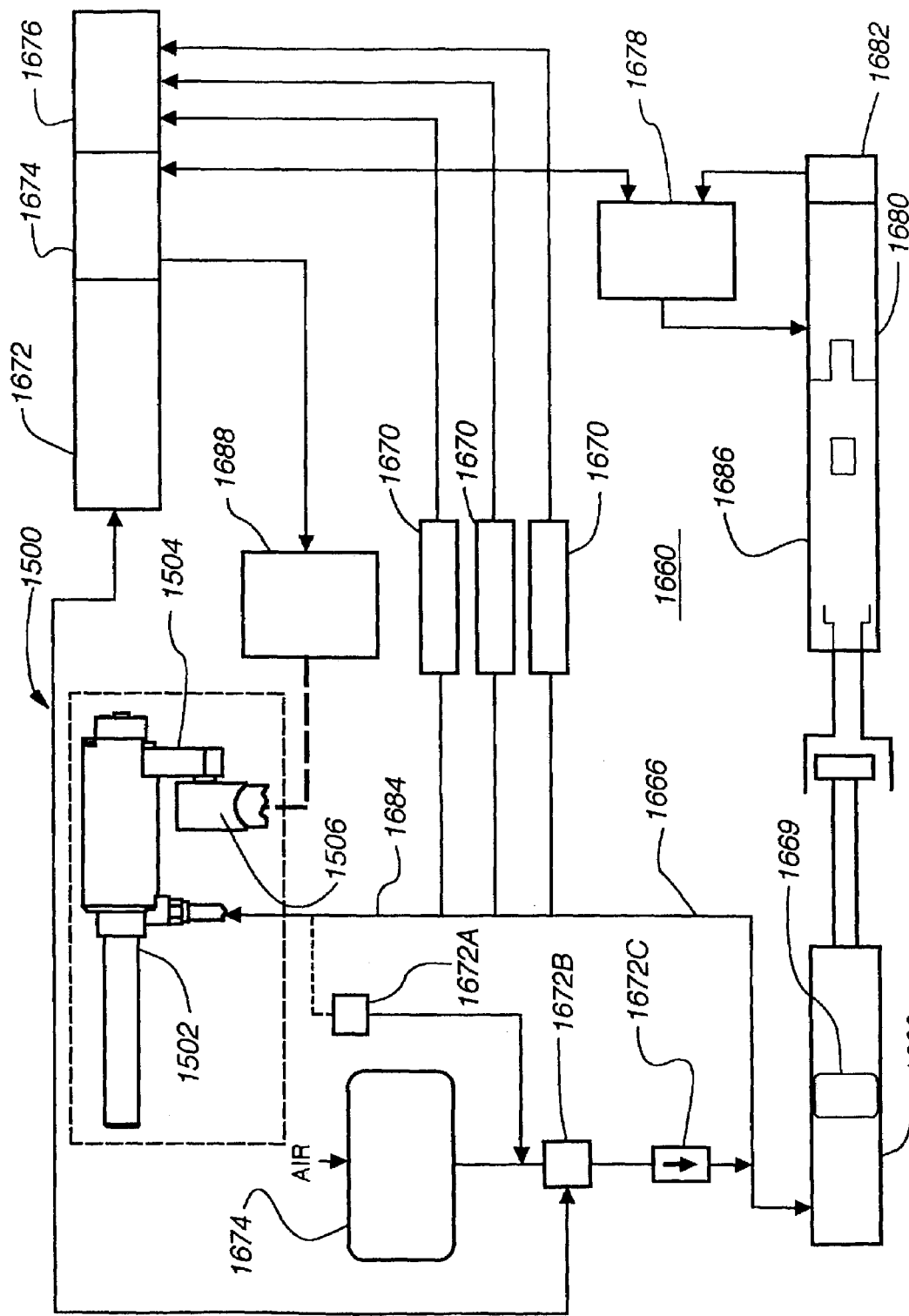
Figure 42:
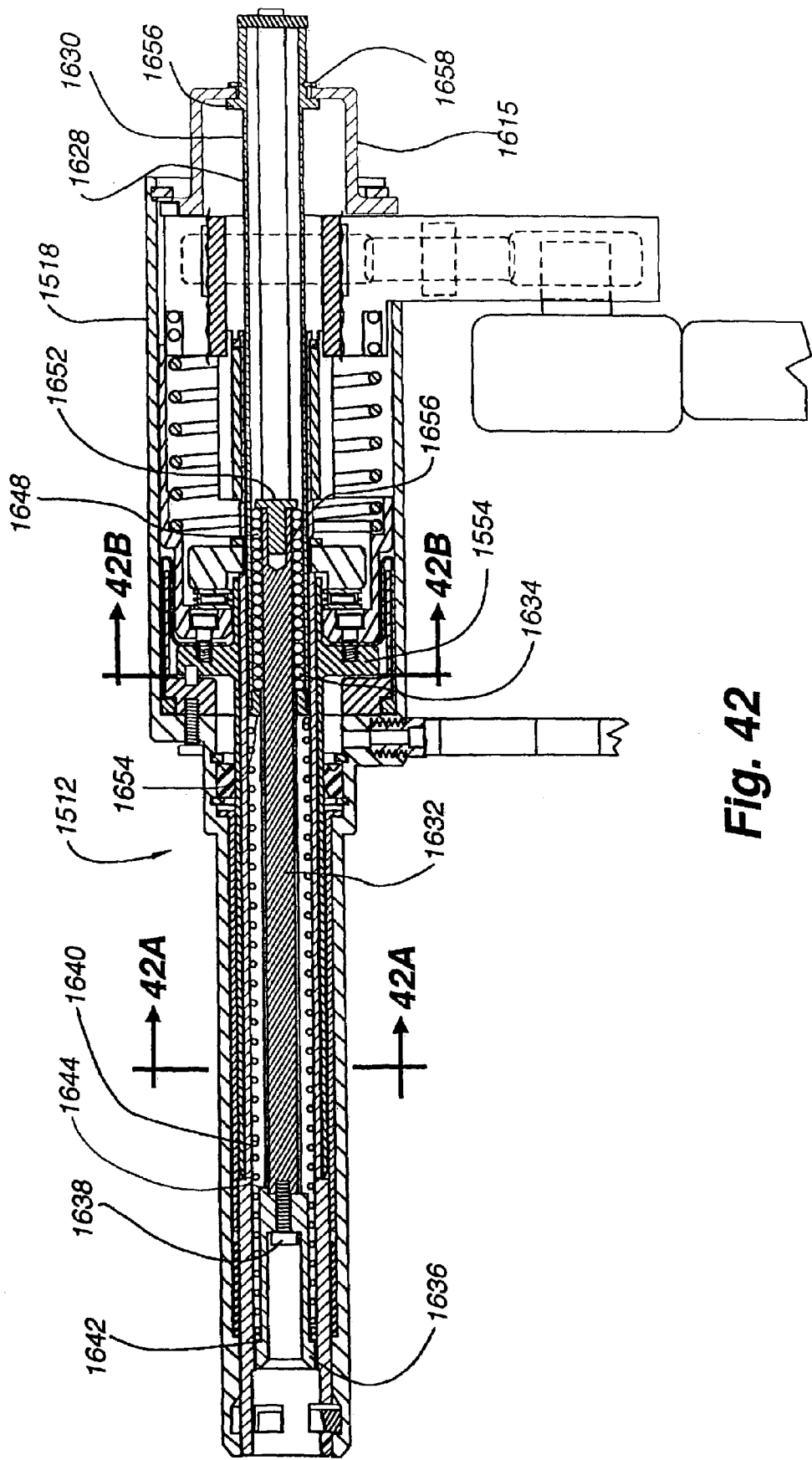
Figure 43:
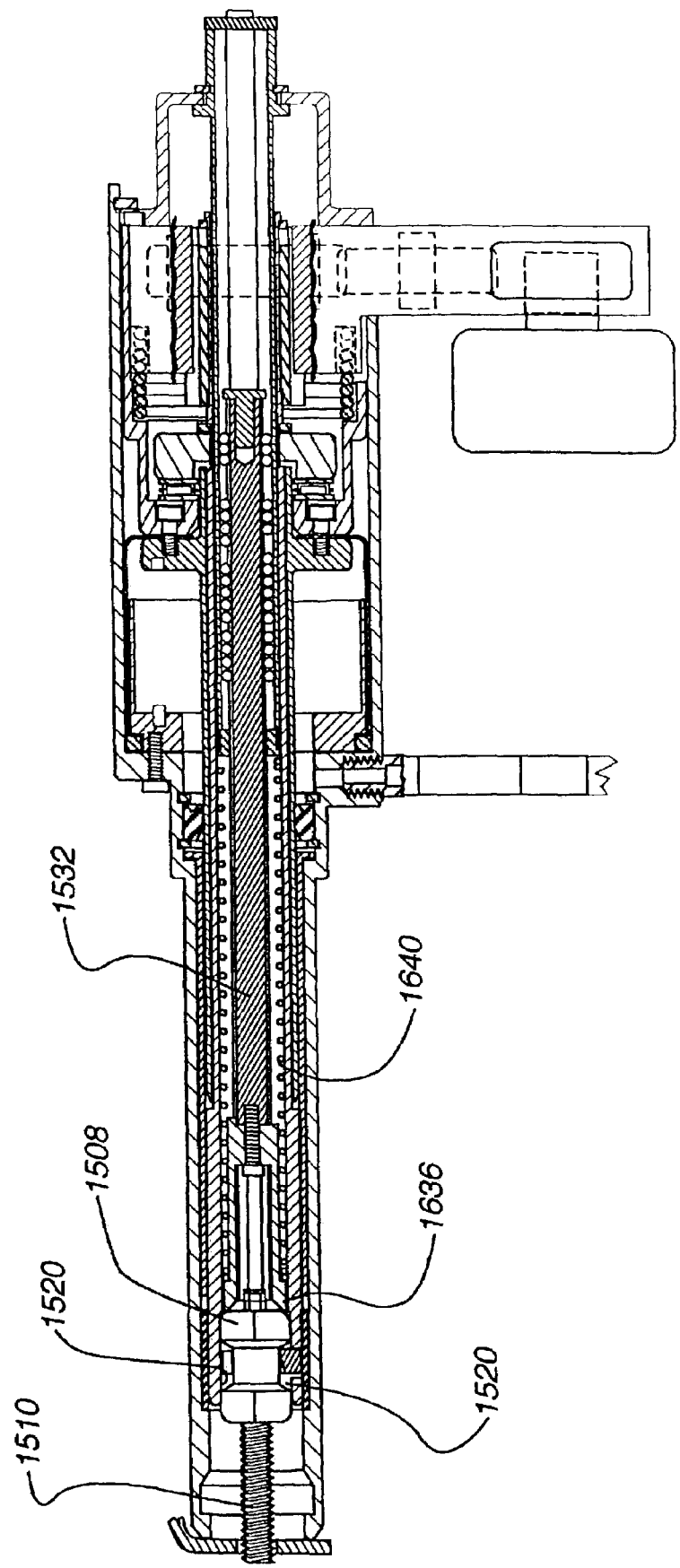

FIG. 3 is a representative section view of a first embodiment of the brake system tensioning tool prior to engagement with a nut and prior to tensioning the brake system, in accordance with the present invention;

FIG. 3A is a front view of a snap ring for use with an embodiment of the brake tensioning tool;

FIG. 4 is a representative section view of the first embodiment of the tool in engagement with the nut and prior to tensioning the brake system, in accordance with one embodiment of the present invention;

FIG. 5 is a representative section view of the first embodiment of the tool in engagement with the nut and retracting the nut and associated rod into the tool the relief distance, in accordance with the present invention;

FIG. 6 is a representative section view of the first embodiment of the tool in engagement with the nut threaded on the rod to tension the brake system by the relief distance, in accordance with the present invention;

FIG. 7 is a representative section view of the first embodiment of the tool after releasing the nut and after tensioning the brake system, in accordance with the present invention;

FIGS. 8A and 8B are partial representative section views of an alternative embodiment of a pressure plate actuation apparatus for use in an embodiment of the brake tensioning tool;

FIGS. 9A and 9B are partial representative section views of a second alternative embodiment of a pressure plate actuation apparatus for use in an embodiment of the brake tensioning tool;

FIG. 10 is an enlarged partial section view of an alternative nut holding structure for use in an embodiment of the brake tensioning tool;

FIG. 11 is a partial section view of a second alternative nut holding structure for use in an embodiment of the brake tensioning tool;

FIG. 12 is a flowchart illustrating a method for using an embodiment of the brake tensioning tool to tension a brake system, in accordance with one embodiment of the present invention;

FIG. 13 is a representative section view of a second embodiment of the brake system tensioning tool with the nut fully retracted in the tensioning tool and the rod threaded in the nut, in accordance with the present invention;

FIG. 14 is a schematic diagram of brake system tensioning tool control system, in accordance with one embodiment of the present invention;

FIG. 15 is a representative section view of the second embodiment of the tensioning tool, crow's foot, and nut driver under control of the control system as shown in FIG. 14;

FIG. 16 is a schematic diagram of the brake system tensioning tool control system illustrated in FIG. 14;

FIG. 17 is a representative section view of the second embodiment of the tensioning tool, crow's foot, and nut driver under control of the control system as shown in FIG. 16;

FIG. 18 is a schematic diagram of the brake system tensioning tool control system illustrated in FIG. 14;

FIG. 19 is a representative section view of the second embodiment of the tensioning tool, crow's foot, and nut driver under control of the control system as shown in FIG. 17;

FIG. 20 is a schematic diagram of the brake system tensioning tool control system illustrated in FIG. 14;

FIG. 21 is a representative section view of the second embodiment of the tensioning tool, crow's foot, and nut driver under control of the control system as shown in FIG. 20;

FIG. 22 is a partial section view of an anti-rotation sleeve and an anti-rotation rod for use in a tool conforming to the present invention;

FIG. 23 is a flowchart of a method for tensioning a brake system using the second embodiment of the tool, in accordance with one embodiment of the present invention;

FIG. 24 is a representative section view of the second embodiment of the tool;

FIGS. 25 and 26 are representative section view of the nut engagement portion of the tool;

FIG. 27 is a perspective view of a third embodiment of the brake system tensioning tool, in accordance with the present invention;

FIG. 28 is a front view of the third embodiment of the tool illustrated in FIG. 27;

FIG. 29 is a side view of the third embodiment of the tool illustrated in FIG. 27;

FIG. 30 is a rear view of the third embodiment of the tool illustrated in FIG. 27;

FIG. 31 is a section view of the third embodiment of the tool taken along line 31-31 of FIG. 28;

FIG. 32 is a perspective view of the third embodiment of the tool shown in FIG. 27 in engagement with the nut;

FIG. 33 is a section view of the third embodiment of the tool taken along line 33-33 of FIG. 32;

FIG. 33A is a section view of the third embodiment of the tool taken along line 33A-33A of FIG. 33;

FIG. 33B is a section view of the third embodiment of the tool taken along line 33B-33B of FIG. 33;

FIG. 33C is a section view of the third embodiment of the tool taken along line 33C-33C of FIG. 33;

FIG. 34 is a representative section view of the third embodiment of the tool shown in FIG. 27 with the tool in engagement with the nut and rod;

FIG. 35 is a representative section view of the third embodiment of the tool shown in FIG. 27 with the tool in engagement with the nut and the nut pulled within the tool the relief distance;

FIG. 34A is a section view of the third embodiment of the tool taken along line 34A-34A of FIG. 34;

FIG. 34B is a side view of a snap for use in a tool conforming to the present invention;

FIG. 35A is a section view of the third embodiment of the tool taken along line 35A-35A of FIG. 35;

FIG. 35B is a section view of the third embodiment of the tool taken along line 35B-35B of FIG. 35;

FIG. 35C is a section view of the third embodiment of the tool taken along line 35C-35C of FIG. 35;

FIG. 36 is a representative section of the third embodiment of the tool shown in FIG. 37, with the tool in engagement with the nut and the nut threaded on the rod;

FIG. 36A is a section view of the third embodiment of the tool taken along line 36A-36A of FIG. 36 with the tool in engagement with the nut and the rod threaded through the nut;

FIG. 37 is a partial section view of the third embodiment of the tool shown in FIG. 27 with the nut and the engagement rod released but still within the cavity at the end of the tool;

FIG. 38 is a partial section view of the third embodiment of the tool shown in FIG. 27 after releasing the nut and after tensioning the brake system;

FIGS. 39A and 39B are an exploded view of the third embodiment of the tool shown in FIG. 27;

FIGS. 40 and 41 are block diagrams illustrating a system for controlling a brake system tensioning tool, in accordance with one embodiment of the present invention;

FIG. 42 is a representative section view of third embodiment of the tool shown in FIG. 27, the third embodiment comprising a friction reducing component, in accordance with the present invention;

FIG. 42A is a section view of the tool taken along line 42A-42A of FIG. 42;

FIG. 42B is a section view of the tool taken along line 42B-42B of FIG. 42;

FIG. 42C is an enlarged section view of the tool taken along line 42B-42B of FIG. 42;

FIG. 43 is a representative section view of the tool shown in FIG. 42; and

Figure 44:
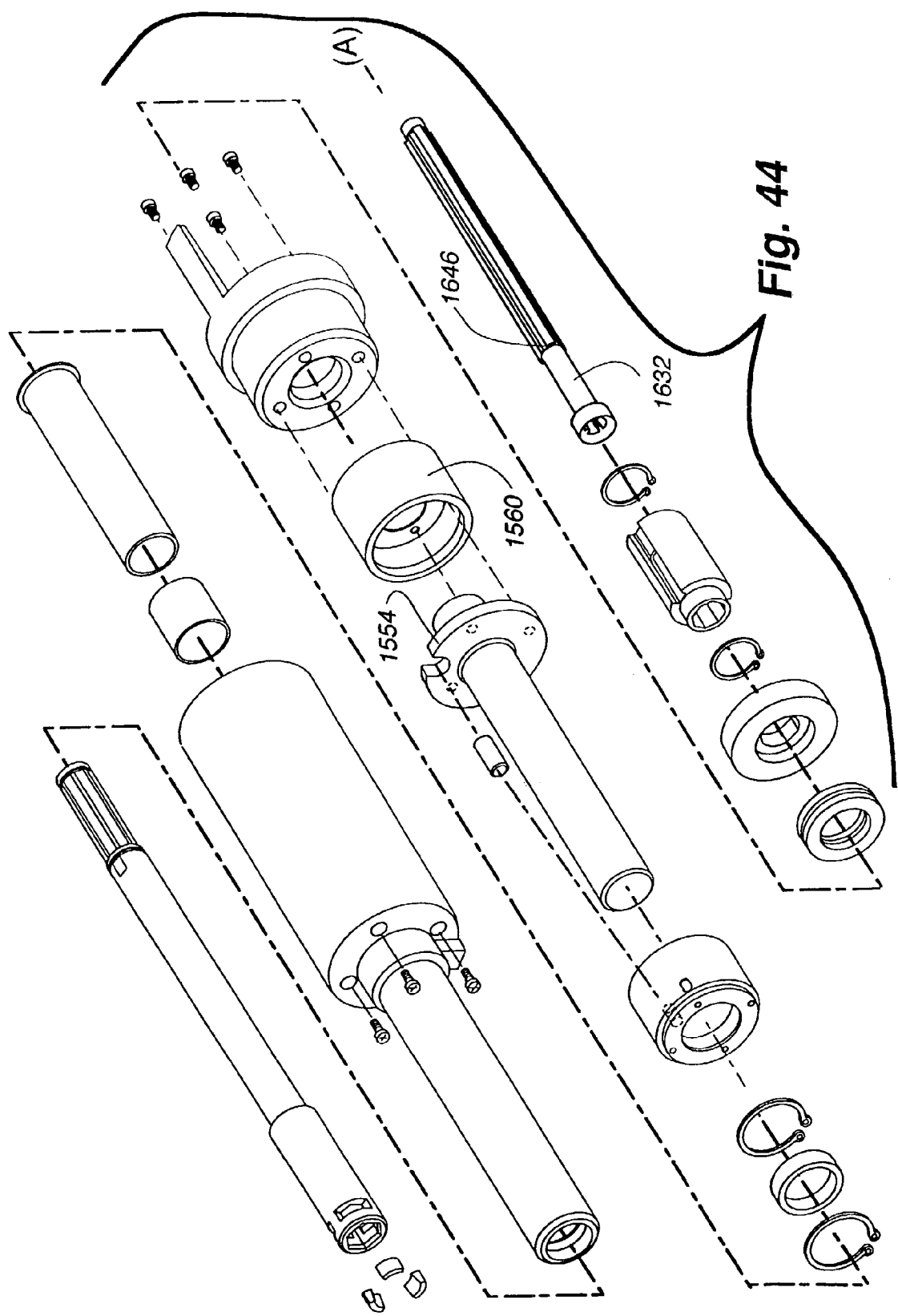
Figure 45:
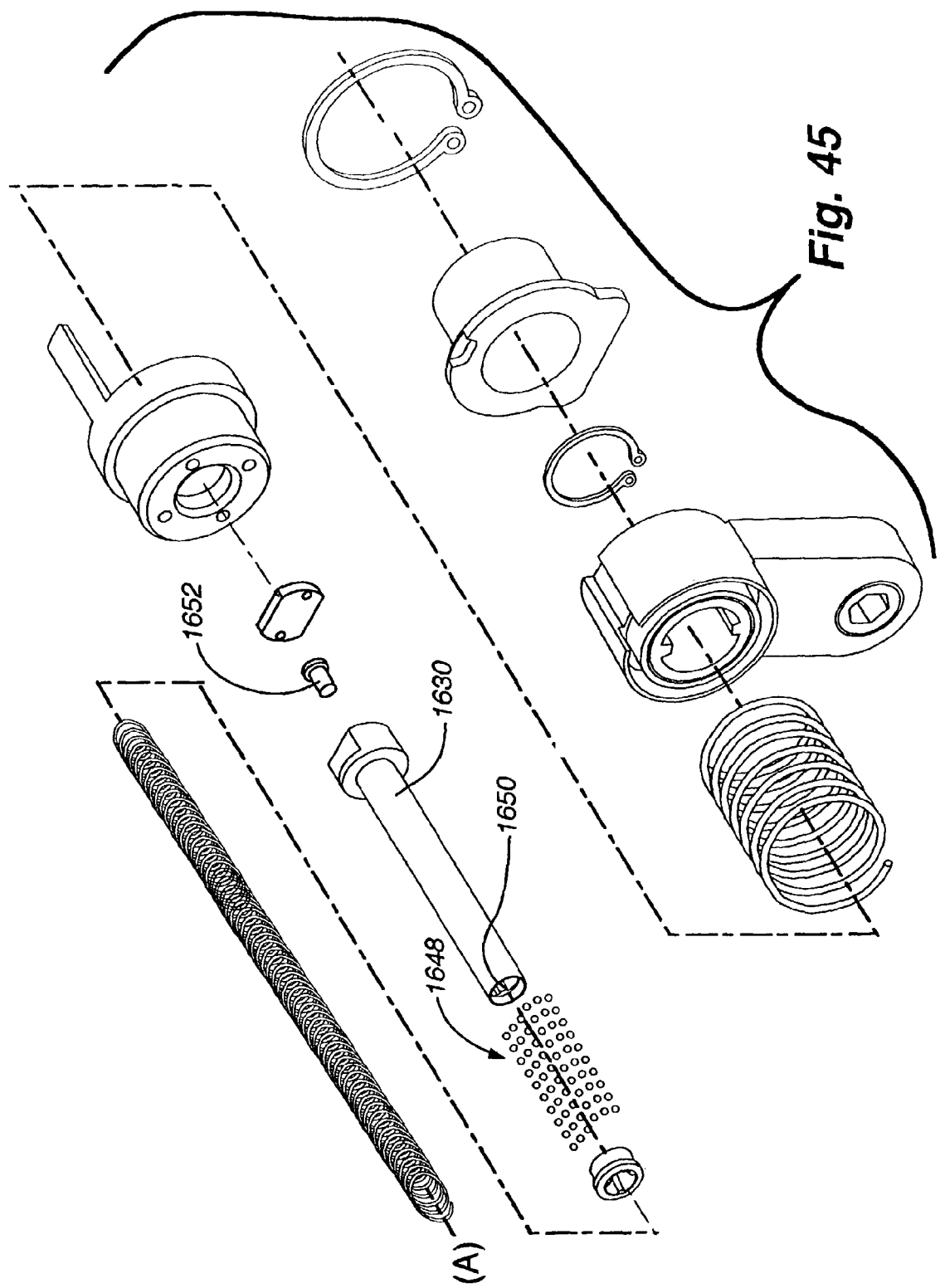

FIGS. 44 and 45 are an exploded view of the third embodiment of the tool shown in FIG. 42.

Figure 46:
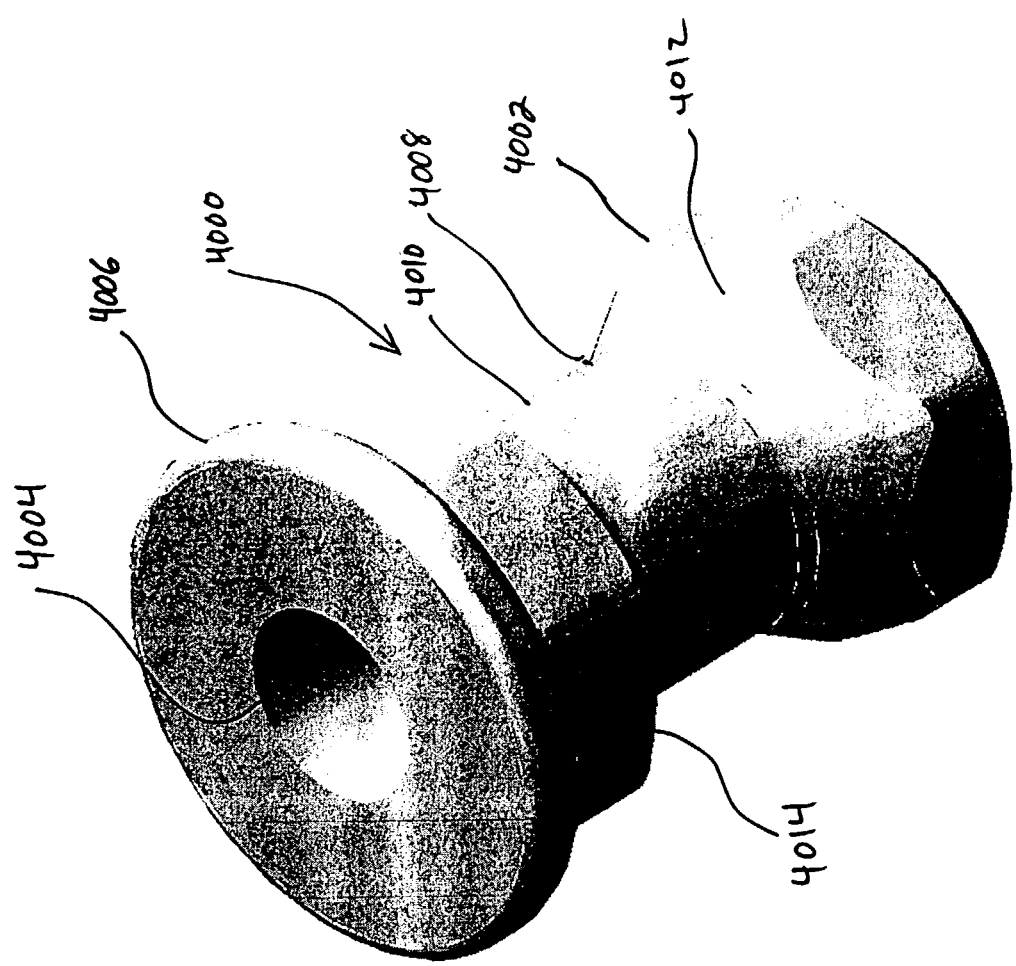

FIG. 46 displays an embodiment of a nut suitable for use with an embodiment of the present invention.

Figure 47:
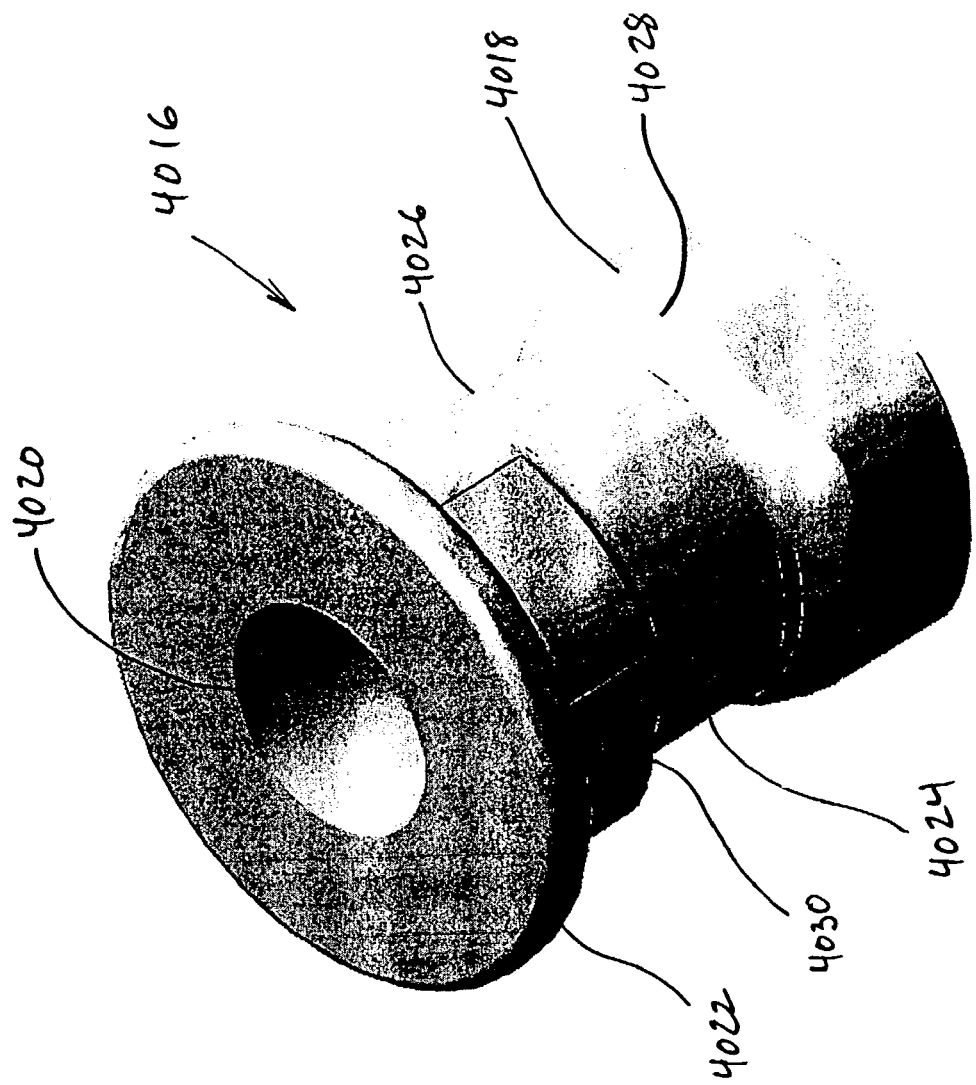

FIG. 47 displays another embodiment of a nut suitable for use with an embodiment of the present invention.

Figure 48:
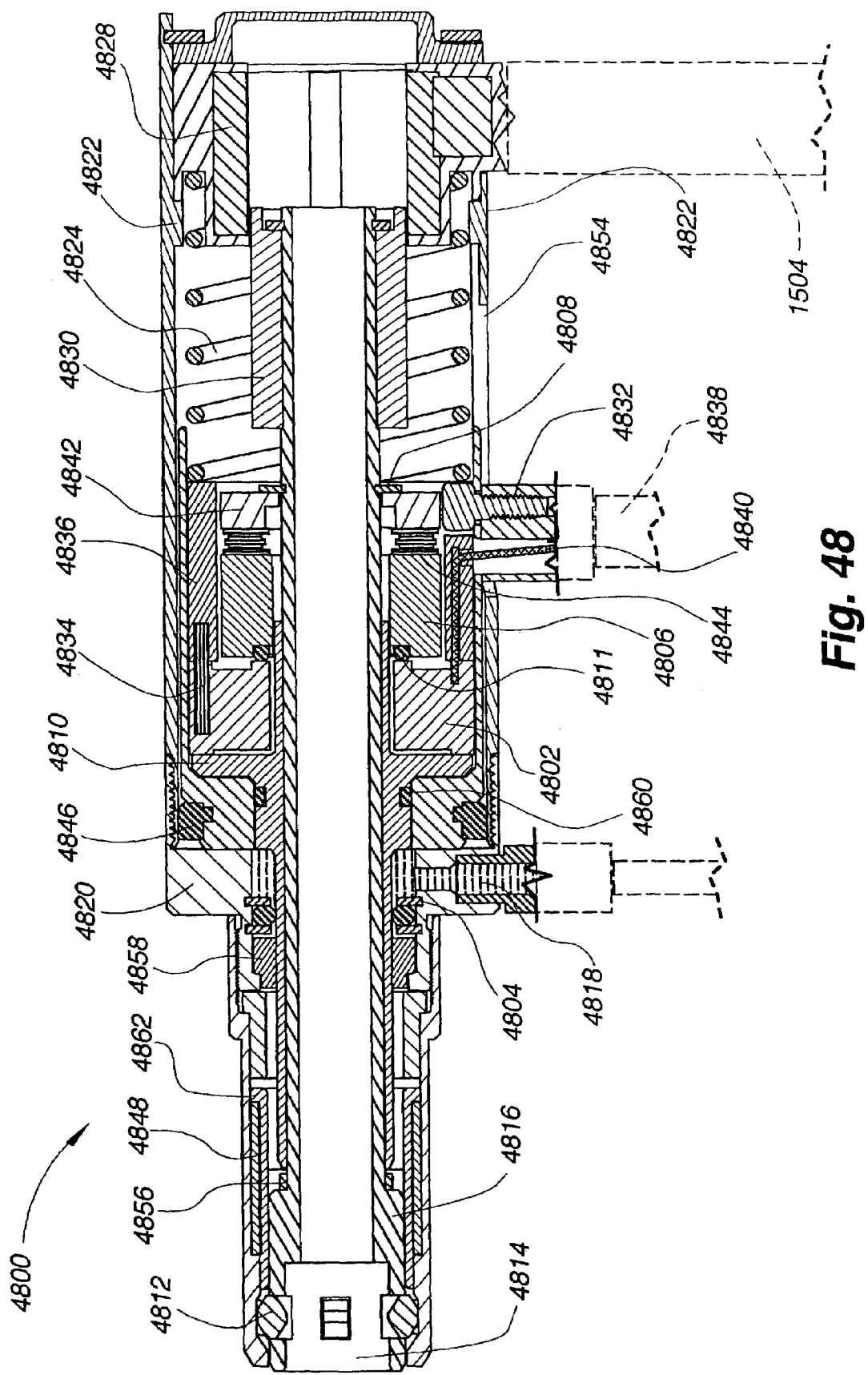
Figure 49:
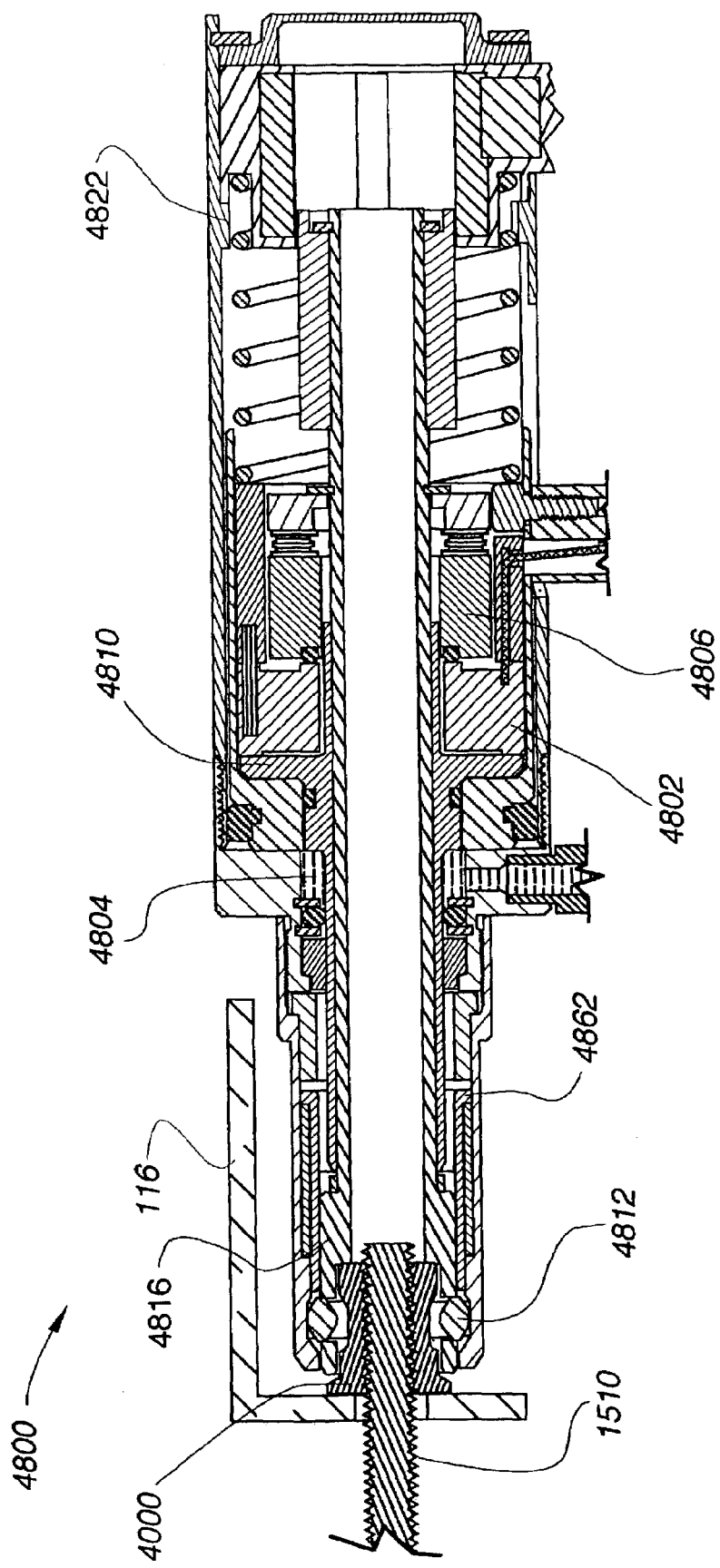
Figure 50:
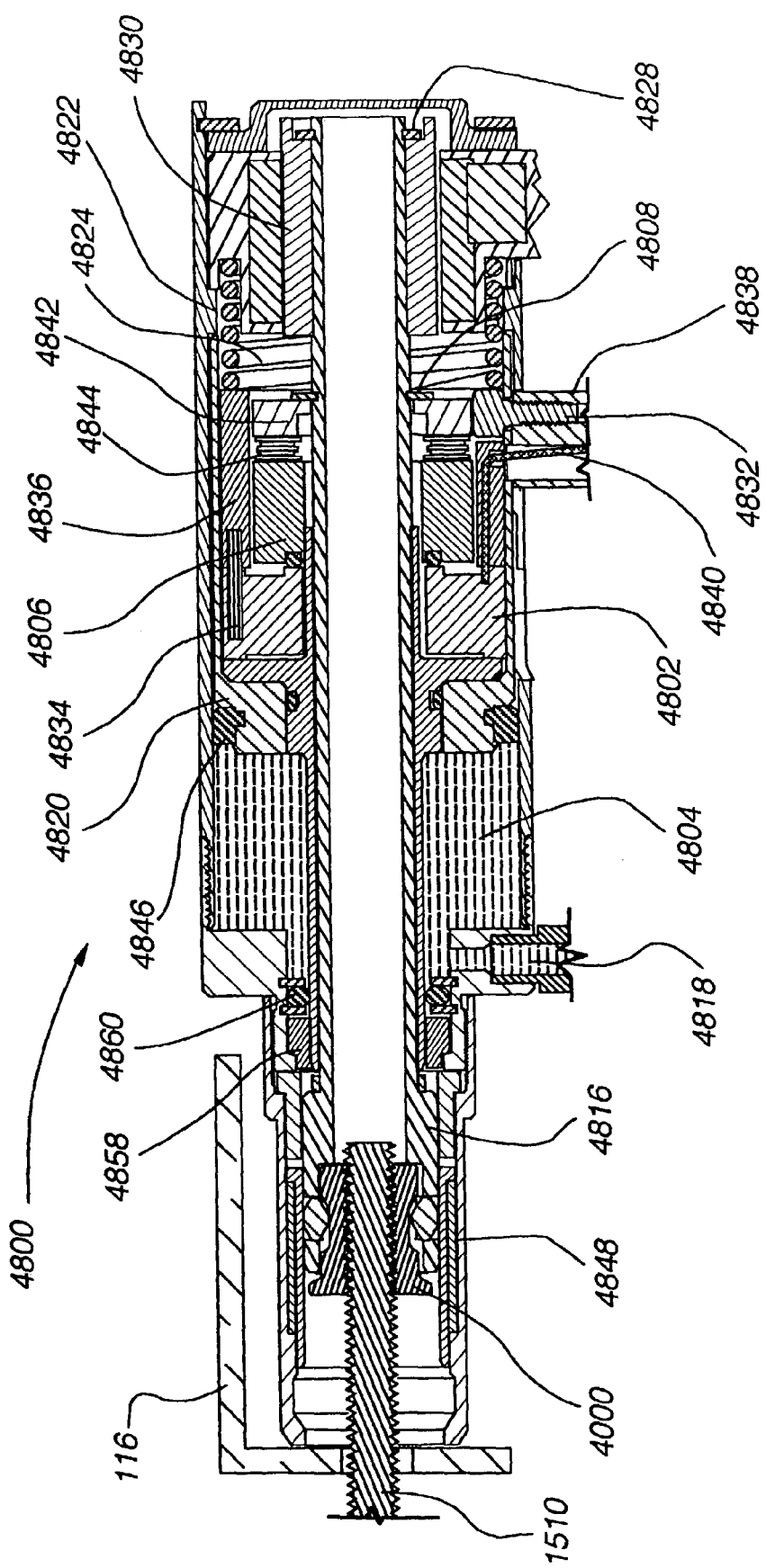
Figure 51:
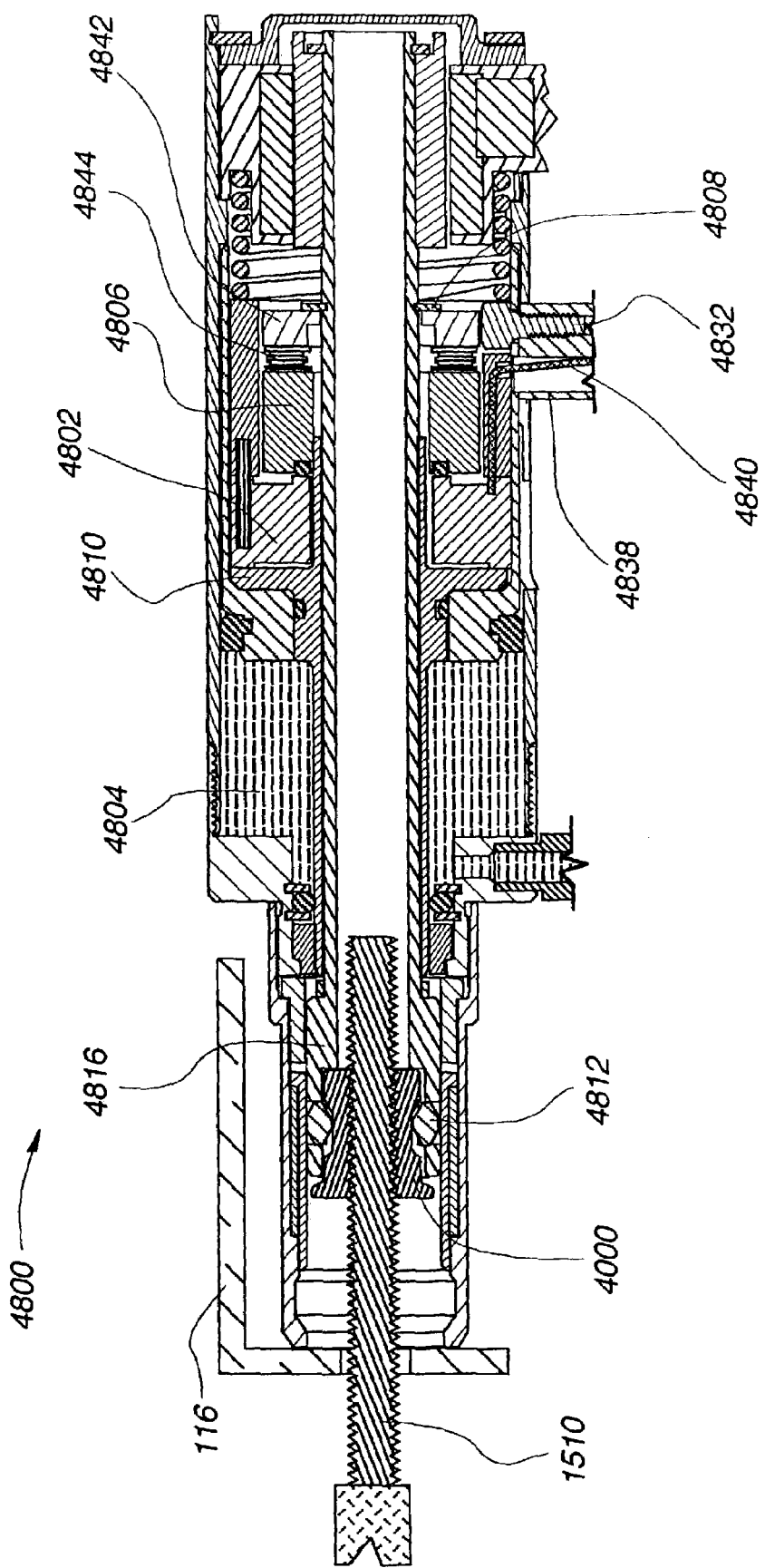
Figure 52:
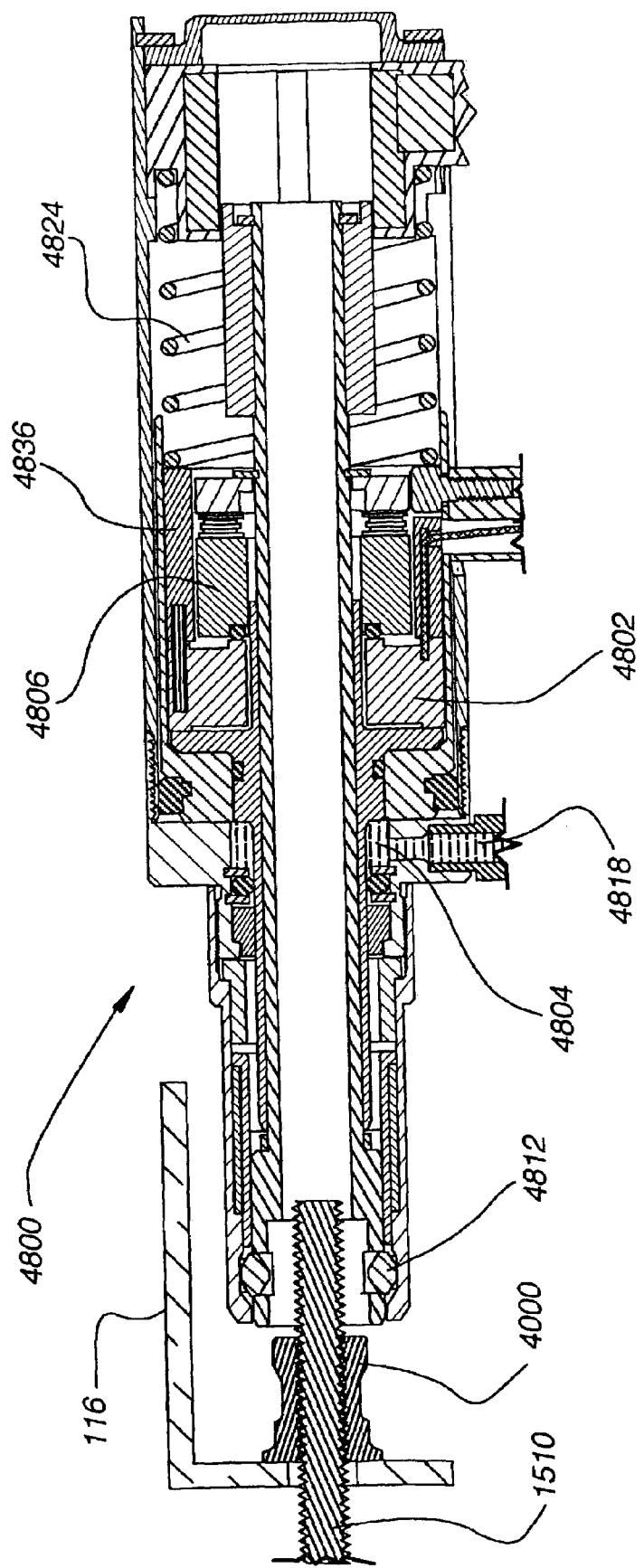
Figure 53:
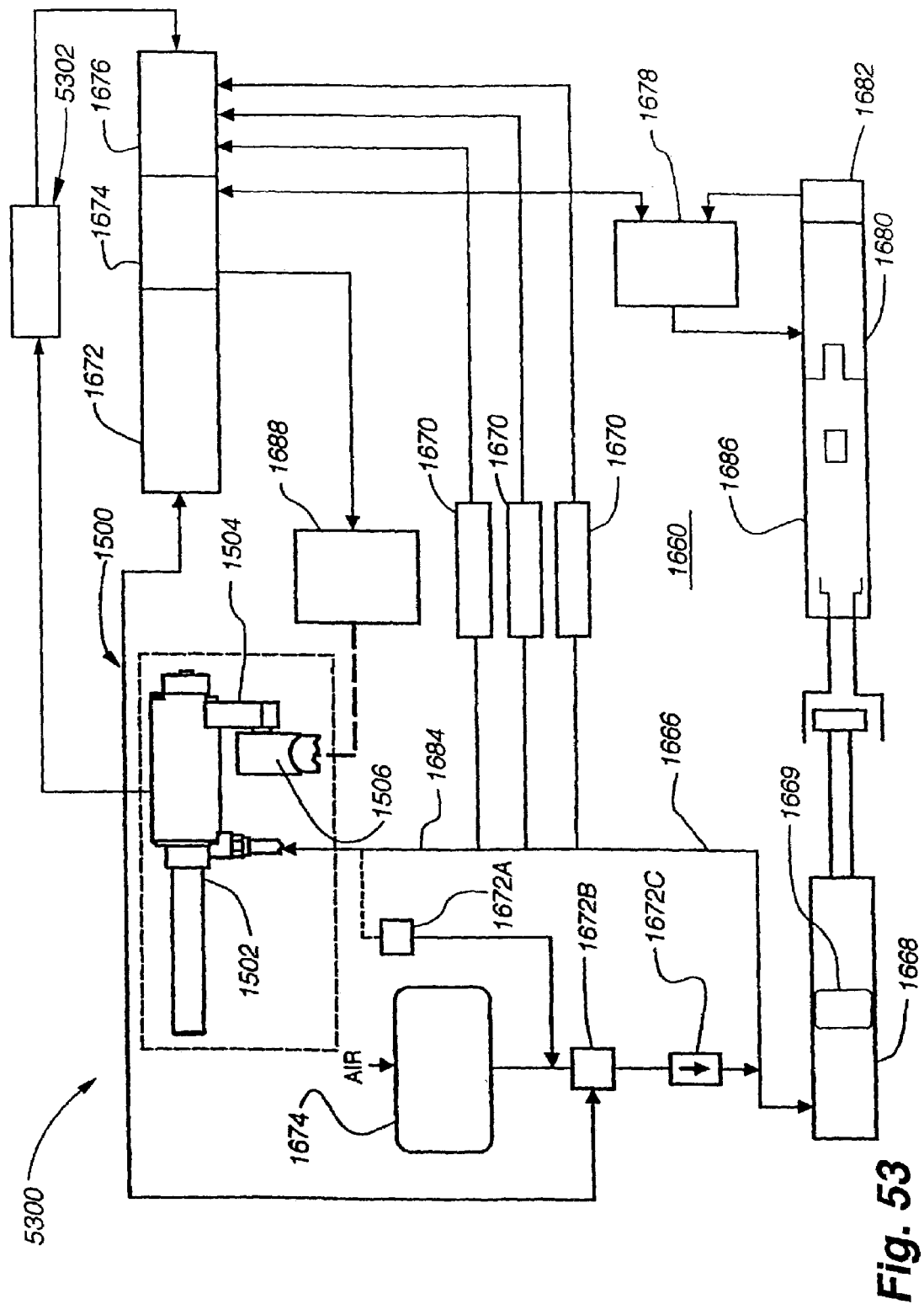
Figure 54:
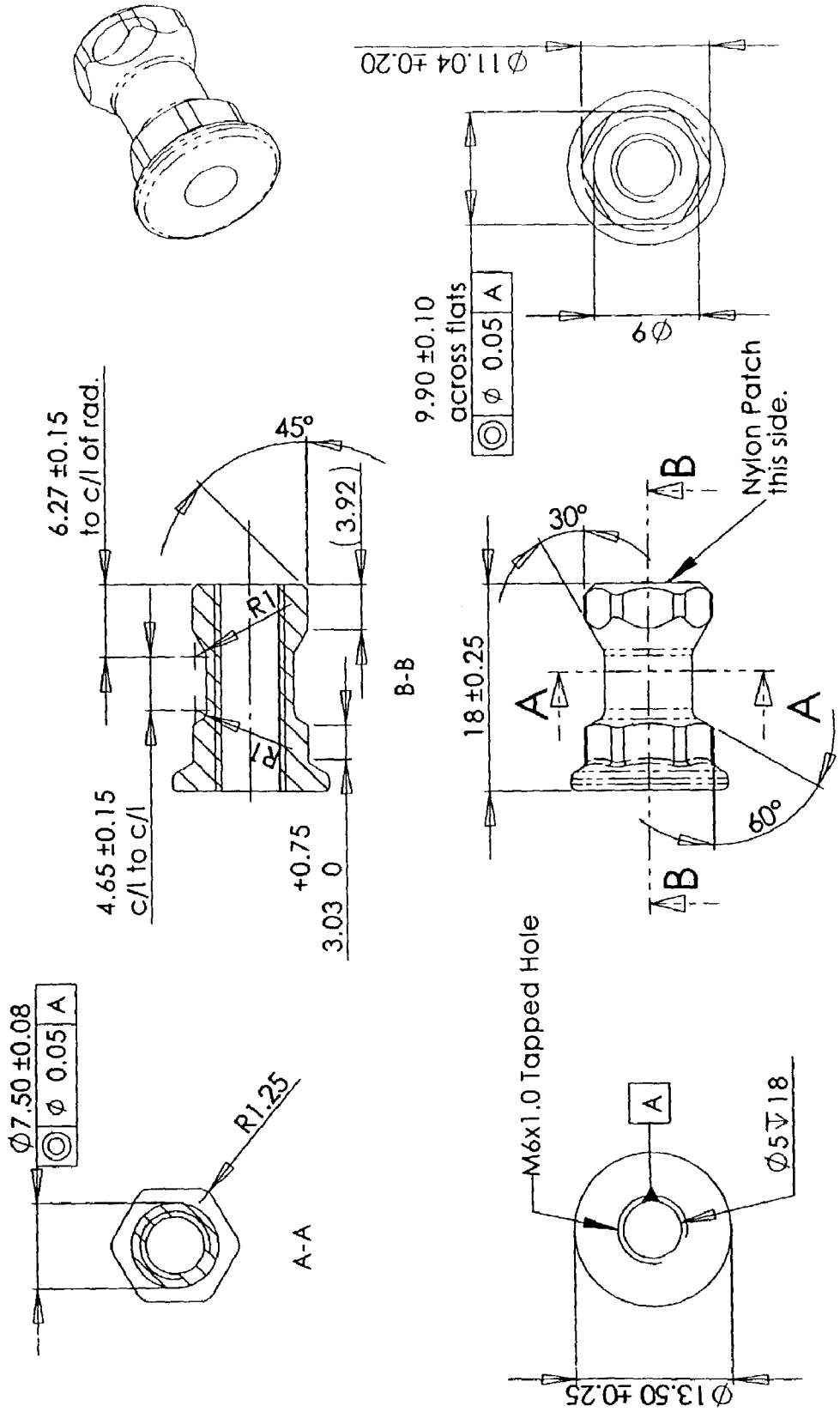
Figure 55:
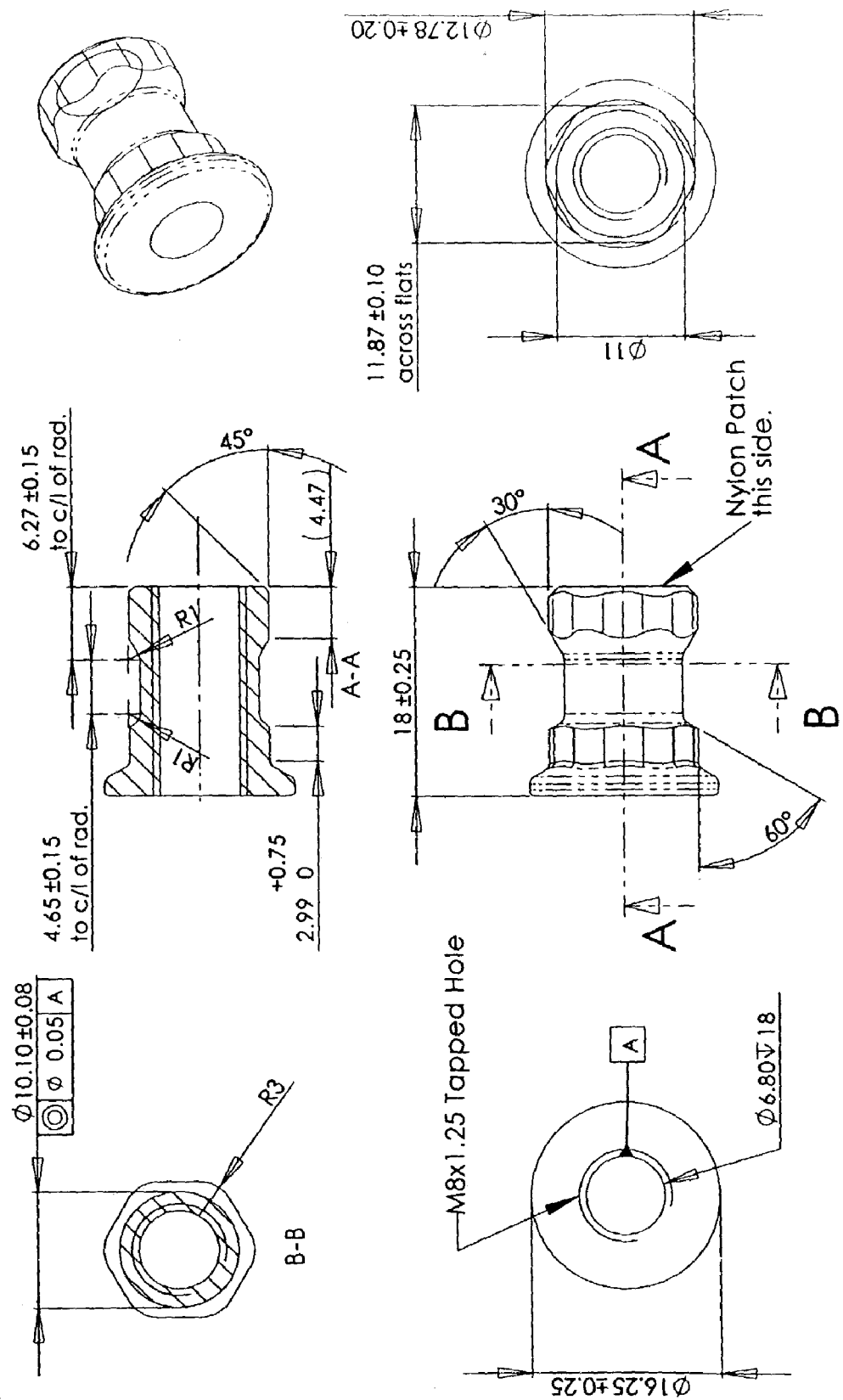

FIG. 48 is a first cross-sectional view of another embodiment of a brake system tensioning tool during operation, in accordance with an embodiment of the present invention;

FIG. 49 is a second cross-sectional view of another embodiment of a brake system tensioning tool during operation, in accordance with an embodiment of the present invention;

FIG. 50 is a third cross-sectional view of another embodiment of a brake system tensioning tool during operation, in accordance with an embodiment of the present invention;

FIG. 51 is a fourth cross-sectional view of another embodiment of a brake system tensioning tool during operation, in accordance with an embodiment of the present invention;

FIG. 52 is a fifth cross-sectional view of another embodiment of a brake system tensioning tool during operation, in accordance with an embodiment of the present invention;

FIG. 53 is a block diagram illustrating another system for controlling a brake system tensioning tool, in accordance with one embodiment of the present invention;

FIG. 54 displays the nut of FIG. 46, including various dimensions detailing one embodiment thereof; and FIG. 55 displays the nut of FIG. 47, including various dimensions detailing one embodiment thereof.

DETAILED DESCRIPTION OF THE INVENTION

Figure 1:
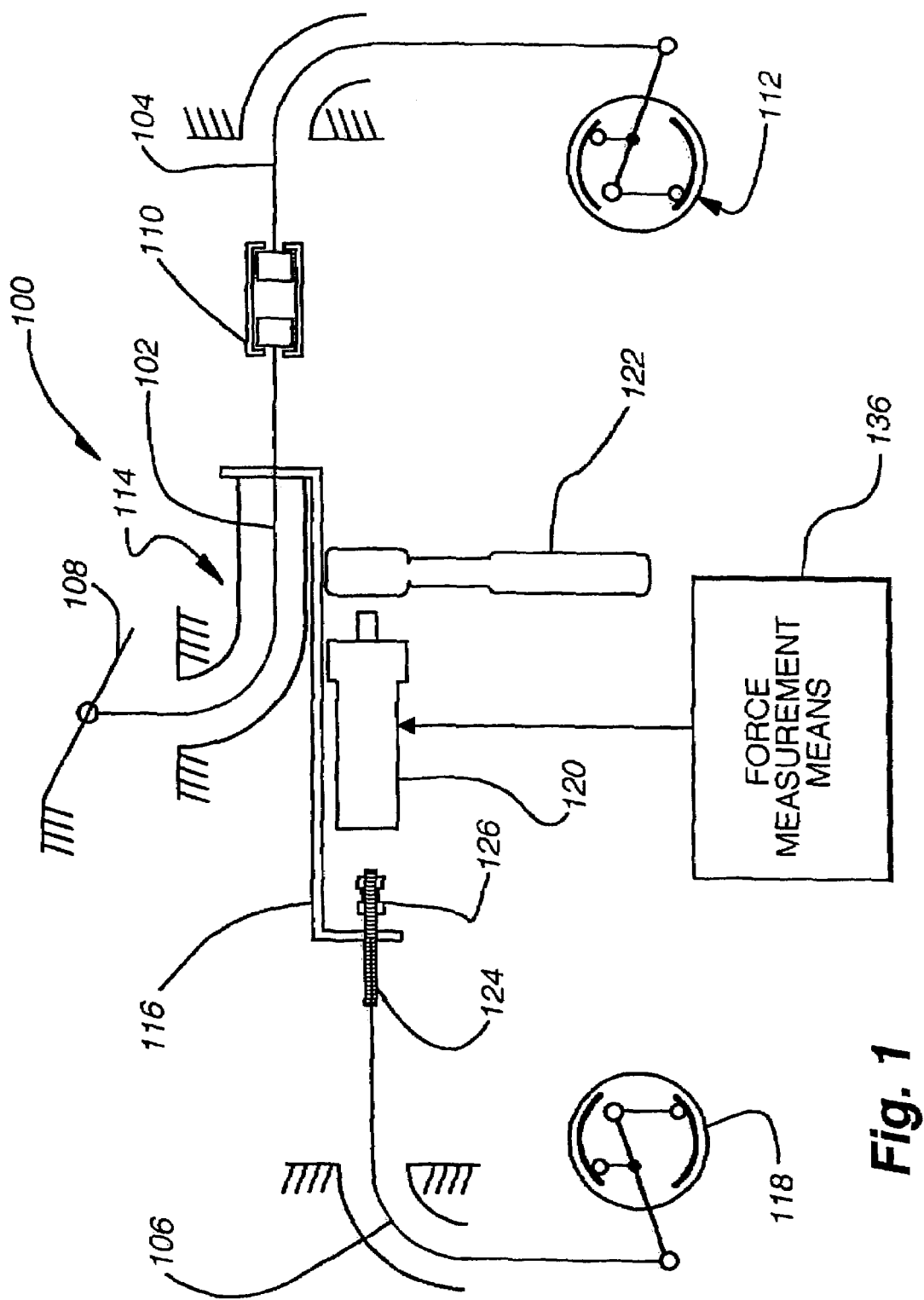
FIG. 1 is a system diagram illustrating a brake system tensioning tool for tensioning a brake system, in accordance with one embodiment of the present invention.

The instant invention is embodied in a tensioning apparatus attachment to a drive tool, such as a ratchet or other type of wrench, used for tensioning the park brake cable system of an automobile during assembly. A schematic of one embodiment of the present invention and the system in which it works is shown in FIG. 1. FIG. 1 illustrates a side pull park brake system 100, similar to that as shown in FIG. 22 of the '745 patent. In the park brake system 100 in which this invention is described, there is a front cable 102, a rear right cable 104 and a rear left cable 106. The front cable 102 is attached to a pull handle 108 at its first end and at its second end it is attached to a connector clip 110, which in turn attaches to the front end of the rear right cable 104. The rear right cable extends towards and attaches to the brake assembly 112 on the rear right wheel. The front cable 102 and the rear right cable 104 could be one continuous cable, however, it has been found more convenient to have them be separate cables for ease of manufacturing. The rear left cable 106 is attached to the front cable 102 through a reactive conduit system 114 as is well-known in the art. In the instant embodiment, the front end of the rear left cable 106 is attached to one end of an equalizer bracket 116, which is in turn attached to and part of the reactive conduit system 114. The rear end of the rear left cable 106 is attached to the rear left brake assembly 118.

The operation of a reactive conduit side pull park brake system 100 is well-known. The problem solved by the present invention is that the tensioning of the system during assembly is made significantly more convenient by use of a tensioning apparatus 120 conforming to the present invention in combination with a drive means 122, which results in an accurately tensioned cable system. In addition, the use of a tensioning apparatus 120 can reduce overall costs of building the park brake system into a vehicle during assembly, it can improve quality, and its use can reduce labor costs.

The front end of the rear left cable 106 includes a threaded rod 124 of approximately one-half inch to four inches long. The free end of the threaded rod is positioned through an aperture in the end of the equalizer bracket 116 and a nut 126 is positioned on the free end of the threaded rod 124 in order to hold the threaded rod in attachment with the equalizer bracket. The tensioning apparatus 120 and the drive means 122 are used to tension the entire park brake cable system to remove voids and stretch from the various park brake cables so that the park brake cable system 100 functions appropriately during the use of the vehicle, and to lessen loosening. The particular tensioning apparatus 120 by itself, or in combination with the drive means 122 (collectively referred to as the "park brake tensioning system"), which are used together to tension the park brake system, incorporate the present invention.

One of the brake system assembly benefits provided by the park brake tensioning system of the present invention involves the utilization of a relief distance. The relief distance is the distance that the end of the cable being used to tension the system is allowed to relax after the tensioning of the system has been performed. Relaxation of the tension releases the engaged brakes from the drums, or the calipers from the disk (for disk brakes), just enough to allow the wheel to turn freely while keeping a sufficient level of tension in the park brake system in order to easily engage the parking brake. The threaded rod will extend out of the nut to some extent more than likely in any event, but it has been realized that if that length of extension can be reduced by the relief distance then the feasibility and desirability of a park brake tensioning system and apparatus with this feature would be greatly enhanced. One of the benefits of the instant invention is that the relief distance is not part of the length of the threaded rod that extends past the nut once the system tensioning has been performed. This will be explained in greater detail below.

Note that the tensioning method and apparatus of the present invention can be implemented at any place in a park brake cable system where there is an action/reaction point, such as where the park brake handle attaches to the front cable, where the rear cable is attached to the brake assemblies, where the front cable and rear right cable attach together, or other locations.

Graph 1 shows a typical tension-travel curve 500 for the park brake cable system with the X-axis being cable travel in millimeters and the Y-axis being cable tension in pounds. The relationship between travel and tension creates a curve moving generally upwardly and to the right. The first portion 502 of the curve is considered the flat portion of the curve where the slack in the cable (102, 104, 106) is being removed. The middle portion 504 of the curve is considered the transition portion of the curve where the brakes are starting to be actuated. The steep part 506 of the curve, above the transition portion, represents where the brakes (112, 118) are fully engaged and a clamping load is being built in the brakes system. This steeper curve (more tension per unit distance) is caused by the cables being stretched since the brakes are engaged and the ends of the cables are fixed and no longer able to move.

The travel-tension curve is important in the tensioning of the park brake cable system because the goal of the tensioning process is to load the park brake cable system to a level just below the transition region 504, where the brakes are not engaged but very nearly so, still allowing the wheels to easily turn. This residual tension level after the tensioning operation allows the user to actuate the park brake cable system without requiring a great deal of effort, and also provides for a better braking effect as compared to a tension level far below the transition area where the park brake lever has to be used to take the slack out of the cable system prior to the park brake engaging.

The ideal residual tension is shown at point X, which is between the transition zone 504 and the flat zone 502. Note that the transition, flat and steep zones are shown as being discreet regions. This is done for clarity. These zones are typically somewhat overlapping with no clear beginning or end. Also, the curve in Graphs 1 and 2 are each representative. These curves will vary for different vehicles and different park brake cable systems Graph 2 portrays one of the benefits of the instant invention. When the park brake cable system 100 is tensioned while in the steep part of the curve 506, the adjustment variation of the tension inherent in the tensioning process creates much less of a variation in the overall cable travel as compared to the tensioning of the park brake cable system at a flatter part of the curve. As shown in Graph 2, a variation 508 of approximately 8 pounds of cable tension above and below the target of 140 pounds could result in a variation (510) in the cable travel of about 4 mm (from 123 to 127 mm). If this same +/−8 pound variation 512 was experienced at the flatter part of the curve, such as near the transition zone, the cable travel variation 514 would be 21 mm (from 55-76 mm). Using the present invention, by tensioning in the steep region the variation in cable travel per pound of variation in tension measurement is smaller. The range limit indicator 516 around the spot X on Graph 2 show the smaller variation than range limit indicators 514. This is an example. The movement of the nut the relief distance by the tool prior to tensioning the brake cable system is the action that moves the operating region of the tensioning step up the curve into the steep region of the curve.

In all of the embodiments described here, each moves the nut by the relief distance prior to tensioning in order to take advantage of performing the tensioning method in a higher tension/travel region. While this is not critical to the inventiveness of the tensioning tool, it does provide some benefit (as described above and below) for the tensioning process.

FIG. 3 illustrates a cross-section of one embodiment of the parking brake tensioning system. Referring to FIG. 1 and FIG. 3, by way of brief description of the operation of a device conforming to the present invention, once the nut 126 is threaded onto the free end of the threaded rod 124 to the desired extent, the tensioning apparatus (or tensioning tool) 120 is mounted on the nut over the rod. The first step is to actuate an outer sleeve 128 (or outer housing) of the tensioning apparatus 120 which causes an inner sleeve (or input shaft) 130 to grab the nut 128 and keep the nut fixed in an axial relationship with the inner sleeve 130. In this motion, the an outer sleeve 128 is pushed toward and against the equalizer 116 which in turn pulls the nut and the free end of the threaded rod 124 into the outer housing. The inner sleeve 130 moves axially with respect to the outer housing 128 to help this occur. In the relative movement of the outer housing 128 with respect to the inner shaft or sleeve 130, the nut 126 is moved away from the equalizer 116 a distance about equal to the relief distance. The only limitation here is that the shaft 130 and the outer sleeve 128 must move relative to one another enough to actuate a nut clamping mechanism 132 or means to releasably connect the nut to the inner shaft in an axially stable position. The nut clamping mechanism is described in greater detail below.

Once the first step is complete (pulling the nut into the outer sleeve through the actuation of the outer sleeve), then the drive means 122 is actuated to rotate the nut 126 around the threaded rod 124. This causes the threaded rod to be drawn through the nut and into the inner sleeve 130. The free end of the rod is received in an anti-rotation shaft 134 to keep the rod from turning with the nut. As the free end of the threaded rod extends further into the central bore of the shaft 134, the rear left cable 160 is pulled to actuate the rear left brake assembly 118 and the rear right cable 104 is pulled to actuate the rear right brake assembly 112, at which point the initial free play in the brake system is taken up. Further actuation of the drive means 122 causes the brake system assembly to be tensioned throughout to remove voids in the cables and eliminate or reduce the amount of loosening the cable will experience later.

Referring to FIG. 1, a force measurement means 136 is operably connected to the tensioning apparatus 120 (such as a strain gauge attached to the shaft) to measure the tension in the brake cable system 100. The force measurement means is connected to the drive means 122 in such a way that it can control the operation of the drive means. The force measurement means, when it senses that the tension in the cables has increased to the desired threshold level, can turn off the drive means automatically, or can indicate to a user that the proper level of tension has been obtained allowing the user to shut the drive means off manually. When the drive means 122 is turned off manually, or at least in a relatively coordinated timing manner, the actuation of the outer sleeve 128 is reversed so that the shaft 134 and outer sleeve 128 move with respect to one another and cause the nut 126 to move the relief distance back to an engagement point with the equalizer bracket 116. This relief distance allows the rear left 118 and rear right 112 brake assembly (and any other brake assembly attached to the system, if any) to release the brakes just enough so that the respective wheels can turn freely. The tension in the cable system can then be measured again to confirm that the resultant tension is at the desired level. If the desired tension is not found, then the process can be repeated, either manually or automatically, until the proper tension is obtained.

At this point, the free end of the threaded rod 124 extends past the nut 126 only as far as is required to generate the desired tensioning level of the park brake system. Also, the force measurement means 136 provides the operator with an accurate and repeatable manner for tensioning the park brake system, thus reducing quality problems, scrap and extra work.

Figure 2:
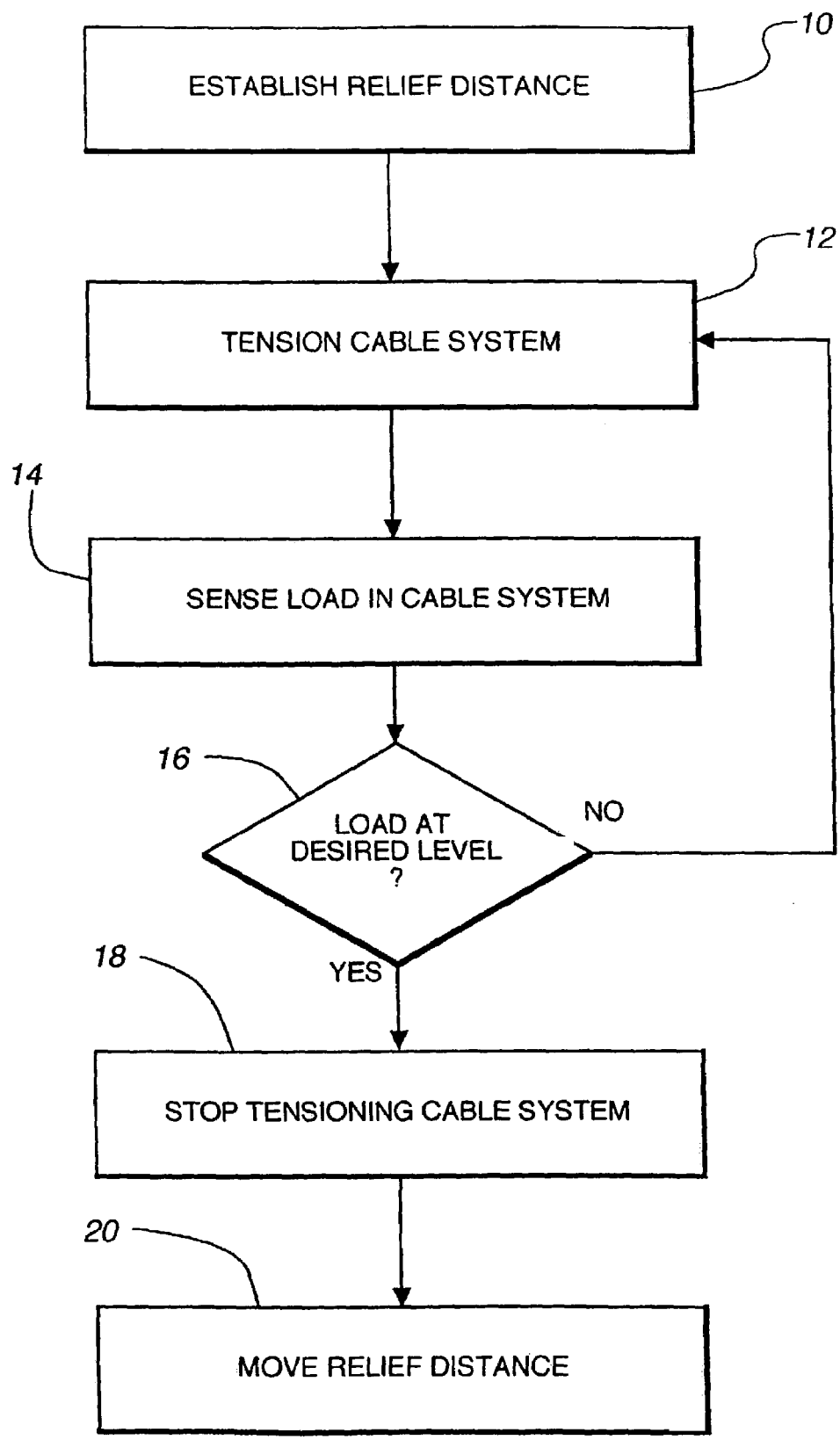
FIG. 2 is a flowchart illustrating one method for using the tool to tension a brake system, in accordance with one embodiment of the present invention.

FIG. 2 illustrates a flowchart of one method associated with using the tensioning apparatus. An initial step 10 is to establish the desired relief distance. This is determined by the designer and/or the manufacturing/production engineer in order to properly install and tension the brake cable system on the car during assembly. The next step (12) is to tension the cable system 100 by actuating the tensioning apparatus 120, which causes the retention and movement of the nut 126 a total distance equaling the relief distance. The tensioning apparatus 120 is then activated to rotate the nut and pull the threaded rod through the nut to tension the cable system.

The next step (14) is to sense the load in the cable system. Sensing the load can be done by any load sensing means 136 such as a strain gauge. After the initial load is sensed in the cable system, in the next step (16) it is determined whether or not the load is at the desired level. If not, the method loops back to the step (12) of tensioning the cable system and then re-sensing the load in the cable system (step 14) and further a redetermination of whether or not the load is at the desired level (step 16).

Once the tension load, as measured by the load sensing means 136, is at the desired level, the next step (18) is to stop tensioning the cable system. This generally means to stop the drive means 122 from turning the shaft which in turn stops turning the nut 126. The final step (20), which may occur simultaneously with stopping the tensioning of the cable system, is to allow the nut 126 to move the relief distance back to the equalizer bracket 116. This occurs when the tensioning apparatus 120 is de-actuated to bring the inner shaft 134 and the outer sleeve 128 back into longitudinal alignment with one another and release the nut 126. Additionally, the tension load can be measured again after the relief distance has been eliminated. If the tension load at this point is not as desired, then the process (steps 10-20) can be repeated.

Referring again to FIG. 3, the nut 126 is shown engaged with the free end of the threaded rod 124 to hold the threaded rod in the equalizer 116. The tensioning apparatus 120, as shown in FIG. 3, includes the inner sleeve 130 or central shaft 134 defining an axial bore therethrough. At one end of the inner sleeve 130 the axial bore is sized to fit the drive portion 138 of a ratchet wrench 140, or in some other way attach to a drive means 122 which can cause the shaft 134 to rotate as described below.

At the other or second end of the inner sleeve or shaft (130, 134), the axial bore is sized to receive the hex nut 126 threaded on the end of the threaded rod 124. The recess 141 formed to receive the hex nut has faceted side walls 142 to receive the hex nut. This recess can have any shape as long as it matches the external shape of the nut threaded onto the rod in order to turn the nut with respect to the rod.

Near the first end of the inner sleeve 130, a radial front housing wall 144 extends radially outwardly from the sleeve and then bends rearwardly towards the second end of the inner sleeve. This bend can be at a right angle or a smooth curve or anything in between as long as it satisfies the purpose herein described. A rear housing 146 is attached to the front housing, such as by threading, to form an internal volume between the two. The volume is a pressure vessel 148 in the present embodiment. The pressure vessel is generally cylindrical in shape with relatively flat end walls and a cylindrical side wall.

In the present embodiment, a pressure port 150 is formed in the inner sleeve 130 and extends from outside the pressure chamber 148 and communicates with an aperture inside the pressure chamber to allow the passage of air or fluid therethrough to the inside of the pressure chamber defined by the front housing 144 and the rear housing 146.

Also found near the first end of the inner sleeve 130 is a pair of slip rings (152, 154). One slip ring 152 nearest the front housing 144 is attached to the inner sleeve 130, and the other slip ring 154 is attached to the drive means 122 or some other location in order to fix the orientation of the outer slip ring. The ratchet 144 or other drive means 122 extends through the outer slip ring 154 and engages the recess formed at the first end of the bore of the inner sleeve 130 to rotationally drive the inner sleeve with the rotation of the drive means. When the drive means rotates, the inner sleeve rotates and the slip rings (152, 154) stay in contact with one another. The inner slip ring 152 rotates with the inner shaft and the outer slip ring 154 stays fixed. The slip rings are made of a metallic or conductive substance in order to conduct signals from the force measurement means 136 mounted near the second end of the inner sleeve. This is described in more detail later. A wire 156 or other type of electrical signal communication means is attached to the outer slip ring 154 in order to conduct such signals to a measurement device 158 which in turn displays the force or load or tension in the inner sleeve 130, which is calibrated to the tension in the park cable system. The measurement device 158 is able to automatically control the drive means 122 or the air pressure source attached to the pressure chamber.

A nut capturing mechanism 132 is positioned at the second end of the inner sleeve 130 in the side wall of the recess 141 for receiving the nut 126. The capturing mechanism is used to grab the nut within the recess 141 and hold it there until the end of the tensioning process. The capturing mechanism 132 fixes the position of the nut axially with respect to the inner sleeve so that when the inner sleeve is moved upon actuation of the outer sleeve, the nut moves with the inner sleeve. The capturing mechanism can employ any type of selectively engagable and releasable detent devices, such as spring-loaded ball bearings, or snap rings 160 having radially inwardly extending prongs or tabs 162, such as shown in FIG. 3A. The tabs 162 can be forced to extend inwardly to secure the nut, through one, two, three or more apertures formed in the side wall of the recess. The tabs can be spaced equally apart or can be irregularly spaced. In one example, the tabs engage a groove 163 defined on the nut 126. The use of the capturing device is described in more detail below.

An outer sleeve 128 extends concentrically around the inner sleeve 130 along the majority of the length of the inner sleeve and is configured to slide over the inner sleeve. The first end of the outer sleeve forms a pressure plate 164 which extends radially from the cylindrical main body of the outer sleeve to contact in a sealing engagement the inner cylindrical wall of the pressure vessel 148 defined by the front housing 144 and rear housing 146. The outer sleeve 128 can move with respect to the inner sleeve 130 in conjunction with the pressure plate 164 moving from the front end of the pressure vessel 148 (defined by the radial front housing wall 144) to the rear end of the pressure vessel (defined by the radial rear housing wall 146). In one implementation, as discussed in more detail below, the distance that the pressure plate moves is the relief distance. A coil spring 166 is positioned around the outer sleeve 128 and abuts the rear wall of the pressure plate 164 in order to bias the pressure plate towards the front end of the pressure vessel 148. Thus, before actuation, the bias force from the spring 166 causes the second end (toward the nut) of the outer sleeve 128 be in alignment with the second end (toward the nut) of the inner sleeve 130.

As shown in FIG. 3, the second end of the outer sleeve 128 defines a circumferential end wall 168 extending radially inwardly. The second end of the inner sleeve 130 abuts the circumferential end wall 168 when it is aligned with the outer sleeve. This feature, however, is not required. It simply helps reinforce the preferred relational position of the inner sleeve and outer sleeve in this first position of the tensioning apparatus. Adjacent the second end of the outer sleeve 128, an enlarged annulus 170 is formed that defines a space circumferentially around the second end of the inner sleeve 130, such space extending the majority of the length of the recess 141 formed at the second end of the inner sleeve. In the first position (pre-actuation) of the tensioning apparatus 120 shown in FIG. 3, the capturing mechanism 132 is in its extended or non-engaged position and protrudes into the annular space formed around the outer wall of the second end of the inner sleeve 130. The space defined by the annulus 170 in the outer sleeve 128 has a front edge 172 sloped like a ramp to provide a transition between a larger diameter in the annulus 170 and a smaller diameter of the outer sleeve 128 forward of the annulus. The ramp 172 will be shown to be helpful in actuating the capturing mechanism 132 when the tensioning apparatus 120 is moved into its second state or position.

Note that in FIG. 3 the threaded rod 124 is only threaded into the nut 126 a small amount. The distance that the threaded rod is extended into the nut is determined by the designers and helps determine the length of the rod extending from the front end of the nut after the tensioning process. In other words, the further the threaded rod is threaded into the nut before the process takes place, the further the threaded rod will likely extend when the tensioning process is over.

Referring still to FIG. 3, a force measurement means 136, such as a strain gauge 174, is positioned on the inner sleeve 130, preferably near the recess 141 formed at the second end of the inner sleeve and forwardly of the capturing mechanism 132. Preferably the strain gauge 174 is positioned over the recess formed in the second end of the inner sleeve in order to provide a more responsive position for the strain gauge to measure the tension (extension) of the inner sleeve 130. The tension in the second end region of the inner sleeve 130 forwardly of the capturing mechanism 132 is a function of the tension in the cable system during the loading of the park brake cable system. The strain gauge or force measurement means is electrically connected via a wire or the metal body of the inner sleeve, if the inner sleeve is made of metal, to the strain gauge conductive wires 176 on the inner slip ring 152 at the first end of the inner sleeve. Because the inner sleeve rotates when the drive means is actuated, and the outer slip ring does not rotate, the electrical signal is passed from the inner slip ring 152 to the outer slip ring 154 as the inner slip ring rotates with respect to and in contact with the outer slip ring. The outer slip ring is operably connected with a measurement device 158, which is operably connected to both the drive means 122 and the offset means (discussed below), and can control them together or separately.

Any type of suitable force measurement means 136 that can perform as required in this application can be used, including mechanical means (such as metal prongs designed to deflect and release the nut at a given force or tension level) or compression load sensors or strain gauges. At the desired level as measured by the strain gauge 174, the drive means 122 is shut off (automatically by the measurement device 158, in one embodiment), and the outer sleeve 154 and inner sleeve 152 are brought back to their respective positions to allow the nut 126 to move its relief distance and de-tension the park brake cable system, as is described in greater detail below.

While FIG. 3 shows the first state of the tensioning apparatus, FIG. 4 shows the second state of the tensioning apparatus 120 with the nut 126 inserted into the recess 141 formed at the second end of the inner sleeve 130. The nut 126 abuts the front end of the recess 141 at a location to align the capturing mechanism 160 with the annular groove 163 formed on the nut. In this position, the snap ring 160 is still flexed outwardly; thus, the tabs are not yet engaged with the groove 163.

FIG. 5 shows the third state of the tensioning apparatus 120 wherein the outer sleeve is actuated to extend the relief distance past the second end of the inner sleeve 130. With the rear end wall 168 of the outer sleeved 128 abutted against the equalizer, actuation draws the nut 126 and the rod forwardly within the outer sleeve. The outer sleeve may be actuated in one of several ways. As shown in FIG. 3, the pressure port 150 formed in the inner sleeve 130 allows air pressure to be exposed to the front side of the pressure plate 164. The pressure of the air being exposed therein overcomes the force of the spring 166 and pushes the pressure plate 164 towards the rear housing wall 146. A seal formed around the pressure plate keeps the air pressure from escaping around the pressure plate. The seal is formed between the outer sleeve 128 and inner sleeve 130 adjacent the pressure plate (such as by an o-ring 178 as shown) in order to keep the air pressure from escaping. A second seal is formed between the pressure plate 164 and the front housing wall 144 (such as by a second o-ring 180 as shown).

As the pressure plate 164 moves rearwardly towards the rear wall of the rear housing 146, the outer sleeve 128 moves toward the equalizer bracket 116 and the inner sleeve 130, relatively, is withdrawn into the outer sleeve. As the inner sleeve is withdrawn into the outer sleeve, the snap ring 160 or capturing mechanism engages the sloped front leading edge surfaces 172 of the recess 141 formed in the second end of the outer sleeve 128 and compresses the snap ring 160 to force the tabs 162 to engage the groove 163 defined around the nut 126. This engagement causes the nut to be fixed in axial position with respect to the inner sleeve, and to move along with the inner sleeve as the inner sleeve is withdrawn into the outer sleeve. As shown in FIG. 5, the rear end of the nut 126 which was touching the equalizer 116 is thus withdrawn into the outer sleeve a distance equal to the relief distance. Because the nut extends outwardly from the rear wall 168 outer sleeve as shown in FIG. 4, the relief distance is less than the total amount of linear motion of the pressure plate 164. The relief distance is defined by the distance from the end 168 of the outer sleeve where it contacts the equalizer 116 to the rear end of the nut 126 as shown in FIG. 5.

After the step of capturing the nut and moving it the relief distance, the drive means 122 is actuated to rotate the inner shaft 130 and cause the nut 126 to rotate about the threaded rod 124. As the inner shaft rotates it causes the nut to rotate and as the threaded nut rotates it draws the inner rod into the threaded nut and the free end of the threaded rod at some point extends all the way through the nut and into the cavity formed in the inner sleeve.

As the drive means 122 is driving the inner sleeve 130, the outer sleeve 128 is also rotating. If designed accordingly, the outer sleeve could also be kept stationary as long as rotary seals are used between the outer sleeve and inner sleeve inside the pressure chamber 148. Note that in FIG. 5 the spring 166 is compressed and the pressure plate 164 is abutting the rear wall of the rear housing 146.

The drive means 122 actuates (rotates) the inner sleeve 130 to turn the nut 126 and draw the threaded rod 124 through the nut, thereby tensioning the brake cable system 100. As the brake cable system is tensioned, the inner sleeve is pulled or loaded under tension through its connection with the nut. This tension load is measured by the force measurement means 136, such as the strain gauge 174 or plurality of strain gauges. As the drive means continues to cause the nut to turn and draw the threaded rod further into the inner sleeve, the force measurement means tracks the load that it is measuring, and through calibration with the brake cable system, triggers the drive means 122 to turn off when the desired load is achieved. At the desired load, the voids and slack tension of the brake cable system have been substantially removed.

Simultaneously with the turning off of the drive means, or at a close proximity in time to the turning off of the drive means, the air pressure in the pressure chamber 148 is released (automatically, in one example, by the measurement means 158) in order to allow the spring 166 to push the pressure plate 164 back towards the front wall 144 of the pressure chamber and thereby draw the second end 168 of the outer sleeve 128 towards the second end of the inner sleeve 130 (or alternatively, relative to the outer sleeve, make the inner sleeve move outwardly toward the second end of the outer sleeve). This relative movement terminates when the rear end of the nut 126 engages the equalizer 116, which indicates that the relief distance has been traveled by the nut. Again, when the nut travels the relief distance, the tension in the park brake cable system is reduced sufficiently to allow the brakes to disengage. As the nut moves towards the second end of the outer sleeve, the capturing device 132 passes back into the annulus 170 formed in the inner wall of the outer sleeve near its second end and the capturing device springs outwardly to disengage from the groove 163, and therefore release the nut 126 from the recess 141 formed in the second end of the inner sleeve.

FIG. 6 shows the park brake tensioning system at the point where the force measurement means 136 determines that the desired cable tension has been achieved. The drive means has been turned off but the pressure has not been released from the pressure chamber 148, therefore the nut 126 is still spaced away from the equalizer 116 by the relief distance 182. This can be considered the fourth state of the device. The threaded rod 124 extends past the nut 126 a predetermined distance, such as a half inch or less or as dictated by the designer, and therefore does not pose a problem to further assembly or aesthetic processing during assembly.

FIG. 7 shows the final state of the tensioning apparatus 120 wherein the drive means 122 has been turned off, the air pressure has been released to allow the inner 130 and outer 128 sleeves to become aligned with one another, the pressure plate 164 to contact the front of the pressure chamber, and the nut 126 to be disengaged from the inner sleeve.

The relief distance 182, as described above, is created by the relative movement of the outer sleeve with respect to the inner sleeve. As described above, the outer sleeve is caused to move axially along the inner sleeve and towards the equalizer 116 by an offset means, such as air being forced into the pressure chamber, which overcomes the force of the spring 166. (When the air pressure is released, the spring pushes the pressure plate back to the front of the pressure chamber.) It is contemplated that several different offset mechanisms can be used to cause this motion of the pressure plate. While air or any type of gas has been disclosed, hydraulic fluid can also be used. Hydraulic fluid would have the benefit of being incompressible and thus provide a better system stiffness to allow for more accurate load readings by the force measurement means 136. In addition, a selectively operable (either manually or automatically) valve can be mounted in the pressure port to block the pressure port once the adequate amount of pressurized fluid (whether gas or hydraulic fluid) was received in the pressure chamber. A quick connect structure (not shown) could be used to allow the quick connection and disconnection of the supply line to feed gas or liquid into the pressure chamber. This would alleviate the problem of the pressure port rotating and causing the supply line to rotate with it.

In addition, the pressure plate 164 can be actuated by other types of offset means, such as a toggle. FIGS. 8A and 8B illustrate a pressure chamber 148 with a toggle 184 adapted to move the pressure plate 164 within the chamber. The toggle can be actuated either mechanically or automatically. The toggle includes an arm 186 rotatably connected to the pressure chamber. A pneumatic wrench or other means is connected with the arm 186 to cause the arm to rotate rearwardly and thereby press the pressure plate rearwardly. The toggle effects a displacement of the pressure plate 164 within the pressure chamber an amount configured to retract the nut 126 the relief distance into the outer sleeve 128. Thus, in one example, the arm is about the length of the relief distance. The spring 164 may force the pressure plate back to the front wall of the chamber.

Similarly with respect to FIGS. 9A and 9B, a solenoid 188 actuated by an electrical signal could be used to move the pressure plate 164 a desired distance to effect the motion of the outer sleeve 128 with respect to the inner sleeve 130 and cause the nut 126 to be retracted into the outer sleeve the relief distance. These and other types of offset means can be incorporated into different structures into the outer sleeve and inner sleeve which do not have a pressure plate or pressure vessel, which are not needed in the non-pressurized fluid version. Therefore, the physical construction of the tensioning apparatus could be made lower profile and generally smaller using either mechanical or electromechanical means. Electromechanical means would also provide a more rigid tensioning apparatus to provide a more accurate measurement of the force on the force measurement means.

As mentioned above, the load measurement means 158 could be a spring gauge or a load sensor or any other type of device that can detect sufficiently low levels of tension or compression that are being dealt with in the instant park brake cable tension system. These loads and the means by which they are measured are commonly known by one of ordinary skill in the art.

The drive means can be driven either pneumatically, hydraulically, electrically or mechanically. The drive means can be a ratchet wrench 140 or other type of wrench that satisfies the needs of the current system. A torque wrench could even be used to eliminate the need for a force measurement means and its electrical connections to the measurement means. In other words, if a torque wrench were used and set at the proper torque load amount, which was characterized and related to the desired level of tension in the brake cable system, then once the determined torque level was reached, the wrench would start slipping and the operator would know or sense that the operation was complete. If a torque wrench were used, it could be used with any of the embodiments of the relief distance offset means defined above.

FIG. 10 shows a mechanical force measurement means 136, which is a collar 190, having axially extending prongs 192 which engage the groove 163 on a nut 126. As the force increases during tensioning of the system, the prongs 192 deflect outwardly by engaging the sloped front surface 194 of the groove, and at the proper load level, the prongs are deflected sufficiently to allow the nut to release from the capture structure 132 formed by the collar. The nut would then move the relief distance 182 back to the equalizer. The load required to cause the prongs to spring outwardly over the smooth rear surface of the nut can be calculated based on the physical characteristics and shape of the nut and the arms.

The instant invention contemplates the steps of receiving the nut, grasping the nut, moving the nut to create the relief distance, actuating the nut to cause the threaded rod to be drawn into the nut, determining the proper amount of tension in the park brake cable system, and releasing the nut and allowing the nut to move back the relief distance to the equalizer.

In determining the desired level of tension or load in the cables of the park brake cable system, it is contemplated that, as described above, electrical, mechanical, or other types of load measuring mechanisms can be used. Once the desired load is attained, overcome or surpassed, regardless of the type of load measuring means, the capturing device 132 will release the nut 126. In some instances the load or force measurement means can be a mechanical measure such as that shown in FIG. 10 with deflecting prongs, an electrical measure such as with the strain gauge.

Other force measurement means 136 can also include piezoelectric deflection causing a calibrated electrical current, optical or laser monitoring to determine mechanical deflection, or infrared or other type of electromagnetic or infrared sensing to determine material status such as heat build-up which could be calibrated to the tension in the park brake cable system.

The force measurement means 136 generates and/or sends a signal to the measurement means 158 indicative of the load or tension on the park brake system 100. The signal can be of any form related to the particular force measurement means. For instance, a strain gauge would register a resistance (or other type) change, a piezoelectric device would generate an electrical signal, a laser or optical system could produce a feedback optical signal or an interrupted electrical signal, or an electromagnetic sensor could deliver an electrical signal.

The measurement means 158 is operably connected to the offset means and the drive means 122 in order to automatically shut them off or turn them on, as directed by the processing logic used to control the tensioning system. For instance, the processing logic may direct the drive means to automatically shut off when the tension load has reached the desired level, and/or it may direct the offset means to retract after the tension load has reached the desired level.

FIG. 11 shows another embodiment of the tensioning device differing mainly in that it has a strain gauge 174 near the end of the inner sleeve and uses quick connect ball bearings 196 in three places around the nut 126 to engage the groove 163 formed therein to hold the nut within the inner sleeve 130 during actuation of the inner sleeve to draw the threaded rod into the nut.

FIG. 12 is a flowchart illustrating a method for using the tensioning device 120 illustrated in FIG. 11 to tension a brake system. The first step (22) is to start the nut 126 on the threaded rod 124. This can be done manually or with a tool. The second step (24) is to attach a tensioning device 120 to the nut. This generally means that the tensioning device is placed over the nut with the nut received in the socket-shaped recess 141. The following steps (26, 28) are to actuate the tensioning device to grasp the nut and rotate the nut on the threaded rod and to retract the nut into the inner sleeve. Actuating the tensioning device can be done by pressuring the cylinder with a hydraulic fluid as in the above embodiments, or by other means described above and as further described below causing the tensioning device to move the inner shaft with respect to the outer shaft thereby grasping the nut.

When the tensioning device is actuated, the nut is pulled back into the tensioning device by the relief distance 182, such as approximately 20 mm. When the tensioning device is actuated, the nut is rotated on the threaded rod, increasing the tension in the brake cable system. The tension is sensed by a load sensing means, such as by a strain gauge 174 or other suitable mechanism. In the above-referenced embodiment shown in FIG. 11, the strain gauge biases against the left side of the quick connect balls 196. Further, the nut can be grasped by the tabs on the inner side of the snap ring as described above.

The next step (30) is to sense the load on the cable system and stop tensioning at the desired load level (step 32). An example of a desired load level is approximately 300 pounds of tension in the cable system. The control unit 158, at the desired load level, automatically stops the tensioning device 120 at the desired load. The desired load can also be measured on an output device for monitoring by the user, who can then manually stop the tensioning device. At this point, the process can be looped back (step 34) to the actuating of the tension device if for some reason the desired load has not been met or if the desired load level has been changed. The load can also be sensed by the strain gauges biasing against the snap ring in one of the embodiments shown above.

The next step (36) is to disconnect the tensioning device from the nut. In the embodiment shown above, this is performed by relieving the air pressure (step 32), which can be done automatically or manually. Any other type of actuation, such as hydraulic or mechanical, can also be manually or automatically controlled to release the tensioning device from the nut.

FIGS. 13-26 illustrate an alternative embodiment tensioning device and system for use in tensioning parking brake systems as described above with reference to FIG. 1. As shown in FIG. 14, a tensioning system 1000 comprises three major components: (1) a tensioning tool 1100 to first pull the nut 1012 at the end of the threaded rod 1014 to the relief distance and then turn the nut on the threaded rod until a predetermined tension is achieved; (2) a nut runner 1200 to provide the necessary rotational motion necessary to turn and drive the nut; and (3) a control system 1300 operationally coupled with both the nut runner and the tensioning tool to monitor and control the flow of fluid to and from the tensioning tool and to turn the nut runner off and on.

The nut runner 1200 (or nut driver) is of a conventional design and may be pneumatically, hydraulically, electrically or manually powered. In a preferred variation of this alternative embodiment as shown in FIGS. 14, 15, and others, an Atlas Copco ETV-28 nut driver is utilized in conjunction with a suitable conventional crows foot attachment 1202 to interface with the tensioning tool. As best shown in FIG. 14, the nut runner 1200 is operationally connected (typically electrically) with a controller 1302 of the control system 1300, whereby the controller 1302 can turn the nut runner on and off. In one variation, the nut runner is pneumatic and includes an electric solenoid valve (not shown) that is controlled by the controller 1302 to turn the flow of pressurized air to the nut runner off and on. In other variations, the solenoid valve may be located away from the nut runner in line with the pressurized air supply conduit (or fluid supply conduit in the case of an hydraulic nut runner). In yet another variation, the nut runner is powered by an electric motor with the speed and operation of the motor controlled by the controller 1302. As can be appreciated by one of ordinary skill in the art, a solenoid valve or an electric motor can be utilized that permits the control system to vary the speed of operation of the nut runner in addition to turning the nut runner on and off.

As illustrated in FIG. 14, the nut runner 1200 is operationally connected with the tensioning tool through a conventional crows foot attachment 1202. At its runner end, the crows foot 1202 has an opening, typically with a square cross section into which the correspondingly-shaped rotational socket head of the nut runner is received. One or more gears (not shown) are contained within the crows foot 1202 to transfer the rotational motion and torque of the nut runner 1200 to the other end of the crows foot attachment which fits over and is keyed to a rotational inner sleeve 1106 of the tensioning tool 1100 to turn the inner sleeve when the nut runner is activated.

Referring primarily to FIG. 13, the tensioning tool 1100 includes the following primary components: (i) a non-rotational outer housing 1102 including a fixed end cap 1104 at one end; (ii) a rotational inner sleeve 1106 slidably contained within the outer housing; and (iii) an anti-rotation assembly contained at least partially within a bore of the inner sleeve that includes a rotationally-fixed sleeve 1108 slidably retained on a rotationally-fixed rod 1110.

The outer housing 1102 includes a nose section 1112 proximate the left end (as shown in FIG. 13); a reservoir section 1114 to the right of the nose section adapted to hold pressurized fluid; and an interface section 1116. The nose section is generally cylindrical and defines an axial bore 1120. The axial bore generally has a diameter along its length that is at least slightly greater than the diameter of the corresponding inner sleeve or shaft 1106 that slides and rotates within the bore. At a short distance to the right of the left end of the axial bore, the bore's diameter increases to form a rightwardly facing radial shelf or flange 1121. The bore 1120 defines an increased diameter portion 1122 to the right of the flange 1121 for a short distance and then gradually tapers inwardly until the bore is restored to its former diameter. As will be described in greater detail below, the increased diameter portion is utilized to contain a snap ring 1124 that is generally disposed between the end of the inner sleeve and the bore 1120 in a relaxed and undeformed state as the nut 1012 and threaded rod 1014 are first inserted into the tensioning tool 1100. In another variation as shown in FIGS. 25-26 and also described below, the snap ring 1124 is replaced by three distinct balls or wedges 1191, wherein the increased diameter portion permits the balls or wedges to move away from the nut when it is first inserted and received into the tensioning tool.

A short distance to the right of the increased diameter section 1122 as shown in FIG. 13, the diameter of the nose section 1112 increases a small amount to provide for a gap between the bore 1120 and the outside diameter of the inner sleeve 1106. This portion of the outer housing continues to the right until the transition of the nose section into the reservoir section 1114. A pair of relatively thin cylindrical bearings 1123 and 1125 are contained within the gap. The bearing 1125 could be removed to leave a gap. The left bearing 1123 has an outside diameter that is slightly smaller than the inside diameter of the bore 1120 so that the floating bearing 1123 is free to spin relative to the outside housing 1102. It is noted that that the bearing 1123 at its inside diameter surface acts to contain and bias the snap ring 1124 (or the wedges 1191 or balls) up against the nut to ensure the nut is securely held in place during the tensioning operation. The right bearing 1125, unlike the left bearing, is pressed into the bore in an interference fit so that it is fixed and does not rotate relative to the outside housing 1102. As such, the right bearing provides support for the inner sleeve 1106 within the outer housing 1102. Both bearing 1123 and 1125 are typically comprised of a hardened metallic material, although depending on a specific tensioning tool design other types of bearing may be substituted for the metallic bearings. For instance, Teflon or UHMWPE bearings or ball bearing assemblies could be utilized with appropriate modifications to the tensioning tool design as would be obvious to one of ordinary skill in the art with the benefit of this disclosure.

The transition between the nose section 1112 and the reservoir section 1114 is denoted by a increase in the outer dimensions of the outer housing 1102. Internally, the axial bore 1120 of the nose section continues into the reservoir section but increases in diameter to form a second right facing radial shelf 1126. The diameter of the axial bore in this portion of the reservoir section is sized to receive a left fluid seal assembly 1128 that is butted against the second radial shelf and secured therein by a retaining ring 1130 that is received into a slot 1132 formed in the bore. In one variation, the fluid seal assembly is made by American Variseal.

The fluid seal assembly typically comprises a cylindrical elastomeric seal 1127 whose outside diameter is butted against the inside diameter of the corresponding portion of the axial bore. An o-ring 1129 is received into a groove on the outside diameter surface of the elastomeric seal to ensure a good fluid seal between the bore and the seal. A garter spring 1131 is contained within the elastomeric seal 1127 that biases the inside diameter surface of the seal 1127 against the rotational inner sleeve 1106. Finally, the fluid seal assembly includes a pair of typically metallic washers (1133A, 1133B) that support the side surfaces of the elastomeric seal 1127. It is to be appreciated that when a pressurized fluid is contained within a reservoir chamber 1134 (described below), a derivative force acts on the washer 1133B causing the washer to compress the elastomeric seal in the longitudinal direction of the tool 1100. This longitudinal compression accordingly causes the elastomeric seal to expand radially, thereby increasing the effectiveness of seal along its interface with the inner sleeve 1106.

As the reservoir section 1114 continues to the right, the diameter of the axial bore increases again to form a reservoir chamber 1134 which can contain fluids therein. An inlet port 1136 is provided to which a fluid conduit 1135 (as seen in FIG. 14) running from the control section and a supply of fluid may be connected. Operationally, as will be described below, a flanged portion (or pressure plate) 1150 of the inner sleeve 1106 acting as a piston moves axially in the reservoir chamber 1134 based on the amount of pressurized fluid contained in the reservoir chamber. To the right of reservoir chamber 1134, the diameter of the axial bore increases slightly to form a third rightwardly-facing radial shelf 1137. The left and open end of a spring retaining cylinder 1138 is braced up against the third radial shelf 1137. The right end of the spring retaining cylinder is generally closed except for a hole 1140 therein for the inner sleeve or shaft 1106 to pass through. The spring retaining cylinder is typically fabricated from a bearing material, wherein the surface of the hole 1140 in the cylinder supports the rotational inner sleeve in conjunction with the fixed bearing 1125 of the nose section 1112.

A coil spring 1142 circumscribes the inner sleeve and is braced against (i) the closed end of the spring retaining cylinder 1138 at its right end and (ii) a metallic washer 1166 that is braced against the flanged portion 1150 of the inner sleeve at the other end, whereby the inner sleeve 1106 is biased leftwardly.

To the right of the reservoir section 1114 is the interface section 1116, wherein the tensioning tool 1100 is coupled with the nut runner 1200. As illustrated in FIG. 24, the bottom portion of the outer housing 1102 in this section is open so that the crows foot attachment 1202 can pass through the opening and couple with the surface of the inner sleeve 1106. The cylindrical end cap 1104 is provided to close the right end of the outer housing, as well as, provide a location to fixedly secure the anti-rotation rod 1110. The cylindrical side of the end cap nests against the surface of the axial bore 1120 with its ends being braced against the right end of the spring retaining cylinder 1138. The end cap 1104 is held in place by a retaining clip 1144 that is received into a circumferential slot 1146 in the axial bore 1120 proximate its right end. As with the outer housing, a portion of the cylindrical side wall of the end cap is removed to permit access to the inner sleeve. To install the crows foot attachment 1202 onto the tensioning tool 1100, the end cap 1104 is removed from the end of the outer housing and the appropriate end of the crows foot 1202 is slid over the inner sleeve, and the end cap is re-installed on the outer housing and secured to the housing by the retaining clip 1144. It is to be appreciated that other arrangements of the interface section are contemplated for coupling a crows foot or other suitable torque transferring device to the tensioning tool to facilitate the tool's operation as would be obvious to one of ordinary skill in the art with the benefit of this disclosure.

Referring again to FIG. 13, the inner sleeve 1106 is generally in the form of an elongated cylinder having an axial inner bore 1148 of varying diameters that extends the entire length of the sleeve. The outside diameter of the inner sleeve is substantially the same along its entire length except for the flanged portion (pressure plate) 1150. The inner sleeve is substantially contained within the outer housing 1102 and is adapted for both free rotation relative to the housing and for a measure of linear movement along a longitudinal axis 1152 of the sleeve. The left end of the inner sleeve's axial bore defines recess 1154 that is sized to receive and couple with the nut 1012 to facilitate unitary rotational motion therewith. It is to be appreciated that a recess of any one of a number of side wall shapes may be utilized to hold and secure the nut provided that the external shape of the nut corresponds accordingly. The right end of the recess interfaces with a smaller diameter generally cylindrical portion of the inner bore 1148.

In between the ends of the recess 1154, a circumferential slot is formed into the outside surface of the inner sleeve. In one or more places along the slot one or more apertures 1158 (two in the illustrated embodiment) extend through the side wall of the sleeve opening into the recess. The apertures and slots are adapted to receive the snap ring 1124 therein, wherein the tabs 1160 of the snap ring extend through the apertures. As will be described in greater detail below, the snap ring deforms resiliently as the inner sleeve 1106 and the nut 1012 are moved to the right in the outer housing 1102 and the snap ring transitions from its undeformed relaxed state in the increased diameter bore portion 1122 of the nose section 1112 (as best illustrated in FIG. 15) to a resiliently deformed state with the tabs biased into a corresponding slot 1162 on the nut to the right of the increased diameter bore portion 1122 (as shown in FIG. 13). The snap ring acts to hold the nut in place when the inner sleeve is moved to the right and acts to prevent the nut and the associated threaded rod 1014 from being pulled from the recess, but the snap ring permits the nut to be easily pulled out of the tensioning tool 1100 when the tensioning operation is complete.

It is to be appreciated that other types of mechanisms can be used to capture and hold the nut during the tensioning operation as would be obvious to one of ordinary skill in the art. For instance, a mechanism utilizing a plurality of metallic wedges (or balls) 1191 as illustrated in FIGS. 25 and 26 can be utilized. Referring to FIG. 25, a cross-sectional view of this alternative capture device along line 25-25 of FIG. 15 is illustrated with the nut 1012 removed for clarity. Instead of a slot with three apertures formed in the inner sleeve, three inwardly tapering apertures 1190 pass through the inner sleeve 1104 at 1120 degree spaced locations. Received into each of the apertures, is a metallic wedge 1191 that has an arcuate outer surface, wherein the arc has a diameter generally the same as that of the outside surface of the inner sleeve 1104. The wedges have a tapered section that corresponds to the taper in the apertures so that the wedges can nest in the apertures with their arcuate outer surface being flush with the outer surface of the inner sleeve, and so that the inner ends of the wedges extend into the cavity (and groove of the nut positioned in the cavity). The wedge shape keeps the wedges from falling through. Further, the wedges can slide radially outwardly (as best seen in the lower two wedges of FIG. 25) so that the nut can be easily received into the hexagonal recess 1154. The space between the inside wall of the increased diameter section 1122 and the corresponding outside surface of the inner sleeve along with the specific shape of the wedges or balls are configured so that the wedges or balls cannot fall out of the tool when the nut is removed.

Referring to FIG. 26, another cross sectional view of an alternative capture device taken along line 26-26 of FIG. 17 is shown with the nut 1012 removed for clarity. When the inner sleeve is move to the right, the wedges 1191 are constrained within the apertures 1190 with there outside surfaces flush with the outside surface of the inner sleeve 1106. The wedges 1191 are fixedly held in this position by the rotational sleeve bearing 1123. It can be appreciated that when the inner portions of the wedges that extended into the recess 1154 are located in a slot 1162 of the nut, the nut is effectively secured within the recess of the inner sleeve.

Referring again to FIG. 13, the inner bore 1148 continues rightwardly through a middle portion of the inner sleeve 1106. The diameter of the bore in this section is at least slightly larger than the outside diameter of the threaded rod 1014, such that the threaded rod can move freely within the inner bore. At a location proximate the middle of the inner sleeve, the pressure plate 1150 extends radially from the surface of the inner sleeve. The pressure plate acts to move the inner sleeve longitudinally relative to the outer housing 1102 depending on the amount of fluid in the reservoir chamber 1134. A right fluid seal assembly 1164 spans between the outer edge of the pressure plate and the side wall of the reservoir chamber 1134. The right fluid seal assembly comprises (i) an elastomeric seal 1165 including a radially inwardly extending flange that is compressed between the metallic washer 1166 and the right facing surface of the pressure plate 1150, and (ii) an outwardly biasing garter spring 1167 that is contained within the elastomeric seal and presses the outer surface of the seal against the inner surface of the outer housing 1102. It is to be appreciated that like the front seal assembly the introduction of pressurized fluid into the reservoir chamber 1134 causes the elastomeric seal to be compressed longitudinally and extend radially thereby increasing the sealing effectiveness of the right fluid seal assembly 1164. Other types of fluid seal assemblies may be utilized as would be obvious to one of ordinary skill in the art with the benefit of this disclosure.

Longitudinally to the right of the pressure plate 1150, the diameter of the inner axial bore increases to form a right facing radial shoulder 1168 within the inner bore 148. The shoulder acts as a stop against which the flared end 1186 of the anti-rotation sleeve 108 rests at its maximum extension as is described in greater detail below.

The anti-rotation assembly primarily comprises the anti-rotation rod 1110 and the associated anti-rotation sleeve 1108. The anti-rotation rod 1110 is fixedly secured to the end cap 1104 of the outer housing 1102 to prevent it from rotating relative to the housing. As illustrated in FIG. 13, a keyed end 1172 of the rod is received through a correspondingly keyed hole 1174 in the end cap to prevent rotation. The rod 1110 also includes a radial flange 1176 that nests against the inside surface of the end cap and is secured there by a retaining clip 1178 that is received into a circumferential groove 1180 on the inside surface of the end cap's cylindrical side wall. The anti-rotation rod has a square cross section and extends to the left within the inner bore 148 of the inner sleeve 1106. The anti-rotation sleeve 1108 has a corresponding bore with a square cross section that is received over the anti-rotation rod for slidable movement relative thereto. The anti-rotation sleeve is cylindrical along its outside surface and is also slidably received within the inner bore 1148 of the inner sleeve. The mating square cross sections of the sleeve's bore and the anti-rotation rod prevent the sleeve from rotating relative to the rod. As can be appreciated, any number of suitable shapes can be utilized to prevent the rotation of the sleeve relative to the rod. For instance, the sleeve and rod could have hexagonal cross sections.

In this embodiment, the end 1182 of the threaded rod 1014 has a cross-sectional shape that is similar to that of the anti-rotation rod 1110 and that corresponds and mates with the bore of the anti-rotation sleeve 1108. Accordingly, when the end of the threaded rod 1014 is received into the anti-rotation sleeve 1108 (as shown in FIG. 22), the threaded rod cannot rotate relative to the outer housing 1102. The coil spring 1184 acts against the flared end 1186 of the anti-rotation sleeve 1108 at one end and the flange 1176 of the anti-rotation rod 1110 on the other end to bias the sleeve 1108 over the end 1182 of the threaded rod when the end of the threaded rod extends through the right end of the nut.

As best shown in FIG. 15, the flared right end 1186 of the anti rotation sleeve 108 bottoms out against the right facing radial shoulder 1168 of the inner bore 1148 so that the spring 1184 can not act to push the nut 1012 and threaded rod 1014 out of the tensioning tool 1100. In other words, the left end of the sleeve 1108 will not exert a force on the nut when the sleeve is fully extended by the coil spring 1184. In variations of the anti-rotation assembly, the outside diameter of the anti-rotation sleeve is small enough to slide into and between the threads of the nut 1014, and the anti-rotation assembly may be configured such that the sleeve 1108 extends at least partially into the nut to receive the end 1182 of the threaded rod 1014 before it exits the right end of the nut. It can be appreciated that the anti-rotation assembly as described herein prevents the friction between the threads of the nut 1012 and the threaded rod 1014 from causing the rod and the corresponding cable to rotate and twist during the tensioning operation.

The control system 1300 shown in FIGS. 14, 16, 18 and 20, provides hydraulic fluid to the tensioning tool 1100 and based on the flow and pressure of the fluid, the controller 1302 of the control system activates the nut runner 1200 to ensure the brake cables are tensioned to a specified level. The primary components of the control system include: (i) a source of hydraulic fluid 1304 and an associated fluid pump 1306; (ii) a diaphragm accumulator 1308 to hold an amount of fluid under pressure; (iii) a three way solenoid valve 1310 for dictating the flow of fluid to and from the tensioning tool 1100; and (iv) the programmable logic controller 1302 connected with flow sensors 1312A and 1312B and a pressure transducer 1314 for selectively activating the nut runner and positioning the three way solenoid valve 1310.

As described above concerning the other embodiments, the threaded nut 1012 must be pulled a relief distance before the brake cable is tensioned. The relief distance ensures that when the parking brake is fully released, the brakes are disengaged enough so that the associated wheels can spin. In this embodiment hydraulic fluid is utilized to pull the nut the required relief distance prior to the tensioning operation. The hydraulic fluid is typically pumped by the hydraulic pump 1306 from an unpressurized source 1304 of fluid into the diaphragm accumulator 1308 until a specified pressure level is reached and the pump is turned off by a cutoff pressure switch 1316. Typically the switch 1316 will automatically turn back on when the pressure in the accumulator 1308 drops below a specified level.

A conduit 1318 extending from the accumulator 1300 is connected with the three way solenoid fluid flow valve 1310 with a one way valve 1320 disposed between the three way valve and the accumulator to prevent fluid from flowing from the three way valve back towards the accumulator. A fluid conduit 1135 also extends between the inlet port 1136 of the tensioning tool and the three way solenoid valve. Finally, a fluid conduit 1322 extends between the three way valve and the fluid source with a one way valve 1324 disposed in the conduit to prevent fluid from the source from being siphoned into the three way valve. In a first (or closed) position of the three way valve, the flow of fluid to and from any one of the conduits to any one of the other conduits is prevented as shown in FIG. 14. In a second position, the flow of fluid from the pressure accumulator 1308 to the reservoir chamber 1134 of the tensioning tool 1100 is permitted as shown in FIG. 16. In the third position, the flow of fluid from the tensioning tool's reservoir back into the fluid source 1304 is permitted as shown in FIG. 20.

The controller 1302 is adapted to (i) receive signals from the flow meters 1312A and 1312B and the pressure transducer 1314 and (ii) control the operation of the three way solenoid valve 1310 and the nut runner 1200 based on the signals. In one variation of the control system 1300, the flow meters are simple binary meters that measure whether or not fluid is flowing through them. In an other variation, the flow meters are more complex and also measure the rate of flow. The pressure transducer 1314 is typically capable of measuring the pressure of the fluid located in conduit 1135 and, accordingly, the fluid in the reservoir chamber 1134 of the tensioning tool 1100. Typically the controller 1302 includes a microprocessor and associated memory that is electronically coupled to the flow meters, the pressure transducer, the nut runner, and the three way solenoid valve, and may be programmed to operate the three way valve and the nut runner in any number ways depending on the output of the flow meter and pressure transducer sensors. The preferred operation of the controller 1302 of this embodiment and several possible variations are described in the following section. It is to be appreciated that in variations of the control system the controller could comprise a hard wired circuit that is not programmable. Further, in other variations, the controller could be mechanical in nature and have mechanical, hydraulic or pneumatic connections with the various sensors, a mechanical three way control valve, and the nut runner.

A flow chart illustrating the operation of the tensioning device and system is provided in FIG. 23. Further, FIGS. 13-21 illustrate the various components of the system at various points during the system's operation.

Referring to block 1402 of FIG. 23, an operator threads the nut 1012 onto the end of the threaded rod 1014 just enough so that the first few threads of the nut are received onto the first few threads of the rod, and the operator inserts the nut in the end of the nose section 1112 of the tensioning tool 1100. As the nut is pressed into the tool: (i) the snap ring 1124, which is contained within the increased diameter bore portion 1122 of the nose section, snaps into place within the groove 1162 of the nut 1012; or (ii) one or more of the wedges 1191 of the clamp mechanism variation of FIGS. 25 and 26 drop into the nut groove 1162. FIGS. 14 and 15 illustrate the configuration of the control system 1300 and tensioning device 1100 at this point of the tensioning operation.

Referring to block 1404, whenever the pressure in the diaphragm accumulator 1308 and the associated conduit 1318 drops below a specified level, the pump cutoff switch 1316 turns the pump on to both pump fluid into the accumulator 1308 and pressurize the accumulator. Once the specified pressure is achieved, the cutoff switch deactivates the pump 1306.

In block 1406, the operator activates the controller 1302, causing the controller to move the three-way solenoid valve into its second position from the first position, thereby permitting pressurized fluid to flow into the reservoir chamber 1134 of the tensioning tool. It is appreciated that controller operation can be activated in any number of ways, but as illustrated in FIGS. 16 and 17, the controller is actuated by depressing the actuator arm 1204 on the nut runner 1200. As the fluid flows into the chamber 1134, it acts on the pressure plate 1150 and pushes the inner sleeve 1108 and the nut received in the recess 1154 of the inner sleeve to the right (as illustrated in FIGS. 16 and 17).

As discussed in other sections of this specification, the nut is moved off of an associated equalizer bracket (see FIG. 1) a predetermined relief distance (such as approximately 22 mm). The tensioning system can be configured in a number of different ways to ensure that the proper relief distance is achieved. As illustrated herein, the pressure plate 1150 and its associated metallic washer 1166 can only slide a certain distance within the reservoir chamber 1134 before the washer and/or the right end of the inner sleeve 106 impact fixed elements (either or both the spring retaining cylinder 1138 or the flanged portion 1176 of the anti-rotation rod 1110) within the tensioning tool 1100. This distance is equivalent to the required relief distance. Once the reservoir is full, flow from the accumulator to the reservoir stops and the flow meter 1312A signals the cessation of flow to controller 1302.

In another variation of the tensioning system, the linear travel of the inner sleeve along the longitudinal axis 1152, within the tensioning tool is greater than the desired relief distance (i.e. the inner sleeve can move further than the desired relief distance). In such a variation, a more sophisticated flow meter 1312A is utilized that may determine the volume of fluid that has flowed through it and into the reservoir chamber 1134 in order to control the amount of movement. The controller 1302 permits the fluid to flow until the volume of fluid necessary to move the pressure plate and inner sleeve the specified relief distance has flowed into the reservoir chamber at which point the controller activates the three way valve 1310 to move it back to its first (or closed) position. Many other additional methods of controlling and measuring the movement of the inner sleeve 1106 and the nut 1012 are possible as would be obvious to one of ordinary skill in the art. For instance, a linear positioning sensor could be coupled to the inner sleeve 1106 and the controller 1302 to send signals to the controller indicating the position of the sleeve relative to the outer housing 1102.

Referring to FIGS. 15 and 17, as the nut is pulled to the right, the tabs 1160 of the snap ring (or one or more of the wedges 1191) are pushed against the left shoulder of the nut's slot 1162, thereby pulling the snap ring (or the wedges) to the left as well. As the snap ring is pulled across the tapered portion of the increased diameter portion 1122 of the outer housing's axial bore 1120, the snap ring is resiliently deformed with the tabs being pushed further into the slot 1162 of the nut. In the FIG. 25 capture mechanism variation, the wedges are slid inwardly as their outer surfaces contact and slide by the tapered portion until the outer surface of the wedges are flush with the outside diameter of the inner sleeve. As the tension in the threaded rod is increased the right edges of the tabs of the snap ring (or the wedges) are forced against the right shoulder of the slot 1162, while the left edges of the snap ring (or the wedges) are simultaneously forced against the left sides of the apertures in the recess 1154 of the inner sleeve. Accordingly, the nut 1012 is secured to the inner sleeve 106 during the tensioning operation.

Referring to block 1408, after moving the three way valve back into the first (closed) position, the nut runner is activated to turn the inner sleeve 1106 and nut on the threaded rod, and effectively pull the treaded rod toward the right (as shown in FIGS. 18 and 19), thereby tensioning the brake cable attached to the threaded rod 1014. Since the three way valve is closed in its first position, the fluid pressure in the reservoir chambers increases as the tension in the threaded rod attempts to pull the inner sleeve and the pressure plate 1150 leftwardly. As can be appreciated, the pressure of the reservoir fluid is directly related to the amount of tension in the brake cable. Accordingly, by monitoring the fluid pressure within reservoir chamber 1134 via the pressure transducer 1314, the controller 1302 can determine when the desired tension level within the brake cable is achieved and shut off the nut runner 1200. In variations of the tensioning system wherein the speed of the nut runner is variable, the controller can begin to reduce the speed of the nut runner as the tension in the cable gets close to the desired level, thereby permitting more precise control of the resulting tension in the brake cable. This pressure monitoring allows a direct measure of the load on the cable system. By factoring out the internal resistances of the tensioning tool caused by its various parts, the actual load on the cable system can be determined.

As the threaded rod 1014 is pulled through the nut 1012 and out of the nut's right side, the anti-rotation sleeve 1108 is (i) biased against the end 1182 of the threaded rod by the coil spring 1184 and (ii) pushed over the similarly keyed bore of the anti-rotation sleeve. As described above the anti-rotation assembly prevents the threaded rod and its associated brake cable from being twisted as the frictional force between the threads of the nut 1012 and the threads of the threaded rod 1014 increases as the tension level increases.

Referring to block 1410, once the nut runner 1100 has been deactivated, the controller 1302 activates the three way solenoid valve 1310 to move it into its third position and the fluid in the reservoir chamber flows back to the fluid source 1304 (as shown in FIGS. 20 and 21). The fluid is forced out of the reservoir chamber by a leftwardly acting force applied against the pressure plate by the coil spring 1142 that is biased against the metallic washer 1166. As the fluid flows through the associated conduit 1135 and 1322 to the fluid source 1304, the controller monitors the flow through the flow meter 1312B. Once either the flow has stopped or the amount of fluid flowing through the flow meter is substantially equal to the amount originally pumped into the reservoir chamber 1134, the controller moves the solenoid valve back into its first and closed position. As indicated in block 1412, once the inner sleeve and the nut have moved back into their initial positions, the tensioning device can be removed from the nut and readied for use on another parking brake system.

A third embodiment of the tensioning device of the present invention is shown in FIGS. 27-39. This third embodiment of the invention has substantially similar structure to that of the earlier embodiments, and performs the same function of tensioning the park brake cable system. FIG. 27 is a partial perspective view of the tool 1500, including the tensioning device 1502, crow's foot 1504 and nut runner 1506, all positioned prior to engagement with the nut 1508. The nut is shown threaded onto the rod 1510 to engage the equalizer 1511. FIG. 28 is a front view of the tool. FIG. 29 is a side view of the tool, and FIG. 30 is a rear view of the tool.

FIG. 31 is a section view of the tool 1500 taken along line 31-31 of FIG. 28. FIG. 31 and the Figures that follow show that several structural elements of the third embodiment of the tool are common to the previously disclosed embodiments, and other additional elements are included, all operating to perform the same function as previously disclosed. Referring to FIG. 31 and others, the outer housing 1512 of the tool has a front portion 1514, a middle portion 1516, and a rear portion 1518. The front portion has a cylindrical shape, and the middle portion has a cylindrical shape having a larger diameter than the front portion. The rear portion has a cylindrical shape having a larger diameter than the middle portion. The front portion includes a nut receiving recess 1520 at its free end.

An input shaft 1522 extends along the length of the tensioning device 1502 between the front portion 1514 and the rear portion 1518, and is supported so as to be rotatable within the outer housing 1512, as is described in greater detail below. The input shaft has an enlarged outer end region 1523 that defines a nut receiving cavity 1524 as previously disclosed with respect to the other embodiments. An annular space 1526 is formed in the outer housing around the front end of the input shaft for receiving the stops 1528. As discussed above, and in more detail below, the stops extend through apertures 1530 formed in the enlarged end of the input shaft 1522 and in conjunction with their position relative to the front portion of the outer housing, act to grab the central groove 1532 of the nut 1508 when the nut is positioned in the nut receiving cavity.

Continuing to refer to FIG. 31, the input shaft 1522, along the majority of its length extending away from the enlarged end 1523, has a constant outside diameter (like a tube) and extends rearwardly. The enlarged end of the input shaft is supported by a float bearing 1534 near its free end, the float bearing being positioned between the enlarged end of the input shaft and the front portion 1514 of the outer housing 1512, preferably with some extra space formed between the float bearing and the outer housing where the input shaft transitions from having an enlarged end to a reduced sized. A shoulder 1536 is formed where the large end transitions to the smaller diameter for the balance of the length of the input shaft. An elongated cylindrical bearing 1536 surrounds the input shaft 1522 and extends from along a portion of the enlarged end 1523 of the input shaft to the middle portion 1516 of the housing. The outer housing defines a shoulder 1540 at the transition from the front portion to the middle portion. The shoulder receives an outwardly extending flange 1542 of the cylindrical bearing.

The input shaft 1522 has an internal bore formed therethrough for receipt of an anti-rotation structure 1544, as is described further below.

A piston shaft 1546 having a hollow cylindrical main body and a radial flange 1548 extending outwardly adjacent its rearward end is positioned over the input shaft 1522 along its length from adjacent the enlarged portion of the input shaft rearwardly. The piston is inserted between the bearing 1538 and the input shaft. The piston is configured to slide lengthwise along the interior cavity of the housing in alignment with the input shaft. The input shaft is able to rotate; however, the piston does not rotate with the input shaft. A seal 1550 is positioned in the middle portion 1518 to extend annularly around a portion of the piston shaft and extend between the piston shaft and the wall of the outer housing in the middle portion region. The seal is held in place by a snap ring (1552A, 1552B) on either side. The seal acts to keep any fluid in the pressurized fluid chamber 1554 of the rear portion of the housing from accessing the front portion of the housing.

The rear end of the input shaft 1522 is received in a drive adapter 1556. The drive adapter is in turn received in the crow's foot 1504 and can slide along its length within the crow's foot. The drive adapter has a keyed exterior shape in order to be rotationally engaged by the aperture in the crow's foot which is similarly keyed. The inner end of the input shaft has a keyed outer surface which is received in a similarly keyed inner bore of the drive adapter. Thus, the rotation of the crow's foot causes the drive adapter to rotate, which, in turn, causes the shaft to rotate. The drive adapter is preferably made of a low friction material, such as Delrin, to allow it to slide within the crow's foot, as is explained in greater detail below. A snap ring 1558 is positioned around the input shaft at its inner end and keeps the input shaft from sliding in the passage way of the drive adapter.

Referring to FIGS. 31 and 34, a rolling diaphragm 1560 is positioned to seal between the inner surface of the piston flange 1548 and the outer side of the rear portion 1518 of the housing. The rolling diaphragm separates the rear portion into two chambers. The rolling diaphragm is generally cup-shaped with a bead 1562 around the rim of the cup. The bead is held in place by a bead retainer 1564 which extends annularly around the outer wall of the rear portion of the outer housing and engages the radial wall formed by the change in diameter from the middle portion to the rear portion. The bead retainer is held in place by four screws 1566, in one example, inserted through the radial wall. The bead retainer has an aperture 1568 formed in its side wall near its base, as shown in FIG. 39A. This aperture allows bleeding of the hydraulic system to remove any air from the hydraulic system prior to use. With one of the bead retainer fasteners (1566A) removed, the system can be bled so that air passes through the aperture 1568 in the side wall of the bead retainer and out the aperture for receiving the fastener. Once bled, the fastener can be replaced. The bead retainer has thin side walls 1570 that help hold the rolling diaphragm against the inside of the rear portion of the outer housing 1512, which keeps the rolling diaphragm 1560 from becoming distorted upon extension and retraction, as is described in further detail below.

An alignment pin 1572 is positioned in the base of the bead retainer 1564 and extends into an alignment groove 1574 formed on the radius of the piston flange 1548. This helps maintain the alignment of the piston flange with respect to the bead retainer, and thus with respect to the outer housing. The closed end of the rolling diaphragm 1560 defines a central aperture 1576 for receiving the piston shaft 1546 and is fastened to the inner surface of the piston flange by a plurality of fastening means, such as screws 1578. A clamp plate 1580 traps the inner rim of the rolling diaphragm 1560 between its annular base (which surrounds the piston shaft) and the piston flange 1548. The fasteners 1578 extend through the base of the clamp plate, through the inner rim of the rolling diaphragm and anchor in the piston flange 1548. A backing block 1582 annularly surrounds the input shaft as it extends from the inner end of the piston. The backing block clamps a Torrington thrust roller bearing 1584 to the clamp plate. The Torrington thrust roller bearing has a washer plate (1586A, 1586B) on either side to assist in the engagement and compress position between the backing block and the clamp plate. The backing block is secured in position on the input shaft 1522 by a snap ring 1588 positioned in a groove 1590 formed around the input shaft. The backing plate has a keyed central aperture 1592 which fits and aligns with the keyed outer diameter 1594 of the input shaft so that the backing plate rotates with the input shaft.

A compression spring 1596 (see FIG. 39B) is positioned in the rear portion of the outer housing and extends from the outer face of the crow's foot to a shoulder formed on the inner wall of the clamp plate 1580. The compression spring keeps the clamp plate, and thus the piston 1546, biased in an extended position, as shown in FIG. 31. An arm 1598 extends off the top of the clamping plate and is received in a notch 1600 formed in the top of the crow's foot. The arm extends along the longitudinal axis of the main body, and thus as the piston moves back and forth, the arm moves along the length of the alignment slot, which together acts as a key to maintain the desired orientation of the clamping plate 1580, the backing plate 1582, and the piston 1546 during operation.

The piston flange 1548 in combination with the rolling diaphragm 1560 effectively separates the rear portion 1518 of the outer housing into two chambers or compartments. The first compartment or pressure chamber 1554 is formed between the seal in the middle portion of the housing and the rolling diaphragm/piston flange combination. The second compartment 1602 of the housing is formed between the rolling diaphragm/piston flange and the inner end of the rear portion of the housing. A hydraulic fluid inlet port 1604 is formed in the housing and extends from the bottom of the housing. The port is positioned between the outer seal and the piston flange. The port is adapted to receive connection structure for attaching hydraulic system components, such as hydraulic lines.

So far as described, the combination of the piston 1546, backing plate 1582, clamp plate 1580, input shaft 1522 and drive adapter 1556 all are able to slide along the longitudinal axis of the housing. The drive adapter, the input shaft and the blocking plate rotate around the longitudinal axis of the housing and within the piston. The Torrington thrust roller bearing 1584 allows the backing block to rotate with the input shaft with respect to the clamp plate. As is described further below, this relative motion of the internal parts is effective in turning the nut 1508 around the threaded rod 1510 in order to tension the park brake cable system 100.

The anti-rotation structure 1544 shown in FIG. 31 helps keep the threaded shaft from rotating while the nut is turned onto it during the actuation of the tool. As shown in FIGS. 27, 33 and 34, it can be seen that the tip of the threaded rod 1510 defines a key shape, such as a square perimeter (other keyed shapes would work). An anti-rotation sleeve 1606 is positioned in the inner bore of the input shaft 1522. As best shown in FIG. 39A, the anti-rotation sleeve 1606 has a central bore that defines the corresponding shape to the keyed shape on the end of the threaded rod. For instance, the internal shape of the anti-rotation sleeve could be any shape that receives the keyed tip of the threaded rod and keeps one from turning with respect to the other. The shoulder 1608 formed on the inner end of the anti-rotation sleeve abuts a shoulder 1610 formed on the interior circumference of the input shaft 1522. This keeps the anti-rotation sleeve 1606 from moving axially towards the outer end of the input shaft. The outer end of the anti-rotation sleeve has an inner tapered wall 1610 to assist in smoothly receiving the tip of the threaded rod.

An anti-rotation rod 1612 extends from the inner end of the rear housing into the bore of the anti-rotation sleeve. The anti-rotation rod is also keyed so that when engaged, the anti-rotation sleeve and the anti-rotation rod do not rotate with respect to one another. A flange 1614 extends around the anti-rotation rod near its inner end. The flange extends to the side walls of an end cap 1615 of the rear portion of the housing and is held in place there by a snap ring 1616. The inner end of the anti-rotation rod is keyed to fit into a keyed aperture in the end cap which keeps the anti-rotation rod from rotating. A spring 1618 surrounds the anti-rotation rod and extends from the flange to the inner end of the anti-rotation sleeve.

The anti-rotation sleeve 1606 can slide along the anti-rotation rod 1612 to facilitate the axial movement of the sleeve when engaged with the tip of the threaded rod 1510 during the tensioning process, which is described in greater detail below.

FIG. 32 shows a perspective view of the tool 1500 mounted on the end of the threaded rod 1510 such that the nut 1508 is received in the cavity 1524 at the end of the input shaft 1522. In more detail, with respect to FIG. 33, when the tool 1500 is mounted on the end of the threaded rod 1510, the nut 1508 is received in the input shaft 1522, and the unthreaded keyed end of the threaded rod is positioned inside the anti-rotation sleeve 1606. At this point the nut is not clamped in the nut receiving cavity of the input shaft.

FIGS. 33, 34 and 35 show the mounting of the tool on the threaded rod and nut (FIGS. 33 and 34), and the withdrawal of the input shaft into the housing to cause the nut to be grasped within the nut receiving cavity of the input shaft (FIG. 35). In FIG. 33, the outer end of the input shaft is flush with the outer end of the housing, and the stops 1528 are not forced into engagement with the nut. The stops are recessed into the space 1526 formed outside the enlarged end of the input shaft 1522.

Referring next to FIG. 34, the input shaft 1522 is withdrawn into the housing as a result of some hydraulic fluid being pumped into the first chamber 1554, thereby pushing the piston 1546 rearwardly. As the piston is moved rearwardly, it pulls the input shaft with it. The nut is pulled out of contact with the equalizer 1511, and the housing 1512 is in engagement with the equalizer. The stops 1528 positioned in the annular space around the outer end of the input shaft engage the sloped side wall of the annular space and are pushed through the apertures 1530 in the enlarged end to fit into the groove 1532 formed in the center of the nut. The outer edge of the stops become flush with the outer circumference of the input shaft. The nut is now secured within the nut recess in the end of the input shaft.

Referring to FIG. 35, the piston 1546 is shown at its furthest right position where it has hit a hard stop and cannot travel any further. A maximum amount of hydraulic fluid has now been pumped into the chamber 1554. The hard stop is between the rim of the clamp plate 1580 and the face of the crow's foot bolt. The hard stop can also be signaled by the maximum compression of the spring 1596, or by the engagement of the alignment arm 1598 on the clamp plate engaging the end cap 1615 of the housing, or some other physical stop mechanism. At this point, the first chamber 1554 is filled with hydraulic fluid, and cannot get any larger. The nut 1508 is held in the nut receiving cavity 1524 by the stops 1528 engaging the groove 1532 in the nut. The stops are positioned adjacent the float bearing 1534 which keep the stops in place and keep them from retracting away from the nut. This effectively locks the nut into the nut cavity in the input shaft.

The float bearing 1534 spins with the input shaft 1522 and keeps the inner surface of the front end of the housing from wearing excessively due to the rotation, and specifically keeps a groove from being worn on the inside of the housing by the centrifugal force pushing outwardly on the stops during the high speed rotation. There is a slight space between the float bearing and the outer housing 1512 to allow the float bearing to spin relatively freely.

FIG. 35 shows the drive adapter 1556 pushed all the way through the receiving channel 162—of the crow's foot 1504. The anti-rotation sleeve 1606 has also pushed rearwardly on the anti-rotation bar 1612, and the spring 1618 surrounding the anti-rotation bar has become compressed. The compression spring 1596 in the second chamber 1602 of the housing is also compressed to its minimum dimension. The alignment arm 1598 on the clamp plate 1580 has moved along the alignment slot 1600 on the crow's foot. The distance that the piston 1546 has moved rearwardly from the first extended position to the second most retracted position is the relief distance. This is adjustable based on the dimension of the housing or can be adjusted to any distance less than the hard stop distance by decreasing the amount of hydraulic fluid forced into the first chamber 1554. Therefore, the maximum relief distance is from the extended position to the hard stop retracted position, however, the relief distance can be less than this distance, as desired.

FIGS. 33A, 33B, 33C, 34A and 35A show various cross-sections of the nut in the nut recess of the input shaft prior to, during and after the nut is locked therein by the stops. More specifically, FIG. 33A is a section view of the tool taken along line 33A-33A of FIG. 33 showing the threaded portion of the rod 1510 inside the nut 1508 with the nut received inside the recess 1524 of the input shaft 1522, and with the input shaft being surrounded by the outer housing. The input shaft and nut rotate within the outer housing 1512 while the threaded rod does not rotate. FIG. 33B is a section view of the tool taken along line 33B-33B of FIG. 33 showing the stops 1528 positioned in the slots formed in the enlarged outer end of the input shaft prior to the stops beginning to engage the groove formed around the center of the nut. The stops are shown each positioned in a respective slot 1530 and in an outermost position. The threaded portion of the rod 1510 is shown inside of the nut and the outer portions of the stops are shown in engagement with the outer housing 1572. Note, the slots 1530 for each of the stops have angled walls to allow the stops to move inwardly to a point where the outer surface of the stops is flush with the outer surface of the input shaft. The stops cannot, however, fall through their respective slot. A variety of different sloped surface structures and associated stop shapes could be used to replicate this effect. FIG. 33C is a section view taken of the tool along line 33C-33C of FIG. 33 through the tip of the threaded rod 1510 where the tip is inserted into the anti-rotation shaft 1606. The anti-rotation shaft is shown received in the keyed interior of the anti-rotation shaft, which is in turn received within the input shaft 1522. The outer housing surrounds the input shaft. When actuated, the input shaft rotates and the anti-rotation shaft, threaded rod, as well as the outer housing all remain stationary.

FIG. 34A is a section view taken along line 34A-34A of FIG. 34 showing sections through the stops 1528 and the nut 1508 before the input shaft 1522 is retracted enough to position the nut within the float bearing. As the piston is retracted into the outer housing, the stops engage the ramp 1622 at the inner end of the annular space in the outer housing. As the stops engage the ramp, the stops are pushed radially inwardly into the groove 1532 in the nut 1508. FIG. 34A shows the stops partially positioned through each slot 1530 and into the groove on the nut. FIG. 34B is a representative section view of a stop with a sloped front shoulder. This sloped front shoulder complements and mates with the corresponding shoulder on the nut to provide better contact and reduce the stress concentrations on the tip of the stop. This angle on the stop would thus match the angle on the shoulder of the nut so the two surfaces would engage one and other.

FIG. 35A is a section view taken along line 35A-35A of FIG. 35 showing the position of the stops 1528 with respect to the nut when the nut is fully retracted and the outer end of the input shaft is positioned within the float bearing. Here the outer surface of the stops are flush with the outer surface of the input shaft, and the float bearing fits tightly around the input shaft thus retaining the stops in the slots and thus in engagement with the nut.

FIG. 35B is a section view taken along line 35B-35B of FIG. 35 showing the housing surrounding the crow's foot 1504. The crow's foot has the seal clamp alignment arm 1598 positioned in the alignment slot 1600. The spring 1596 is compressed to the face of the crow's foot. The keyed rotational drive 1620 of the crow's foot surrounds the drive adapter 1556. The input shaft 1522 is inside the drive adapter 1556, and the anti-rotation spring 1618 and rod 1612 are inside the input shaft.

FIG. 35C is a section view taken along line 35C-35C of FIG. 35 showing the crow's foot 1504 and one embodiment of gears inside the crow's foot which cause the rotation of the drive adapter 1556, which in turn causes the rotation of the input shaft 1522. The bottom gear 1524 of the gear train is attached to the nut runner 1506. The bottom gear turns an intermediate gear 1626, which in turn engages and turns the top gear 1628. The top gear has a key on its inner surface, such as the top and bottom rails shown in FIG. 35, to receive the corresponding grooves in the drive adapter 1556, so that when the top gear turns, the drive adapter turns with it. The input shaft has a keyed end which is received in the keyed bore of the drive adapter so that when the drive adapter is turned the input shaft is turned. The anti-rotation rod 1612 is shown in the center, surrounded by a spring 1618. The anti-rotation rod is anchored to the end cap 1615 of the tool, and thus does not rotate with the input shaft.

FIG. 36 shows the tool with the nut 1508 after the tensioning operation has been performed. The threaded rod 1510 is extended into the input shaft 1522, and has pushed the anti-rotation sleeve 1606 rearwardly over the anti-rotation rod 1612.

FIG. 36A shows the keyed end of the anti-rotation rod 1612 positioned in the keyed recess in the end cap 1615. This keyed engagement keeps the anti-rotation rod from rotating with the input shaft.

FIG. 37 is a representative section view of the tool showing the nut position after the tensioning step is performed, and the nut is extended outwardly by the relief distance, the piston having moved from the fully retracted position (see FIG. 36) to the fully extended position. The spring in the second chamber of the rear portion of the housing biases the piston shaft to the outer extended position. In this position, the nut 1508 is in contact with the equalizer 1511. The stops 1528 have fallen away from the nut and are no longer held in engagement with the groove 1532 in the nut by the float bearing 1534, therefore allowing the nut to be retracted from the recess in the end of the input shaft.

FIG. 38 is a representative section view of the tool showing the tool head retracted from the nut, and the length of the threaded rod 1510 having been pulled through the nut to obtain the proper tension for the park brake cable system.

FIGS. 39A and 39B show an exploded view of the third embodiment of the tool.

FIG. 42 shows another embodiment of the tool similar to that shown in FIG. 34, however, the anti-rotation structure in FIG. 42 includes a friction-reducing component 1628 to alleviate the torsional friction associated with the tightening of nuts that have prevailing torque factors. Such a nut would include a lock nut with a wax ring incorporated into it, or the like. When tightening a nut having prevailing torque features, the rotation of the nut on the screw creates a relatively high torsional lode between the threaded rod and the anti-rotation structure. In an anti-rotation structure such as that shown in FIG. 34, that torsional load increases the friction between the anti-rotation shaft and the anti-rotation rod, thereby increasing the force it takes to move the anti-rotation rod along the anti-rotation sleeve. This affects the level of tension in the system, making actual tension more difficult to measure as well as increasing the wear and tear on the internal parts. In FIG. 42, the friction-reducing structure helps reduce and nearly eliminate the torsional friction as well as the axial sliding friction.

The anti-rotation structure includes an anti-rotation sleeve 1630 extending from the end cap 1615 of the rear portion 1518 of the housing 1512 towards the outer end of the tool. The anti-rotation sleeve terminates adjacent to the transition of the rear portion of the housing to the middle portion 1516 of the housing. An anti-rotation arm 1632 is received in the bore of the anti-rotation sleeve and can axially slide into and along the sleeve. The anti-rotation arm is retained within the sleeve by the ball bearing assembly 1634 as described in further detail below. The outer end of the anti-rotation arm is attached to an anti-rotation cup 1636. The cup defines a keyed recess open at one end, with the closed end attached to the anti-rotation arm by a cap screw 1638. The recess receives the keyed end of the threaded rod 1510. A spring 1640 extends from the outer end of the anti-rotation sleeve 1630 to a shoulder 1642 formed on the outer end of the anti-rotation cup 1636, the spring surrounding the majority of the length of the anti-rotation arm as well as the anti-rotation cup. The spring biases the arm in an extended position away from the anti-rotation sleeve. A lobe 1644 extends from the inner end of the anti-rotation cup 1636 into a corresponding groove formed on the anti-rotation arm 1632 to keep the cup from rotating with respect to the arm. This alleviates the sole reliance on the reverse threaded cap screw 1638 for maintaining this nonrotational relationship.

The inner end of the anti-rotation arm 1632 is retained within the anti-rotation sleeve by the ball bearing structure 1634. As shown in FIGS. 42A, 42B and 42C, as well as FIGS. 43-44A, the anti-rotation arm 1632 has plurality of longitudinally extending grooves 1646 for receiving a plurality of ball bearings 1648 in each group. The arm effectively has a triangular shape with two grooves 1646 on each side. The grooves run along at least a portion of the arm so that to whatever extent the arm has axially moved into the anti-rotation sleeve, a groove extends along that overlapped length.

Corresponding grooves 1650 are formed in the inner surface of the bore of the anti-rotation sleeve 1630 for allowing the retention of a plurality of ball bearings in each of the grooves on the arm in conjunction with the corresponding grooves on the sleeve. This structure, best shown in FIG. 42B, allows for excellent low friction axial motion of the arm within the sleeve. When the arm is rotationally torqued with respect to the sleeve, the ball bearings continue to serve as a friction reducer. The ball bearings are held in the overlapped groove area between the sleeve and the arm by a cap 1652 screwed into the inner end of the arm. The cap screw has a flange which extends to cover part of the groove and keep the ball bearing from falling out of the groove. At the outer end of the anti-rotation sleeve, a bearing cap 1654 is press fit into the sleeve 1630 and fits closely around the grooved shape of the arm 1632 without interfering with the movement of the arm within the sleeve. The ball bearings engage the base of that bearing cap 1654 and are therefore trapped in the overlapped region of the inner rotation sleeve and inner rotation arm. As the anti-rotation arm 1632 is moved from the fully extended position (which is defined by the number of ball bearings in any one of the grooves) to a retracted position, the ball bearings spread out in the overlapped region between the arm and the sleeve and continue to provide a friction-reducing effect. The compaction of the balls together in the fully extended position keeps the arm from being pulled axially out of the sleeve. The anti-rotation spring keeps the arm biased in the extended position.

The inner end of the sleeve 1630 has a keyed end which fits through a corresponding keyed aperture formed in the end cap 1615. An annular flange 1656 extends peripherally around the end of the sleeve and engages the inside wall of the end cap 1652 to keep the anti-rotation sleeve from moving out through the aperture. A snap ring 1658 is positioned around the periphery of the inner end of the anti-rotation sleeve to fix the anti-rotation sleeve in position axially with respect to the housing.

FIG. 42A is a cross-section taken along line 42A-42A of FIG. 42 through the front portion of the housing 1512 with the improved friction and anti-rotation structure. FIG. 42B is a cross-section taken along line 42B-42B of FIG. 42 through the first chamber 1554 of the rear portion 1518 of the housing and shows the ball bearings 1648 positioned in their respective grooves 1646, 1650 formed between the anti-rotation arm 1632 and the anti-rotation sleeve 1630. FIG. 42C is a partial enlarged version of the central region of FIG. 42B and further shows the ball bearings positioned in the appropriate grooves or channels formed between the anti-rotation arm and the anti-rotation sleeve. From this figure it is easily seen that as the anti-rotation arm and anti-rotation sleeve are angularly torqued with respect to one another, the ball bearing engagement between the two structures is maintained, thus significantly reducing any frictional effect of such torque.

FIG. 43 is a representative section view of the tensioning device 1502 showing the nut 1508 received in the nut recess (1520, 1524), and the nut pulled back into the tool by the relief distance. This causes the anti-rotation arm 1632 and cup 1636 to be pushed back into the tool thereby compressing the anti-rotation spring 1640 and increasing the overlap between the anti-rotation arm and the anti-rotation sleeve 1630. The ball bearings have spread out from their compact position, and still maintain a friction reduction effect.

FIGS. 40 and 41 schematically show an embodiment of a control system 1660 for use with the tensioner tool 1500. FIG. 41 shows the control system having two major components interacting with the tensioning tool. A hydraulic component 1662 and monitoring/feedback component 1664 of the control system interact with the tensioning tool 1500 and with one another to cause the device to operate. The hydraulic system includes generally the hydraulic fluid source 1666, pump 1668, pressure transducers 1670, valves 1672, pressure reservoir 1674 and associated hydraulic lines, connectors and required fittings. The monitoring/feedback component 1664 includes at least one PLC digital and analog I/Os (1674, 1676), at least one servo drive 1678, a linear motor or servo motor 1680 with encoder 1682, a nut runner drive, and associated communications lines and connections. The hydraulic component 1662 is integrated with the hydraulic portion of the tool, and the monitoring/feedback component 1664 is associated with the drive portion of the tool. The hydraulic and monitoring components are also integrated to allow data and instructions to be transferred to and from the hydraulic and monitoring components, as necessary. What is considered unique is the tensioning tool and the associated method of tensioning a park brake system. The control system for programming the tensioning tool to perform that function can be controlled by any number of different control systems implemented with many different hardware and software combinations. The control system shown in FIGS. 40 and 41 are only one such system.

FIG. 40 illustrates a more detailed schematic of the control system 1660. With respect to the hydraulic component of the control system, a main hydraulic line 1684 connects the tensioning tool to a hydraulic pump 1668. The hydraulic pump in this embodiment is a reservoir having a piston 1669 therein, such as the Bimba 500 Hydraulic cylinder. The piston can be actuated to move in the cylinder and push fluid through the line into the tensioning tool. The piston can also be actuated to move and effectively pull fluid out of the tool and back to the cylinder. The amount the piston is moved determines how much fluid is pushed to the tensioning tool, and thus how far the piston shaft in the tensioning tool is retracted into the housing, as is described in greater detail below.

A high-pressure relief valve 1672A is connected to the main hydraulic line 1684 adjacent the connection to the tool 1500. The high pressure relief valve is connected to the pressurized reservoir 1674. The high pressure relief valve is actuated when the hydraulic system is over-pressured, and actuates to allow fluid to flow into the reservoir system. The pressurized reservoir holds hydraulic fluid under pressure, and is used to replace lost fluid in the hydraulic system (due to leaks in the hydraulic system, as is described in more detail below). The pressurized reservoir is connected to the main hydraulic line adjacent the cylinder.

A valve 1672B (such as a solenoid with a spring return) is in-line between the reservoir 1674 and the main line 1684. A check valve 1672C is in line between the valve and the main line. The valve 1672B is controlled by a signal received from the PLC 1672, described below. When actuated by the PLC, the valve 1672B opens to allow fluid to enter the cylinder 1668 and replace any fluid lost due to leaks in the system. The check valve 1672C insures that the fluid can only flow from the reservoir to the cylinder.

Related to the monitoring component of the control system, at least one PLC 1672 (referenced above) including at least one digital 1674 and at least one analog 1676 I/O device is used to receive, save, analyze and transmit signals for running the control system. The PLC is connected to three pressure transducers 1670, which are in turn each connected to the main line 1684. Each pressure transducer measures the pressure in the hydraulic line and transmits its reading to the analog I/O associated with the PLC. While only one pressure transducer would be sufficient, the three pressure transducers provide for excellent redundancy in case any one of them fails. Such redundancy protection is well known. Any pressure transducer suited for measuring line pressure in a hydraulic system of the type described herein would be sufficient.

A linear actuator 1686 is operably connected with the hydraulic cylinder 1668, and controls the position of the piston 1669. An encoder 1682 is operably associated with the linear motor 1680 to receive control signals from and transmit position feedback signals to a servo drive 1678. The servo drive is operably connected to the PLC, through the digital I/O component 1674.

A nut runner drive 1688, preferably capable of controlling the nut runner 1506 to at least rotate clockwise, counter-clockwise, measure torque and control revolutions per minute, is operably connected to the PLC 1672, through the digital I/O component 1674. The nut runner drive is also operably connected to the nut runner, which is part of the tensioning tool. The nut runner causes the crows foot 1504 to rotate, which in turn causes the input shaft 1522 to rotate and turn the nut 1508 to tension the system.

In operation, the PLC is generally programmed to control the tensioning tool, including actuating the hydraulic cylinder, through the linear operator, to pump fluid into the first chamber in the tool and cause the piston shaft to retract. The retraction, as described with respect to the various embodiments of the tool above, causes the nut to become secured in the end of the input shaft. The amount of fluid pumped into the first chamber determines the distance the piston shaft is retracted (the relief distance). The relief distance is selectable, and can range from 0.00 mm to the maximum hard-stop distance (approximately 26 mm in the preferred embodiment). The relief distance is programmed in the PLC by the user.

Once retracted, the PLC measures the pressure by the pressure transducers, and if necessary, instructs the nut runner, through the nut runner controller, to turn the input shaft to turn the nut clockwise to increase the tension in the park brake cable system. When the desired tension, also selectable by the user and programmed into the PLC, is reached, the PLC instructs the nut runner to turn off. The tension is measured in psi by the pressure transducers in this embodiment.

The PLC then instructs the linear actuator to remove hydraulic fluid from the first chamber in the tensioning tool. This is done by reversing the direction of motion of the piston in the hydraulic cylinder. This motion creates a vacuum and pulls the fluid out of the first chamber, thereby pulling the piston shaft from the retracted position in the tool to the extended position. To aid in this motion, the spring in the second chamber of the tool, which always applies a force towards the extended position, helps push the piston shaft from the retracted to extended position. The nut is released automatically when the input shaft reaches the extended position, as described in greater detail above.

A functional test can be performed in order to test the tension level of the park brake cable system after the tensioning process. Instead of letting the nut go and removing the tool as above, the tool is left engaged with the equalizer, and the tool is instructed, through the PLC, to retract the nut some distance (the relief distance or less) and check the tension in the cable system by the sensed load on the pressure sensors. If necessary, the tool can be actuated by the PLC to further tighten or loosen the nut to obtain the desired final tension level of the park brake cable system. The parameters of the functional test, including the relief distance and the desired load at the particular relief distance, can be programmed into the PLC, or can be programmed to be calculated by the PLC (and supporting software and hardware as necessary) based on the actual data created by the tensioning process for that particular vehicle.

One embodiment of the method for using the tensioning tool described herein includes several steps. These steps are performed primarily by the programmed control system as described herein, and where indicated by an operator. It is contemplated that this and other methods of operating the tensioning tool to tension a park brake cable system are capable of being implemented. This method is described with respect to the last embodiment described in the specification, but it is contemplated that the same method, or another similar method, could be used with the other two embodiments as described herein.

An initial step is for the operator to position the nut into the end effector (or nut receiving cavity) in the tool, and then position the end effector against the equalizer. This is done with the input shaft and outer housing having flush ends. The operator would then thread the rod through the equalizer and the nut and actuate the tool. The keyed end of the threaded rod at this point engages the anti-rotation mechanism. During this step, the tool drives the nut to turn two or three times to further engage the nut on the threaded rod. The torque sensor in the tool and control system senses a torque due to the prevailing torque feature on the nut, which indicates that the nut is properly started on the threaded rod. At this point the normal tensioning process begins. The linear actuator is at a first position 1 (furthest extended).

The above steps are not necessary where the nut does not have a prevailing torque feature. Without the prevailing torque feature, the nut can be easily turned onto the threaded rod by hand and the tool does not need to be used to start the nut on the threaded rod.

A next step is to fill the first chamber with hydraulic fluid. The force balance causes the housing to move forward until it engages the equalizer, and then the input shaft is retracted with the nut. The input shaft pulls the nut back by the relief distance (for instance approximately 21.6 mm). This can be the maximum retractive movement of the input shaft, or can be any other programmed value as discussed herein. The input shaft now extends through the crow's foot.

During this step, the linear actuator moves to the second position (furthest retracted if at hard-stop). Approximately 26.93 cubic centimeters of fluid is displaced from the cylinder into first chamber in the tool. This represents a linear stroke of the hydraulic cylinder of approximately up to 41.83 mm (and approximately 21.6 mm stroke in the tool). A signal from the pressure transducer must then correlate with the position to ensure that the end effector has moved to hard stop and that fluid is not leaking from the system. If the pressure in the system is too low (based on expected pressure levels at this point), the PLC energizes the solenoid valve to release fluid from the pressurized reservoir to the hydraulic line. The pressure in the reservoir is maintained at least at the highest pressure to be experienced by the tool so that fluid will flow into the main hydraulic line as necessary. Once the desired hydraulic pressure is attained, the solenoid is deactivated. Also, at this step, the linear actuator could be moved to achieve a common pressure starting point prior to the next step. If the hydraulic pressure is too high, this indicates that the tool was applied incorrectly and the linear actuator will return to the first position for re-mounting.

A further step is for the input shaft to rotate at up to full speed to advance the nut on the threaded rod until the pressure increases to near the target pressure, at which time the rotation speed is reduced to help insure that the desired pressure is not passed. The rotation speed is reduced to zero upon reaching the final pressure. The final pressure will vary from system to system, and needs to be selected based on the particular vehicle model being tensioned. During this step, the cable system is tensioned to a very high load, and any voids in the cable are minimized. The clamp pressure on the brakes is increased, which allows the cable tension to increase. This high-load level can be approximately 300 lbs, but again is dependent on the vehicle model being tensioned.

A further action is to cycle the nut forward and back (extend and retract) a number of times. In the extended position, the nut at position 3, and is not released. In the retracted position the nut is at position 4, and has not reached hard stop. During this step, the linear actuator is cycled between positions 3 and 4. Fluid is displaced between the hydraulic cylinder and the tool to cause the cyclic action. The linear actuator returns to position 3 to complete the process.

A further action is to retract the nut to a position associated with a selected level of tension (hydraulic pressure or load as read by the transducers). If the level of tension cannot be found within the available retraction distance, the tool rotates the nut until the particular tension level is attained. This tension level is selected by the operator (likely based on the model of car being tensioned) and input into the control system. During this step the PLC activates the linear actuator to move hydraulic fluid into the tool, and monitors the load (or pressure) with the transducers. When the pressure reaches the selected level, the linear actuator is deactivated. This is the functional check, which can also be done a variety of other ways. For instance, the final tension can also be determined by monitoring the tension load as the park brake cable system on that particular vehicle is being tensioned. The control system can also check linear actuator movement based on pressure measurements, or can check pressure based on linear actuator measurements, and adjust accordingly.

A final action is to allow the input shaft to extend fully, thus releasing the nut. The tool can then be removed. During this step, the hydraulic fluid is evacuated from the tool to allow the input shaft to extend completely and release the nut.

The beginning and final tension levels of a park brake cable system depend on the model of vehicle. For example, certain automobiles, the final tension level is in the range of 75-85 psi. Also as an example, the final range of tension for trucks can be between 200 and 300 psi. Also note that the term force, load, and tension all relate to the measured readings by the transducers of the fluid in the hydraulic system. These terms are considered interchangeable and all relate to the tension of park brake cable system as manifested in the hydraulic fluid in the combination of the tensioning tool and the hydraulic system.

The tensioning tool can be attached for support during the operation to the park brake cable system itself. For instance, the tensioning tool can be hung by at least one hook from a cable in the tensioning system.

The pressure transducers measure the hydraulic pressure in psi (which is also a measure of the tension in the park brake cable system) directly from the hydraulic fluid, which is under direct load of the park brake cable system. This is distinct from using strain gauges mounted on the cables themselves, which do not measure pressure or tension directly, but only indirectly. The direct pressure/tension measurements of the present invention are more accurate, and give the actual picture of the tension load in the park brake cable system, as opposed to a correlated result when calculated using a strain gauge. Direct measurement of the load on the cable system requires that the nut not be in contact with the equalizer, but instead solely subject to the tension of the cable system. This is achieved by moving the nut away from the equalizer by retracting the piston shaft the relief distance. The outer housing then contacts the equalizer, and the inner structure of the tool is able to move in the axial direction independently of the outer housing, thus allowing the tension level of the cable system to be sensed by the hydraulic system.

The tension measured directly by the transducers in the tensioning tool is based on the hydraulic fluid pressure in the hydraulic system. The pressure in this system is caused primarily by the tension in the park brake cable system. Only a small variation of this pressure is caused by the friction of the seals in the tool, and the movement of the anti-rotation device (shaft moving within the tube as the threaded rod is advanced through the nut). The portion of the hydraulic system in the tool is primarily stationary during the actual tensioning process (where the nut is being turned). There is only a rotational movement and the actuation of the anti-rotation mechanism to affect the load measured on the system. The rotation of the input shaft causes a rotational friction in the bearings that support the input shaft, but that friction is at right angles to the load on the hydraulic system, so any affect it has would be minimal. The actuation of the anti-rotation mechanism can create some additional load affecting the measurement of the true cable tension. The last embodiment, however, minimizes that effect, thus making it substantially negligible. In any event, the affect the parts of the tool may have on the tension measurement can be characterized and calculated, and thus factored out of the tension level reported by the PLC.

The direct measurement of the load (or tension) takes place throughout the tensioning process. This data can be collected by the PLC or additional hardware/software systems to characterize the tensioning process for various circumstances. Such circumstances include characterization by car model, work shift, or operator, among others. Also, this data can be used to determine maintenance periods, process variations, quality control, and for other purposes. The correlation between linear actuator/hydraulic cylinder conditions and pressure measurements can also be used for characterizing hydraulic system performance, tensioning process performance, or the like.

In sum, the operation of the tensioning tool, controlled by the control system, is based on primarily the retraction of the nut by the relief distance prior to tensioning. In the embodiments described herein, this is accomplished by the relative motion of the housing with respect to an input shaft. In one embodiment the housing is pushed toward the equalizer to effectively withdraw the nut into the tool. In other of the embodiments, the input shaft is withdrawn into the tool, thus causing the nut to be withdrawn into the tool. The nut is received and secured in a nut receiving cavity. In the described embodiments, the nut receiving cavity is formed in the end of the input shaft, and the nut is secured therein by the relative movement of the housing with respect to the input shaft. Other implementations for moving the nut the relief distance prior to tensioning can be contemplated, such as for instance the nut being received and secured in the outer housing, not the input shaft.

Some vehicle models do not require much relief distance. What is important for these models is that the nut be disengaged from the equalizer to allow a direct measurement of the load on the cable system for accurate tensioning.

The anti-rotation structure could be formed on the equalizer, as opposed to inside the tool, such as a keyed hole through which the threaded rod extends. The portion of the threaded rod being positioned through the keyed aperture can have a keyed shape and be able to slide there through, thus keeping the rod from turning while the nut is being threaded on the rod at a different location there along.

The control system for running the tensioning tool, while described in some detail herein, can also be constructed of a variety of different elements, as described above. What is important is that the control system can operate the tensioning tool to tension the brake system to a set point load and then stop. Other functions, such as accumulating load and other data and analyzing it for the performance of a particular cable system, or for data summarizing many cable systems, are also important. Also being able to perform additional tensioning tests and functions, such as the functional test described above, is important.

The Nut

The nut utilized in the brake system tensioning apparatus and method of the present invention allows the end of the brake cable to be held in an axially adjustable manner to facilitate the increase or decrease of tension in the brake cable system. Specifically, the nut is designed to provide an anchor on the brake cable to which a tool can be attached for pulling (tensioning) or releasing (un-tensioning) the cable, as well as rotation of the nut by the tool, as described above. The tensioning act requires the cable to be pulled along its axial length, and releasing tension requires the cable to be released along its axial length. The nut allows tensioning and un-tensioning by threadedly engaging the end of the cable (actually, a threaded rod attached to the end of the cable). The cable can be tensioned by the tool grasping and moving the nut axially, or turning the nut around the cable so that the threaded engagement pulls the threaded rod through the nut.

This all requires the nut to be structured to allow both engagements for axial motion of the nut by the tool, as well as rotational motion of the nut by the tool. To this end, the nut of the present invention has at least a portion of its outer surface shaped with a rotationally-engaging outer surface (such as a hex shape or other rotationally engaging shape, such as an octagon, keyed, or flat and curved shape), and an annular groove formed circumferentially around the nut at some point between the ends of the nut.

As shown in FIG. 3, nut 126 has a groove 163 formed there-around. The nut has a relatively long main body, and has a threaded bore formed there through. The outer surface of the nut has a hexagonal rotational engagement shape. The groove 163 is formed near one end of the nut, and has a rectilinear profile (flat bottom and front and rear sidewalls that are at right angles to the flat bottom. The flat bottom of the groove in this embodiment is parallel to the long axis of the nut as shown by the dashed line. The rectilinear profile has allows the engagement portion of the tool that fits into the groove 163 to securely engage the groove and move the nut in the axial direction without the tool slipping out of the groove 163. The groove is positioned near one end of the nut, but sufficiently spaced from that end to allow an effective rotational engagement outer surface to be formed between the groove 163 and the end of the nut.

Another embodiment of the nut is shown in FIG. 10. This embodiment is similar to that shown in FIG. 3, except the front end of the nut has a frustoconically-shaped surface at its leading end to urge the prongs 192 apart in order to snap back into the groove 163 to engage the groove. As described above with respect to FIG. 10, the leading edge of the groove 163 can also be sloped from the bottom of the groove to the outer surface of the nut, either in a straight or curved shape, to bias the prongs 192 apart in order to disengage from the groove 163 as desired.

The nut 126 shown in FIG. 11 is similar to the shown in FIG. 3, except that the annular groove has a curved profile for receiving a ball bearing. The curved profile can be a continuous curve having differing or fixed radii of curvature. The curved profile can also have a flat groove bottom and curved front and rear edges extending from the groove bottom to the outer surface of the nut.

The nut 1012 shown in FIG. 13 is similar to that shown in FIG. 3, except that the annular groove or slot 1162 is positioned at the mid-point of the length of the nut. The leading and trailing (front and rear) edges of the groove are also linearly-sloped from the bottom of the groove to the top of the groove (or outer surface of the nut). The groove could be positioned closer to one end of the nut than the other end of the nut, if desired.

Two other embodiments of nut structures are shown in FIGS. 46 and 47. FIG. 46 shows an elongated nut 4000 having an outer surface 4002 shaped for rotational-engagement, an axial bore 4004 therethrough that is at least partially threaded, a flange disc 4006 formed at one end of the nut having an outer diameter larger than the rest of the nut, and a centrally-formed annular groove 4008. The dimensional details of the nut of FIG. 46 are shown in FIG. 54. The profile of the groove 4008 shows a flat bottom 4010 parallel to the length of the nut, and a shallow linear sloped (such as 30 degrees) front edge 4012 and a steep linearly sloped (such as 60 degrees) rear edge 4014. The transition from the outer surface of the nut to the disc is a generally smooth curve, although it could be an abrupt 90 degree angle or the like if so desired. The flats formed on the outer surface of the nut 4000 are relatively broad with less transition between adjacent flats.

FIG. 47 shows an elongated nut 4016 having an outer surface 4018 shaped for rotational engagement, an axial bore 4020 therethrough that is at least partially threaded, a flange disc 4022 formed at one end of the nut having an outer diameter larger than the rest of the nut, and a centrally-formed annular groove 4024. The dimensional details of the nut of FIG. 47 are shown in FIG. 55. The profile of the groove 4024 shows a flat bottom 4026 parallel to the length of the nut, and a shallow linear sloped (such as 30 degrees) front edge 4028 and a steep linearly sloped (such as 60 degrees) rear edge 4030. The transition from the outer surface of the nut to the disc is a generally smooth curve, although it could be an abrupt 90 degree angle or the like if so desired. The flats formed on the outer surface of the nut 4016 are relatively narrow with more transition between adjacent flats as compared to the nut shown in FIG. 46. The nut of FIG. 46 has a dimension across flats of approximately 9.9 mm, and the nut of FIG. 47 has a dimension across flats of approximately 11.9 mm.

The flange on both of the nuts 4000 and 4016 is not necessary, but does provide additional load bearing surface when resting against the equalizer bracket during use. The flange is sized sufficiently to be withdrawn into the tool during tensioning. A nylon patch can be positioned at the end of either of the nuts 4000 or 4016 opposite the flange, from which the prevailing torque is derived.

While the terms "front" and "rear", and/or "leading" and "trailing," are used with reference to the nut structure, it is to be understood that either end of the nut can be oriented to be the outer end when positioned on the threaded rod attached to the brake cable. The width of the groove in any of these embodiments can range from a thin slot-like groove to a broad groove. It is contemplated that the groove can have a width greater than half the length of the nut, or a greater or lesser width. For instance, the width can be approximately a third the length of the nut, or less than a third the length of the nut, depending on the application and particular tool with which the nut is used.

The Load Sensor Embodiment

FIGS. 48-52 display another embodiment of a tensioning tool suitable for suitable for tensioning an automotive braking system. Generally, and with reference to FIG. 48, this embodiment 4800 includes a load sensor 4802 (also referred to as a "load cell") capable of measuring exertions of force or pressure. The load cell may convert mechanical force exerted on its surface into an electrical signal. Various commercially manufactured load cells may be used with the embodiment. For example, load cells manufactured by FUTEK ADVANCED SENSOR TECHNOLOGY, Inc. of Irvine, Calif. and/or SENSOTEC, Inc. of Columbus, Ohio are suitable.

The load sensor 4802 may provide an output signal of approximately 1.5 to 2 millivolts, or any output signal commonly generated by load cells. Typically, the voltage of the output signal varies with the force exerted on the load cell, and thus generated by the brake cable system. General operation of the load cell in the context of signal conditioning and evaluation is described below, in the section entitled "Load Cell Operation."

The load sensor 4802 is typically located at some point between the pressurized fluid chamber 4804 and a retaining ring 4808. In the present embodiment, the load sensor abuts the piston 4810 on one side and an o-ring 4811 on another. The o-ring cushions the load cell 4802 from direct contact with a cushion block 4806, and aids in distributing pressure evenly across an engagement surface of the load sensor.

The present embodiment generally operates in a manner similar to the tensioning tool described with respect to FIGS. 29-43, albeit with some differences. Any of the various nuts described herein may be used with the present tool 4800. In this further embodiment, the outer housing includes a front housing threadedly connected to a middle housing, which in turn is threadedly connected to a rear housing. FIGS. 48-50 display the tensioning tool 4800 in preparation for receiving the nut 4000, with the nut clamped, and with the nut 4000 seated in the nut receiving cavity 4814 and drawn into the tool interior, respectively. FIG. 50, for example, displays the tool 4800 during a tensioning operation. FIG. 51 shows the nut 4000 and the threaded rod 1510 after the tool has been operated and the rod has been pulled through the nut to tension the braking system. FIG. 52 shows the tool having been released from the nut, with the nut in engagement with the equalizer bracket 164, and the braking system under higher tension than prior to the use of the tool 4800. FIG. 53 shows a control system schematic for use with the load cell 4802 embodiment.

Referring again to FIG. 48, double-beveled lock members 4812 are generally flush with the interior walls of the nut receiving cavity 4814. The lock members 4812 may move slightly towards and away from the center of the nut receiving cavity 4814, but are constrained from moving along the cavity length. Because the surface of the lock members 4812 does not extend beyond the nut receiving cavity's 4814 walls, a nut 4000 may be freely inserted into the cavity without abutting or otherwise encountering the lock members. The input shaft 4816 is in a fully extended position. A gap washer 4856 is positioned around the input shaft, and keeps the front distal end of the piston 4810 from engaging the nut retaining portion of the input shaft. It provides for proper axial dimensioning and part positioning, as well as some rotational wear protection. An annular spacer 4858 is used to help position the front extensions of the piston and input shaft 4816 properly positioned inside the housing. The spacer 4858 can also act as a front seal of the pressurized fluid chamber 4804.

As with previous embodiments, the lock members 4812 extend through apertures formed in the circumference of the input shaft 4816.

FIG. 49 displays a nut 4000 held by the tensioning tool 4800. Once the nut 4000 is inserted into the cavity 4814, the lock members 4812 engage the flat bottom 4010 of the groove and securely hold the nut. As with the other embodiments described herein, the recess 4814 formed in the end of the input shaft 4812 is shaped to receive the outer surface of the nut 4000 in a torque-transferring manner. This causes the nut to turn with the rotation of the input shaft 4812.

FIG. 49 shows the locking members prior to engagement with the nut. Engagement occurs after the input shaft is retracted a little more than actually shown in FIG. 49. For instance, when the beveled edges of the lock members 4812 come in contact with the end of the float bearing 4862, the lock members are forced to move radially inwardly through the holes formed in the end of the input shaft 4816 and into engagement with the groove around the nut 4000. The float bearing 4862 then keeps the lock members 4812 in this engaged position until the input shaft 4816 is extended to the end of the tool. Upon extension, the lock members 4812 are moved out of the float bearing 4862, and the beveled surfaces on the nut 4000 and lock members interact to cause the lock members to pushed radially outwardly through the holes to release the nut.

Between FIGS. 49 and 50, the chamber 4804 is filled with pressurized liquid in order to move the input shaft 4816 into the housing (that is, cause the shaft to retract). This causes the lock members 4812 to grab the nut 4000, and pull the nut and threaded rod 1510 into the housing by the same distance the piston arrangement moves rearwardly to the hard stop 4822. This distance is designed to be the offset distance to create the initial tension in the cable system prior to the tensioning process.

FIG. 50 shows the nut 4000 withdrawn into the tool 4800 interior. Generally, withdrawal of the nut occurs in the same manner as previously described with respect to FIGS. 29-43. Oil, or another incompressible medium, is pumped into the pressurized fluid chamber 4804 through a pressurized fluid intake 4818. As the chamber 4804 fills, hydraulic pressure forces back the piston 4810 and associated piston guide 4820 (collectively, a "piston arrangement") along the length of the tool 4800. In an alternate embodiment, pneumatic pressure may be used to drive the piston 4810 instead of hydraulic pressure. The spring 4824 exerts an opposite force on the spring retainer 4836, ensuring the piston arrangement does not abruptly shoot back as the pressurized fluid chamber 4804 fills. A seal 4860 (namely, an o-ring between two retaining rings) is also used at the front of the pressurized fluid chamber 4804, inside the spacer/seal 4858 mentioned above.

The piston guide 4820 is a cup-shaped member that attaches to the rear end of the piston 4810. The cup-end of the piston guide 4820 receives the end of the piston, the load cell 4802, the o-ring 4811, the cushion block 4806, the bearing 4844, spring retainer 4836, backing block 4842, and an end of the spring 4824. The spring retainer 4836 circumferentially surrounds the cushion, bearing, and backing blocks, all inside the cup-end of the piston guide 4820.

The piston's 4810 motion forces the load cell 4802, cushion block 4806, backing block 4842, and associated elements to move, along with the input shaft 4816. These parts stop moving when the piston guide 4820 impacts a guide stop 4822 extending inwardly from the interior wall of the tensioning tool 4800, which prevents further rearward movement of the piston arrangement. Further, the rear adapter 4830 slides further into the keyed recess of the crow's foot 1504 so that the crow's foot can continue to turn the adapter, which in turn also rotates the input shaft 4812. As can be seen in FIG. 50, a seal 4846 prevents fluid from exiting the pressurized fluid chamber 4804 and leaking along the length of the piston guide 4820. Another seal 4850 and bearing structure 4852 surrounds the input shaft up front to keep the oil from leaking into the front of the input shaft 4812, as well as supporting the input shaft's rotation.

Once the nut is withdrawn into the tool interior, the bearing sleeve 4848 pressed down on the lock members 4812. This drives the lock members securely into the nut groove 4008, ensuring a solid contact therebetween. A float bearing 4862 is positioned between the bearing sleeve 4848 and the nut receiving end of the input shaft 4816. The float bearing restrains the locking members 4812 from moving radially outwardly and disengaging from the nut 4000. The float bearing 4862 also reduces wear and tear on the bearing sleeve 4848 resulting from the rotation of the input shaft 4816, which turns the float bearing.

At this point, the nut 4000 may be rotated to pull the threaded rod 1510 through the nut, thus tensioning the brake system. The general operation required to tension the brake system has been previously described. Here, however, the tool 4800 does not include an interior anti-rotation assembly as described with respect to other embodiments, above. Instead, the rod 1510 and equalizer bracket 116 prevent rotation.

In the present embodiment, the rod 1510 is D-shaped, as is the equalizer bracket aperture through which the rod passes. As the tool 4800 turns the nut 4000, the flat surface (the "back" of the D-shape) of the rod engages the flat surface of the equalizer bracket aperture. The contact point between these surfaces prevents the rod 1510 from rotating. This, in turn, allows the nut 4000 to be rotated over the rod, which pulls the rod through the nut as described. Since the input shaft rotates to drive the nut 4000, and the rod 1510 does not rotate because of its engagement in a D-shaped aperture formed in the equalizer bracket 116, a frictional force develops between the rod and bracket. This force affects the actual load sensed by the load cell 4802, as described in more detail below.

The anti-rotation structure shown in FIG. 42, and described above with reference to another embodiment, was intended to keep the rod 1510 rotationally stable and minimize this residual friction by using ball bearings. In the present embodiment, the rod 1510 is kept rotationally stable by its keyed engagement with the equalizer bracket 116, and thus the resultant friction is outside the tool 4800. Because the friction is incurred outside the tool, it may affect the load sensed by the load cell 4802.

In the present embodiment, at least two methods for dealing with this load measuring inaccuracy may be used. A first solution is to factor the friction load into the load cell 4802 output signal as an estimate. This estimate may be based on an analysis of actual forces experienced during the tensioning operation, or on test data. A second method is to rotate the rod counter-clockwise to disengage the rod from the aperture edge. This is generally done prior to measuring the determinative load level during operation of the tool 4800.

One way to disengage the rod 1510 from the edge of the equalizer bracket 116 aperture is to turn the nut 4000 counter-clockwise on the rod (i.e., in the "loosening direction") in order to turn the rod slightly. This reduces the residual friction and allows for more accurate load measurements. Such counter-rotation may also be done in other ways, such as by hand, by using a reduced-friction sleeve on the rod or equalizer bracket, or other means for releasing the residual friction.

The rod 1510 may be D-shaped for its entire length, in which case the interior of the nut does not contact the flat rod portion, or the D-shape may begin some distance away from the end of the rod threaded through the nut 4000. In either case, the D-shaped portion of the rod 1510 should begin before the rod passes through the equalizer bracket 116.

As with previous embodiments, the backing block 4842 rotates with the input shaft 4816. Because the Torrington thrust roller 4844 is located between the backing block 4842 and the cushion block 4806, the cushion block generally does not rotate. In addition, a cap screw 4832 runs from the wire guide 4838 into the tool interior. The head of the cap screw 4832 is fitted into the cup-end of the piston guide 4820; the length of the screw extends through the piston guide wall and is secured to the wire guide 4838. The cap screw 4832/wire guide 4838 move with the piston guide during actuation of the tool 4800, namely in a forward and back manner. A slot 4854 is formed in the tool housing to allow this reciprocating movement. This helps keep the piston guide 4820, as well as the parts received therein, from rotating with the input shaft 4816. The slot 4854 also permits the cap screw 4832 to be fastened to the piston guide 4820. The cap screw stabilizes other elements within the tool, such as the cushion block 4806 and load sensor 4802, by opposing any rotational force exerted thereon. Effectively, the head of the cap screw is locked in place, thus resisting rotation.

Additionally, a pin 4834 connects the load cell 4802 to the spring retainer 4836. The expansive force exerted by the coiled spring 4824 on the spring retainer tends to resist any rotational force applied to the retainer. The pin transmits this force to the load cell, again helping prevent rotation. Further, the pin 4834 is located in the same housing as the cap screw 4832, and thus may spread some portion of the force exerted against rotation by the screw among the load sensor 4802 and spring retainer 4836.

FIG. 51 displays the tool 4800 of the present embodiment as the rod 1510 is drawn into the tool interior. The piston arrangement is held in a "hard-stop" position, against the rear of the tool 4800, by the fluid pressure. The force of the spring 4824 is applied against the piston arrangement, and thus against the fluid pressure. Accordingly, the load cell readings are not affected by the spring force. This is the nut 4000 and tool 4800 orientation where the system tension is measured and adjusted by actuation of the tool. The load cell 4802 is used, as described below, to directly measure the tension in the system in order to accurately and precisely tension the braking system.

FIG. 52 displays the tensioning tool 4800 after the automotive braking system has been properly tensioned and the nut 4000 and rod 1510 released from the double-beveled lock members 4812. The fluid (or gas) drains from the pressurized fluid chamber 4804 through the fluid intake 4818. This reduces pressure on the piston 4810 and piston guide 4820. As hydraulic pressure is reduced, the force exerted by the spring 4824 against the spring retainer 4836 pushes the piston assembly back to its original position. Generally, fluid is removed from the pressurized fluid chamber 4804 at a rate designed to prevent the piston assembly from abruptly returning to position and potentially damaging tensioning components, such as the load cell 4802 or cushion block 4806.

As in the other embodiments, when the input shaft 4816 is moved axially back to the front of the device 4800, the lock members 4812 are moved from a region having a smaller diameter, where they are held in engagement with the nut by a retainer, to a larger diameter region where the lock members are allowed to move radially outwardly to disengage the nut 4000 and allow it to be removed from the tool. The nut groove has angled edges, which at as a cam surface to push the locking members radially outwardly as the nut is pulled from the tool.

Load Cell Operation

Returning now to FIG. 48, the operation of the load cell 4802 will be discussed. As previously mentioned, the load cell 4802 generally measures mechanical force exerted thereon and outputs an electrical signal scaled to the amount of pressure or force sensed. As can be seen in FIG. 48, one end of the load cell is in contact with the piston 4810, while the other end is buffered by an o-ring 4811 from direct contact with the cushion block 4806. The o-ring insulates the load sensor 4802 from direct contact with the cushion block 4806, and thus minimizes grinding or wear on the load cell surface. Further, the o-ring 4811 distributes force exerted by the cushion block more evenly across the load sensing surface. The o-ring is designed, however, to not reduce the force applied to the load cell 4802. Basically, the o-ring 4811 is under such load that it deforms sufficiently to load the majority, if not all, of its resiliency.

As the pressurized fluid chamber 4804 is filled from the fluid intake 4818, it expands and drives the piston 4810 along the hollow tool interior. The piston pushes against one surface of the load cell 4802, as shown in FIGS. 49 and 50. FIG. 50, in particular, shows the pressurized fluid chamber 4804 fully filled. At this point, the piston arrangement is hard stopped against the back of the tool 4800. The spring force acts on the piston arrangement, and accordingly does not affect the load cell 4802. The only force applied on the load cell is the tension in the braking system. This force is applied through the retaining ring 4808. The force path for the load on the load cell 4802, at this point, is from the cable system to the nut 4000, from the nut to the input shaft 4816, from the input shaft to the retaining ring 4808, from the retaining ring to the backing block 4842, from the backing block to the bearing 4844, from the bearing to the cushion block 4806, from the cushion block to the o-ring interface 4811 (not required), from the o-ring interface to the load cell 4802, and from the load cell to the piston arrangement. The piston arrangement, as noted above, is hard-stopped against the rear of the tool by pressure exerted from the pressurized fluid chamber 4804.

The threaded rod 1510 is drawn into the tool 4800 by the rotation of the input shaft 4816, which is driven by the crow's foot 1504, as explained with respect to previous embodiments. The crow's foot 1504 is controlled by the control system (also previously described), which in the present embodiment employs additional data obtained from the load cell 4802. This additional data is discussed in more detail below. The input shaft 4816, rear adapter 4830, retaining ring 4808, and backing block 4842 all rotate. However, the bearing 4844 isolates these rotating parts from the other components surrounding the input shaft 4816, such as the cushion block 4806, load cell 4802, piston arrangement, and so forth.

The rear retaining ring 4828 holds the rear adapter in place on the input shaft 4816. The other end of the rear adapter 4830 abuts a should formed around the input shaft. The rear adapter is keyed to the outer surface of the input shaft 4816.

As the nut 400 rotates and draws in the threaded rod 1510, the tension in the braking system increases, as does the force sensed by the load sensor 4802.

As the rod 1510 is drawn further into the tool 4800, the braking system (not shown) pulls axially against the rod and nut 4000. This force is transferred to the input shaft 4816 through the locking members 4812. Attached to the input shaft 4816 is at least one retaining ring 4808. The force exerted on the input shaft 4816 is communicated through the retaining ring 4808 to the backing block 4842. The backing block, in turn, exerts this force on the cushion block 4806 and load cell 4802. Accordingly, during tensioning of the braking system, the load cell has a force exerted upon it from the tensioning force transferred from the braking system, through the input shaft 4816 and retaining ring 4808, and ultimately to the cushion block 4806. The opposite force applied to the load cell 4802 is from the fluid pressure inside the pressurized fluid chamber 4804, which holds the piston arrangement in a hard stop position.

The load cell 4802 thus senses the tensioning force exerted on the braking system. As known to those skilled in the art, the load cell may convert this force to an electrical signal of a strength varying with the tensioning force. Although the present embodiment employs a load cell 4802 outputting a voltage signal in the range of 1.5 to 2 millivolts and directly proportional to the tensioning force, alternate embodiments may use different load cells with different output signals. For example, an alternate embodiment may use a load sensor outputting a signal logarithmically or inversely proportional to the tensioning force, or may vary a current instead of a voltage.

The output signal from the load cell 4802 is transmitted across a load wire 4840, housed in a wire guide 4838. The signal may be further conditioned, and is typically transmitted across shielded cable to prevent signal interference or degradation. Generally, the load wire 4840 and wire guide 4838 are prevented from rotating during tensioning by the cap screw 4832 in the manner previously described.

FIG. 53 displays a schematic of a control system 5300 for use with the tensioning tool 4800. Operationally, the control system 5300 is similar to the system described with respect to FIGS. 40 and 41. Here, however, the monitoring and feedback component 1664 accepts an additional input from a load component 5302. The load component 5302 receives the voltage signal generated by the load cell 4802, conditions it as necessary, and transmits it to the analog input 1676 of the monitoring and feedback component 1664. Examples of conditioning that may be performed by the load component 5302 include waveform smoothing to eliminate transient voltage spikes or dips, signal conversion to change the load cell's 4802 output to a range accepted by the analog input 1676, signal amplification to increase the signal variance, and so forth. Optionally, the load component 5302 may also include an analog-to-digital converter to change the load cell output to a digital signal. In such an embodiment, the load component would be connected to the digital input 1674.

The monitoring and feedback component 1664 may employ the load cell 4802 output (as conditioned by the load component 5302) as an additional input to properly tension the braking system, as described more fully with respect to FIGS. 40 and 41. Essentially, the load cell 4802 output provides an additional, direct measurement of the force being exerted by the braking system while under tension, instead of relying on other measurements, such as the pressure inside the pressurized fluid chamber 4804. Because the load sensor 4802 may directly measure the tensioning force, it is generally not subject to force or pressure variances that may give rise to inaccurate readings, such as hose kinks, bends, or twists.

As will be recognized by those skilled in the art from the foregoing description of embodiments of the invention, numerous variations on the described embodiments may be made without departing from the spirit and scope of the invention. Further, while the present invention has been described in the context of specific embodiments and processes, such descriptions are by way of example and not limitation. Accordingly, the proper scope of the present invention is specified by the following claims and not by the preceding examples.

What is claimed is:

1. A method for measuring a tensioning force applied to a braking system, comprising:
providing a brake cable system including:
an equalizer adapted to balance tensions in at least two lengths of cable; and
a nut operably associated with a threaded rod, the nut including a surface for operably engaging the equalizer;
moving the nut away from an equalizer by a relief distance to disengage the surface from the equalizer and thereby establishing a first tension level;
tensioning the brake cable system to a second tension level higher than said first tension level;
moving the nut toward the equalizer by the relief distance and establishing a third tension level; and
directly measuring the first and second tension levels by means of a load cell.

2. The method of claim 1, further comprising:
outputting a first electrical signal from said load cell corresponding to the first tension level; and
outputting a second electrical signal from said load cell corresponding to the second tension level.

3. The method of claim 1, wherein said third tension level is lower than said second tension level.

4. The method of claim 1, wherein:
said first, second, and third tension levels correspond to points on a tension/travel curve having a variable slope and defined by at least a first portion and at least a second portion;
wherein said variable slope increases from said first portion to said second portion; and
wherein said second tension level is in the second portion of the tension/travel curve.

5. A method for measuring a tensioning force applied to a park brake cable system, comprising:
providing a brake cable system including:
an equalizer adapted to balance tensions in at least two lengths of cable; and
a nut operably associated with a threaded rod, the nut including a surface for operably engaging the equalizer;
operably engaging a tensioning apparatus with a park brake cable;
operably connecting a load cell with an end of the park brake cable;
tensioning the park brake cable to a first level by disengaging the surface of the nut from the equalizer;
applying compression forces to the load cell by tensioning the park brake cable to a second tension level higher than said first tension level;
relieving the tension level in the park brake cable to a third level; and
directly measuring the second tension level by means of the load cell.

6. The method of claim 5, further comprising:
outputting a first electrical signal from said load cell corresponding to the first tension level; and
outputting a second electrical signal from said load cell corresponding to the second tension level.

7. A method as defined in claim 5, wherein said third tension level is higher than said first tension level.

8. A method as defined in claim 5, further comprising:
directly measuring said first tension level by means of the load cell.

9. A method as defined in claim 8, wherein said third tension level substantially matches a selected tension level.

10. A method as defined in claim 5, further comprising:
extending and retracting the nut at least one time.

11. A method as defined in claim 10, wherein the third tension level substantially matches a selected tension level.

12. A method as defined in claim 5, further comprising:
providing a tension/travel curve having a variable slope and defined by at least a first portion and at least a second portion;
wherein said variable slope increases from said first portion to said second portion; and
wherein said second tension level is in the second portion of the tension/travel curve.

13. A method of tensioning a park brake cable system including an equalizer adapted to balance tensions in at least two lengths of cable and a nut including a surface, said method comprising:
operably engaging the surface of the nut with the equalizer;
moving the nut away from the equalizer by a relief distance to disengage the surface of the nut from the equalizer and thereby establishing a first tension level;
tensioning the cable system to a second tension level higher than said first tension level;
directly measuring said second tension level with a load cell; and moving the nut toward the equalizer by the relief distance and establishing a third tension level.

14. A method as defined in claim 13, further comprising:
comparing said second tension level to a selected tension level; and
retensioning said cable system so that said second level closely approximates said selected tension level.

15. A method as defined in claim 14, wherein the operation of comparing said second tension level to a selected tension level comprises comparing said directly-measured second tension level to a reference value.

16. A method as defined in claim 5, further comprising:
extending and retracting said nut at least one time;
comparing said second tension level to a selected tension level; and
retensioning said cable system so that said second tension level closely approximates said selected tension level.

17. A method as defined in claim 16, wherein the operation of comparing said second tension level to a selected tension level comprises:
measuring said second tension level directly by means of the load cell; and
comparing said directly-measured second tension level to a reference value.

18. A method as defined in claim 13, wherein said third tension level is higher than said first tension level.

19. The method of claim 1, wherein the operation of directly measuring the first and second tension levels further comprises operably connecting the load cell with an end of a cable and applying compression forces to the load cell.

20. The method of claim 5, wherein the load cell is compressed against a fixed reference point.

21. The method of claim 13, wherein the operation of directly measuring said second tension level further comprises operably connecting the load cell with an end of a cable and applying compression forces to the load cell.

* * * * *